US011392171B2

(12) United States Patent
Del Moral et al.

(10) Patent No.: US 11,392,171 B2
(45) Date of Patent: Jul. 19, 2022

(54) HOLDER FOR MOBILE ELECTRONIC DEVICE

(71) Applicant: Speculative Product Design, LLC, San Mateo, CA (US)

(72) Inventors: Darrick Del Moral, San Bruno, CA (US); Alan Yu Tung Ng, San Francisco, CA (US); Ryan Klauer, San Mateo, CA (US); Christopher William Ledesma, Arcadia, CA (US); Bryan Hynecek, Redwood City, CA (US); Logan Price, Rexburg, ID (US); Sean Ng Pack, San Francisco, CA (US); Monica Elizabeth Wright, Falls Church, VA (US)

(73) Assignee: Speculative Product Design, LLC, San Mateo, CA (US)

(*) Notice: Subject to any disclaimer, the term of this patent is extended or adjusted under 35 U.S.C. 154(b) by 0 days.

(21) Appl. No.: 16/914,051

(22) Filed: Jun. 26, 2020

(65) Prior Publication Data
US 2020/0326749 A1    Oct. 15, 2020

Related U.S. Application Data

(63) Continuation-in-part of application No. 16/240,191, filed on Jan. 4, 2019, now Pat. No. 10,728,372, which
(Continued)

(51) Int. Cl.
*G06F 1/16* (2006.01)
*B60R 11/02* (2006.01)
(Continued)

(52) U.S. Cl.
CPC ............ *G06F 1/1626* (2013.01); *A45C 11/00* (2013.01); *A45C 13/002* (2013.01);
(Continued)

(58) Field of Classification Search
CPC .... H04B 1/3888; H04B 1/385; H04B 1/3877; H04B 2001/3855; H04B 2001/3861;
(Continued)

(56) References Cited

U.S. PATENT DOCUMENTS 4,479,318 A    10/1984  Russell
5,433,023 A    7/1995   Edwards et al.
(Continued)

FOREIGN PATENT DOCUMENTS

CA         2831048 C       10/2015
CN       107682502 A   *   2/2018
(Continued)

OTHER PUBLICATIONS

Speck launches colorful and protective kids' 'Case-E' for iPad as a successor to its popular iGuy, Jan. 6, 2019, retrieved from https://9to5mac.com/2019/01/06/speck-kids-ipad-case/ on Oct. 9, 2021 (Year: 2019).*

(Continued)

*Primary Examiner* — Srilakshmi K Kumar
*Assistant Examiner* — Jing Gao
(74) *Attorney, Agent, or Firm* — Lerner, David, Littenberg, Krumholz & Mentlik, LLP

(57) ABSTRACT

A holder (101) for a mobile electronic device includes a case portion (102), a connection member (107), and a handle (106). The case portion is configured for holding the mobile electronic device. The handle is rotatable about the connection member. The connection member includes a first flange (112) on a first side of the connection member and a second flange (113) on a second side of the connection member opposite the first side of the connection member. The first flange is spaced from the second flange such that a first portion of the handle is held in an axial position relative to the case portion by the combination of and between the first (Continued)

flange and the second flange. The connection member is a single body. An entirety of the connection member is removable from the rest of the holder through the handle.

22 Claims, 56 Drawing Sheets

Related U.S. Application Data is a continuation-in-part of application No. 16/107,781, filed on Aug. 21, 2018, now abandoned.

(51) Int. Cl.
| | |
|---|---|
| *A45C 11/00* | (2006.01) |
| *A45C 13/02* | (2006.01) |
| *A45C 13/00* | (2006.01) |
| *B60R 11/00* | (2006.01) |

(52) U.S. Cl.
CPC ..... *B60R 11/0252* (2013.01); *A45C 2011/003* (2013.01); *B60R 2011/0071* (2013.01); *G06F 2200/1633* (2013.01)

(58) Field of Classification Search
CPC .......... H04B 2001/3866; A45C 13/002; A45C 2011/002; A45C 13/30; A45C 2013/026; A45C 13/02; A45F 5/00; A45F 2200/0516; A45F 2005/006; A45F 5/02; A45F 2005/008; A45F 2200/0525; A45F 2003/003; A45F 2003/142; A45F 3/02; A45F 3/04; A45F 3/14; A45F 5/021; A45F 2003/001; A45F 2200/0508; A45F 2200/055; A45F 2003/025; A45F 2003/045; A45F 2004/003; A45F 2005/002; A45F 2200/05; A45F 3/005; B60R 11/0241; B60R 11/0252; B60R 2011/0017; H04M 1/185; H04M 19/047; H04M 1/026; H04M 1/18; H04M 1/2474; H04M 1/72527; H04M 1/7253; H04M 1/72594; H04N 5/2252; H04N 5/2251; H04N 5/2253

See application file for complete search history.

(56) References Cited

U.S. PATENT DOCUMENTS

| | | | |
|---|---|---|---|
| D361,601 S | 8/1995 | Goldman et al. | |
| 6,401,376 B2 | 6/2002 | Cumberland et al. | |
| D595,360 S | 6/2009 | Ogawa et al. | |
| D676,851 S | 2/2013 | Finnegan et al. | |
| D689,056 S | 9/2013 | Li | |
| D690,704 S | 10/2013 | Padilla et al. | |
| D703,750 S | 4/2014 | Tsai et al. | |
| D707,233 S | 6/2014 | Sirichai | |
| D711,970 S | 8/2014 | Bennett | |
| D723,037 S | 2/2015 | Huang | |
| D727,917 S | 4/2015 | Yeo | |
| D731,492 S | 6/2015 | Snyder et al. | |
| D733,154 S | 6/2015 | Armstrong et al. | |
| D743,408 S | 11/2015 | Chen | |
| 9,241,053 B2 | 1/2016 | Ashley et al. | |
| D748,634 S | 2/2016 | Hofer et al. | |
| D752,052 S | 3/2016 | Park | |
| D757,017 S | 5/2016 | Sirichai | |
| D763,853 S | 8/2016 | Pearce | |
| 9,548,785 B2 | 1/2017 | Rayner | |
| D778,272 S | 2/2017 | Kim et al. | |
| D784,350 S | 4/2017 | Li | |
| D787,494 S | 5/2017 | Kim et al. | |
| D787,496 S | 5/2017 | Kim et al. | |
| D788,091 S | 5/2017 | Kim et al. | |
| D790,550 S | 6/2017 | Chen | |
| D792,886 S | 7/2017 | Schwibner et al. | |
| D803,221 S | 11/2017 | Guo | |
| D806,080 S | 12/2017 | Chen | |
| D807,366 S | 1/2018 | Chen | |
| D807,369 S | 1/2018 | Chen | |
| D808,973 S | 1/2018 | Chen | |
| D809,498 S | 2/2018 | Ahn | |
| D810,732 S | 2/2018 | Fenton et al. | |
| D811,412 S | 2/2018 | McCurdy | |
| D812,620 S | 3/2018 | Cheng | |
| D839,866 S | 2/2019 | Entwistle | |
| D852,799 S | 7/2019 | Fenton et al. | |
| D854,022 S | 7/2019 | Chen | |
| D860,212 S | 9/2019 | Ahn | |
| D862,478 S | 10/2019 | Ahn | |
| D862,479 S | 10/2019 | Ahn | |
| D862,480 S | 10/2019 | Chan et al. | |
| D863,313 S | 10/2019 | Li | |
| D875,100 S | 2/2020 | Chang | |
| 10,601,971 B2 | 3/2020 | Hatch et al. | |
| D881,197 S | 4/2020 | Chen | |
| D884,709 S | 5/2020 | Cheng | |
| 10,728,372 B2 | 7/2020 | Hynecek et al. | |
| D893,497 S | 8/2020 | Li | |
| D897,349 S | 9/2020 | Li | |
| D898,035 S | 10/2020 | Xu | |
| D898,747 S | 10/2020 | Deng | |
| D900,113 S | 10/2020 | Pan | |
| 10,793,084 B2 | 10/2020 | Jiang et al. | |
| D912,677 S | 3/2021 | Li | |
| D913,294 S | 3/2021 | Li | |
| D916,708 S | 4/2021 | Ke | |
| D917,493 S | 4/2021 | Zhang | |
| D917,496 S | 4/2021 | Chen | |
| D928,166 S | 8/2021 | Hu | |
| D931,288 S | 9/2021 | Li | |
| 2009/0173863 A1 | 7/2009 | Crown | |
| 2010/0264181 A1 | 10/2010 | Gray | |
| 2012/0075799 A1 | 3/2012 | Pollex | |
| 2012/0152990 A1 | 6/2012 | Kulas | |
| 2012/0314354 A1 | 12/2012 | Rayner | |
| 2013/0241381 A1 | 9/2013 | Hynecek et al. | |
| 2013/0271897 A1 | 10/2013 | Limber et al. | |
| 2015/0195392 A1 | 7/2015 | Nissenbaum | |
| 2016/0028428 A1* | 1/2016 | Sturniolo | A45C 11/00 455/575.8 |
| 2017/0045920 A1 | 2/2017 | Armstrong et al. | |
| 2017/0097698 A1 | 4/2017 | Maeshima | |

FOREIGN PATENT DOCUMENTS

| | | |
|---|---|---|
| DE | 29618476 U1 | 12/1996 |
| DE | 102008053975 A1 | 5/2010 |

OTHER PUBLICATIONS

"IGUY 9.7-Inch iPad Cases", web, as published as of Aug. 2019, <https://www.speckproducts.com/apple/ipad-cases/ipad-pro-9-7-cases/iguy-ipad-pro-9-7-cases/776412479.html>, pp. 1-3.

"IGUY 9.7-Inch iPad Pro Cases", web, as published as of Jun. 2017, <https://web.archive.org/web/20170629165752/http://www.speckproducts.com/apple/ipad-cases/ipad-pro-9-7-cases/iguy-ipad-pro-9-7-cases/IPP9-IG.html>, pp. 1-3.

"IPad Pro Cases—iPad Pro Covers—Speck", web, as published as of Jun. 2017, <https://web.archive.org/web/20170606121641/http://www.speckproducts.com/apple/ipad-cases/ipad-pro-cases.html>, pp. 1-15.

European Search Report for Application No. EP20150216, dated Mar. 30, 2020, 3 pages.

Hynecek, B.L. et al., "Holder for Mobile Electronic Device," U.S. Appl. No. 29/675,720, filed Jan. 4, 2019.

Examples of ArmorBox Kido Cases as sold by i-Blason at least as early as Feb. 24, 2018, retrieved from the internet on Sep. 4, 2020, from the <URL: < https://web.archive.org/web/20161212200631if_/http://i-blason.com/tablet-cases.html>; 4 pages.

(56) References Cited

OTHER PUBLICATIONS

HDE iPad 9.7 Case sold by Walmart, published on the Internet/ World Wide Web at least as of Nov. 2, 2018, [online], [retrieved on Jun. 30, 2020], retrieved from the Internet <https://www.walmart.com/ip/HDE-iPad-9-7-Case-for-kids-2018-6th-Generation-Shockproof-Bumper-Protective-Cover-Stand-for-All-New-Apple-iPad-9-7-Inch-Hot-Pink/827354147>.

Hynecek, B.L. et al, entitled "Holder for a Mobile Electronic Device," U.S. Appl. No. 29/810,834, filed Oct. 8, 2021.

Hynecek, B.L. et al., U.S. Appl. No. 29/810,833 titled "Holder for a Mobile Electronic Device" filed Oct. 8, 2021.

HDE iPad 9.7 Case sold by Walmart, published on the Internet/ World Wide Web at least as of Nov. 2, 2018, [online], retrieved from the Internet <https://www.walmart.com/ip/HDE-iPad-9-7-Case-for-kids-2018-6th-Generation-Shockproof-Bumper-Protective-Cover-Stand-for-All-New-Apple-iPad-9-7-inch-Hot-Pink/827354147.

* cited by examiner

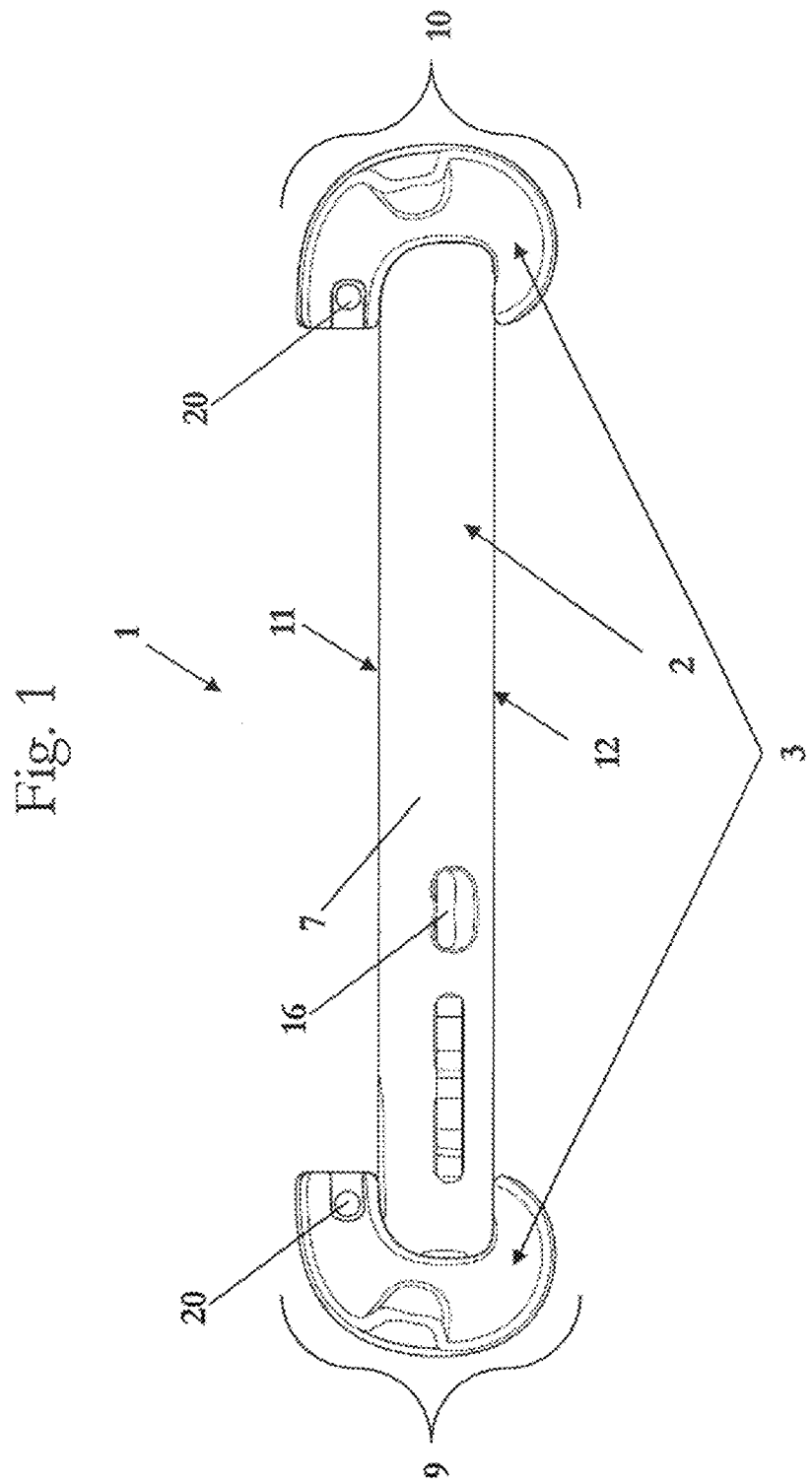

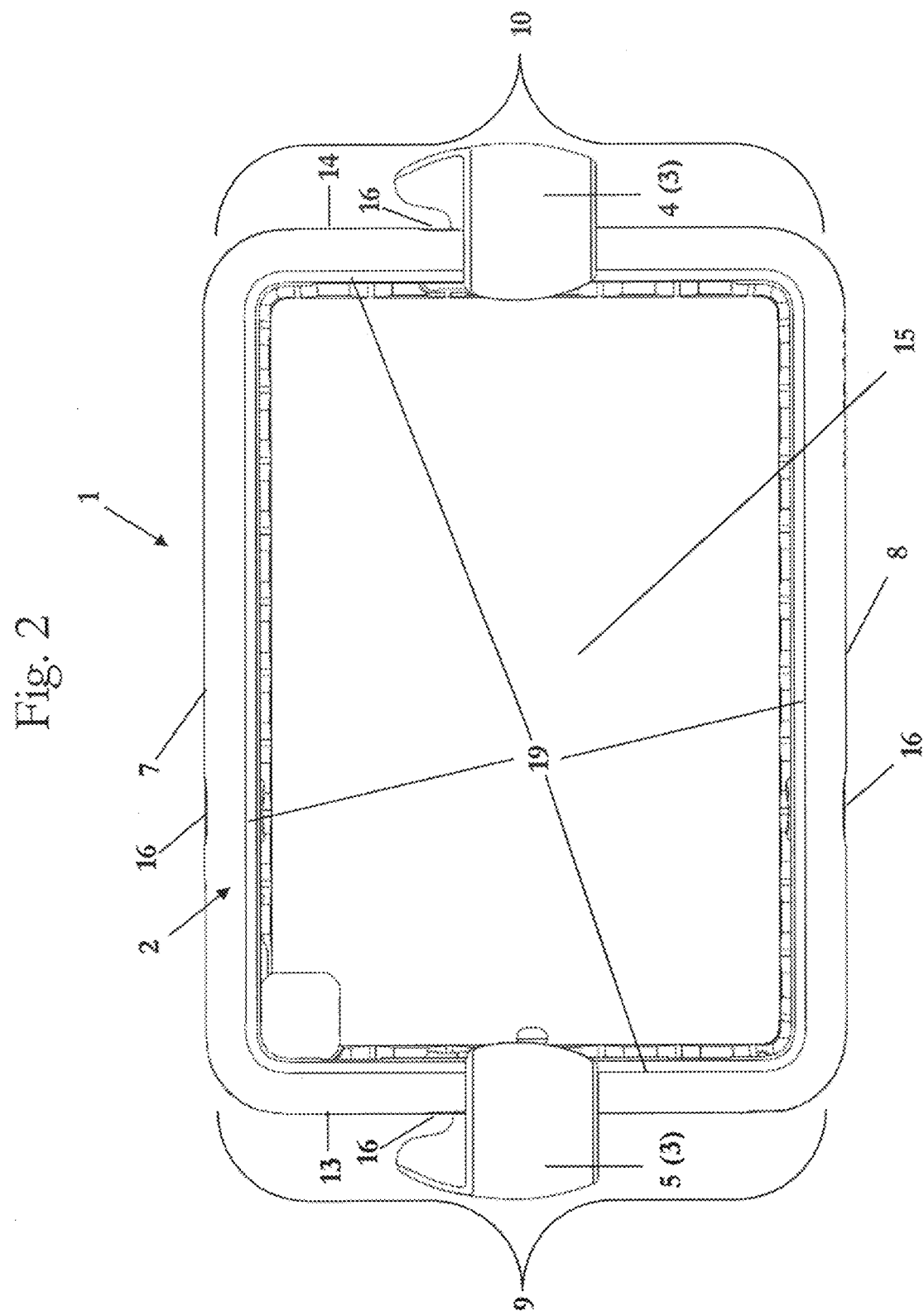

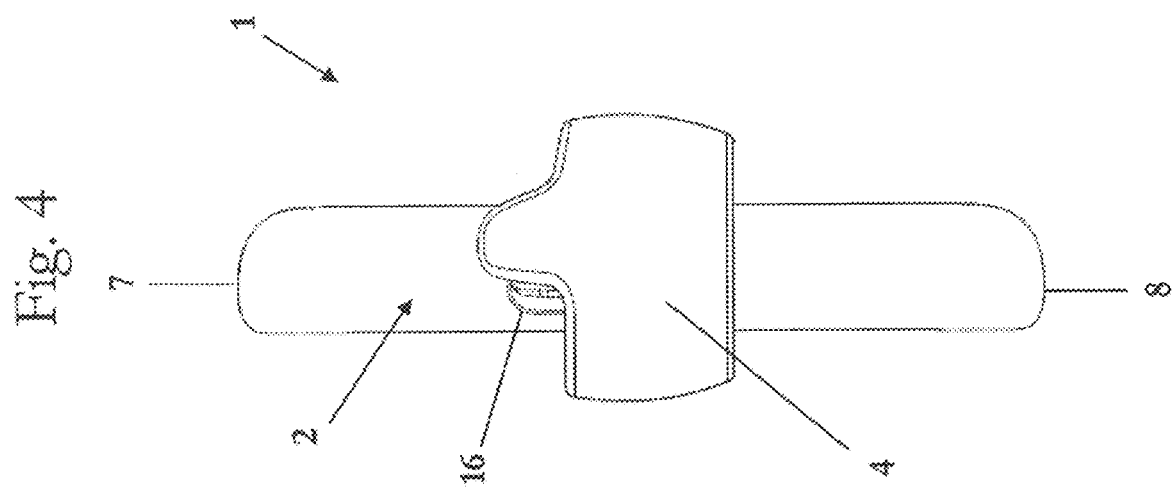
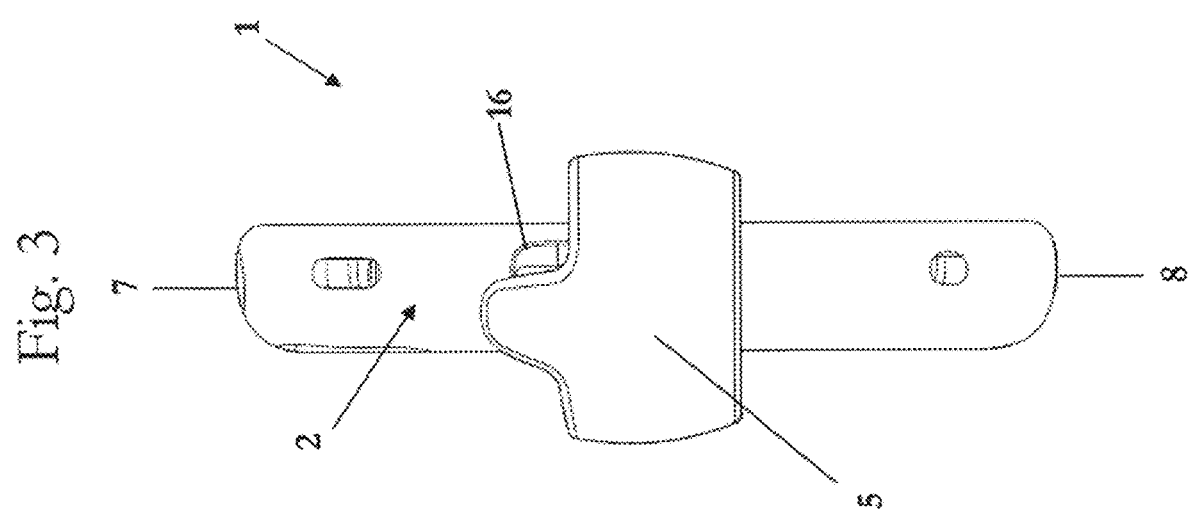

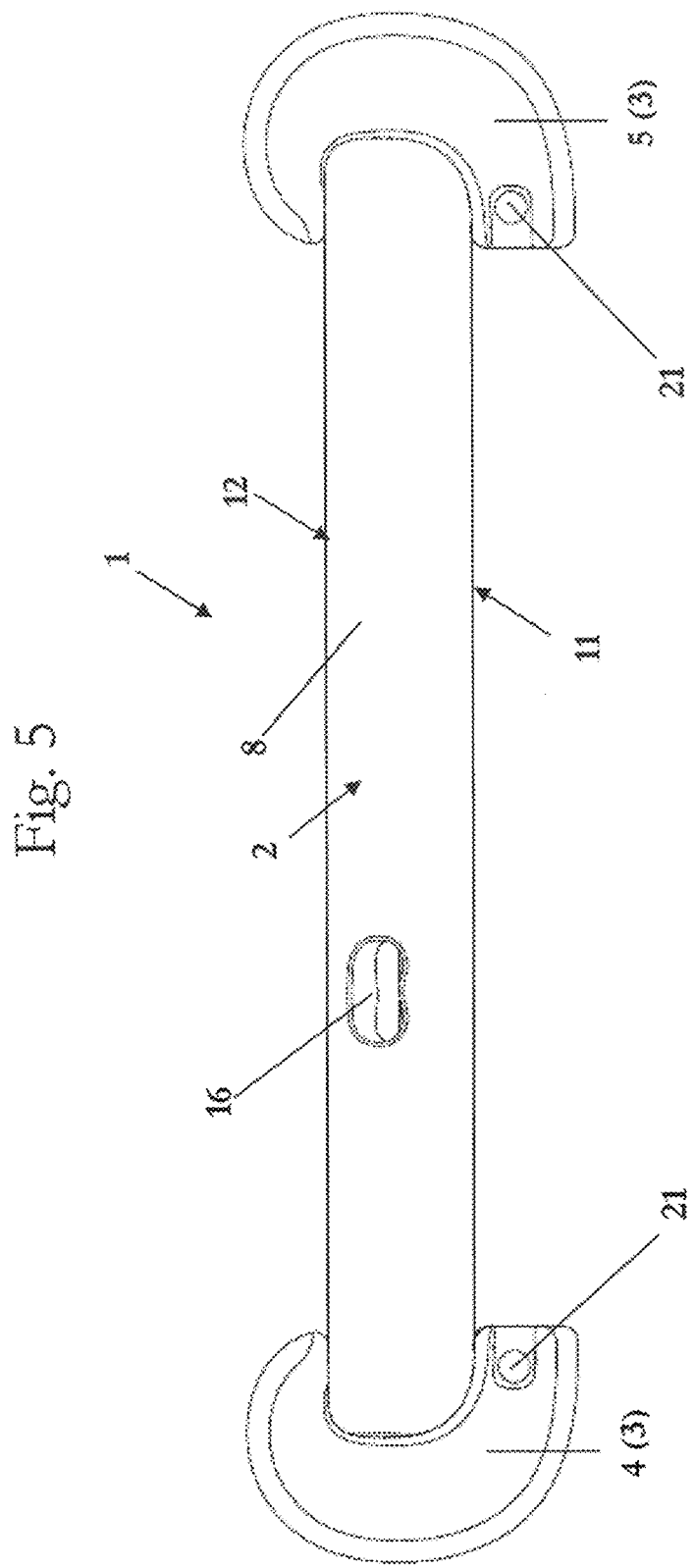

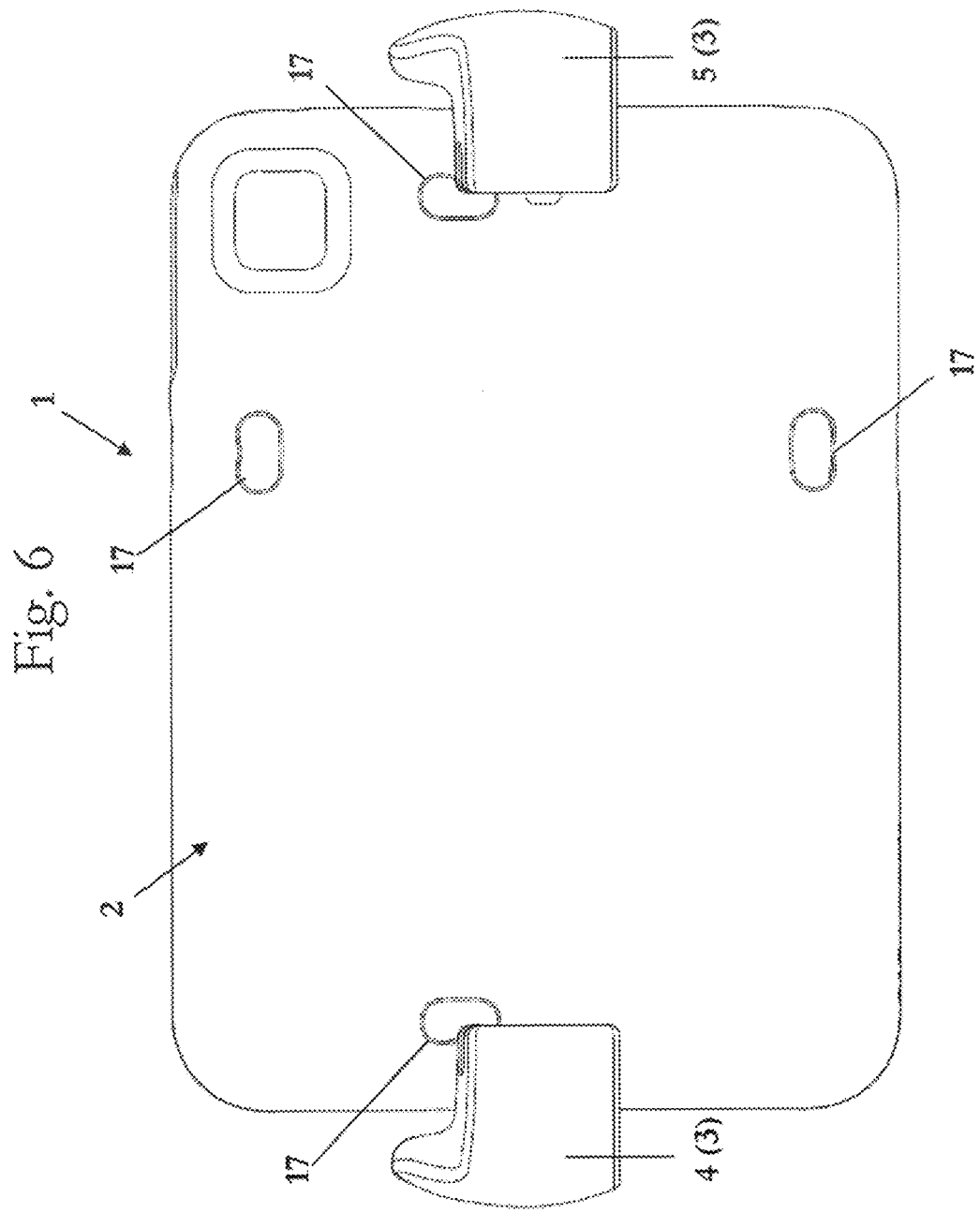

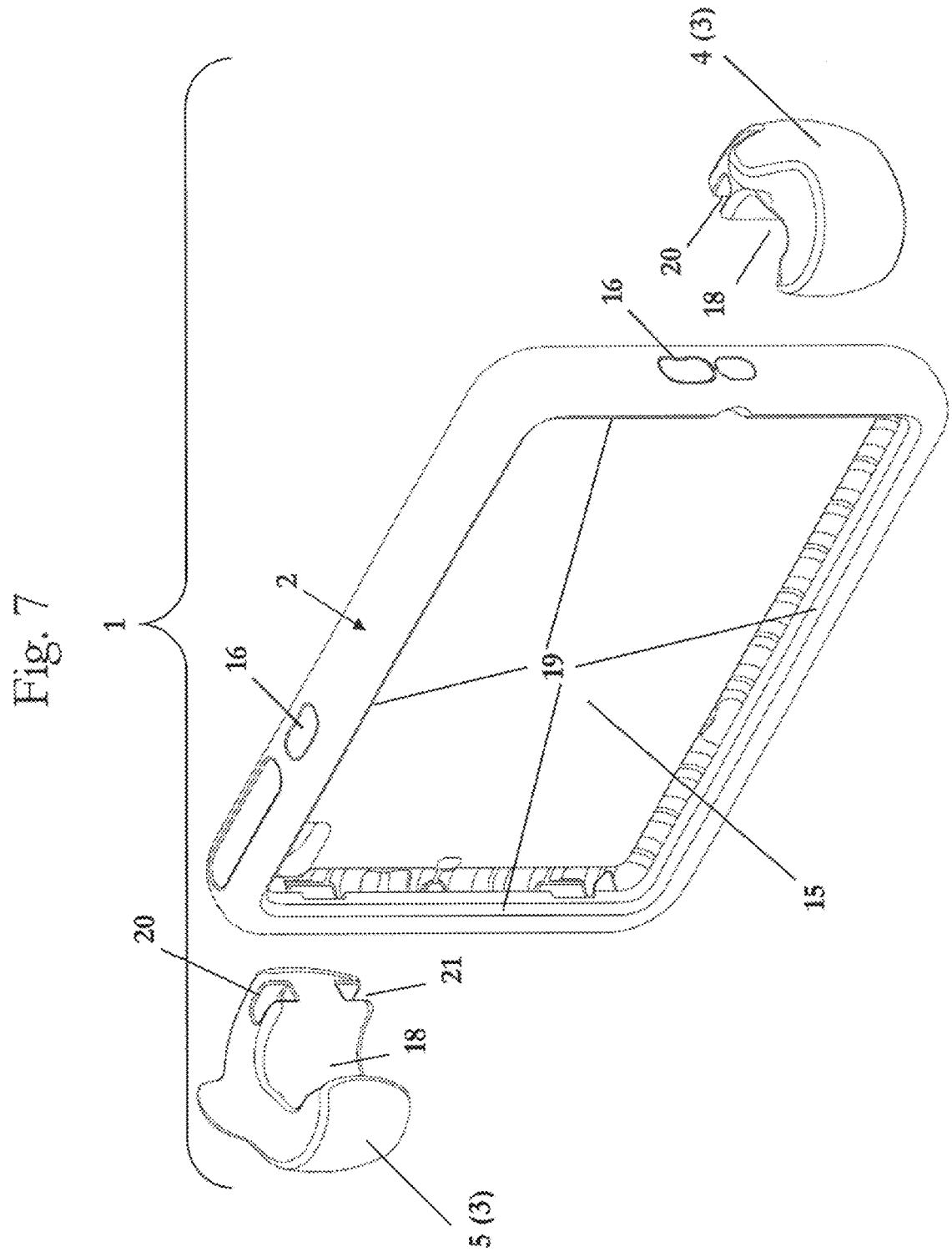

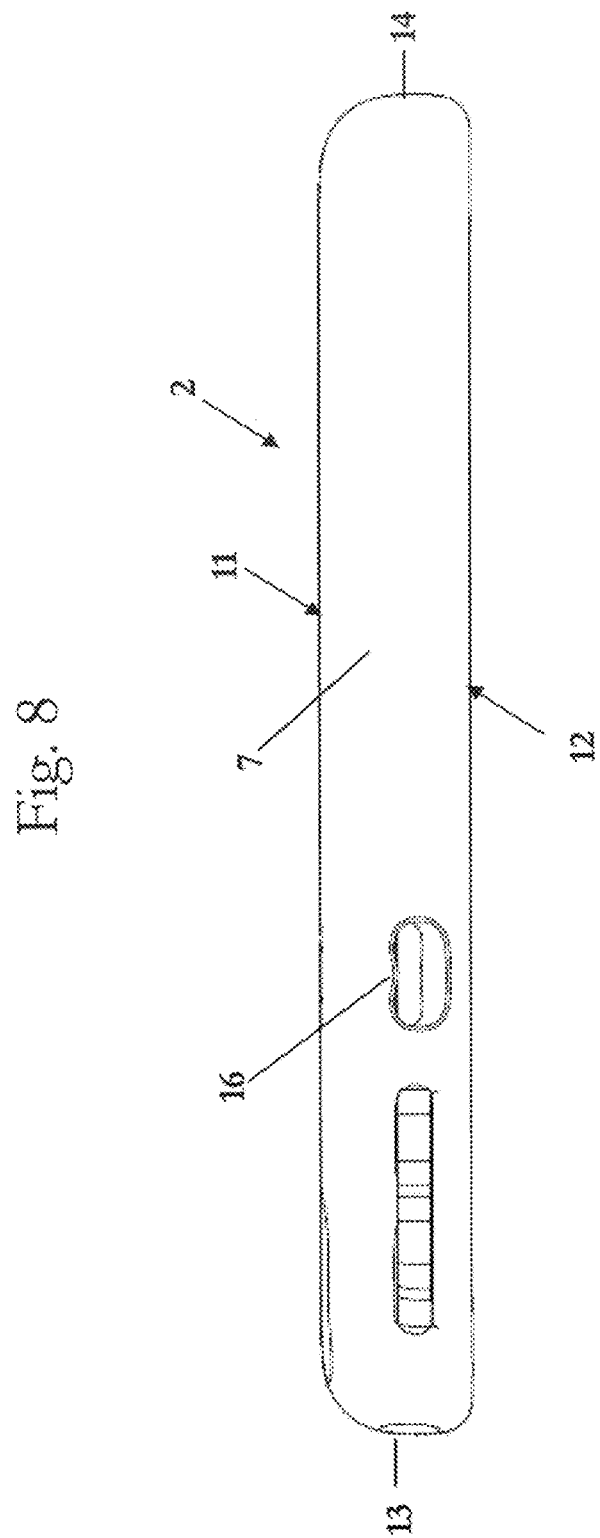

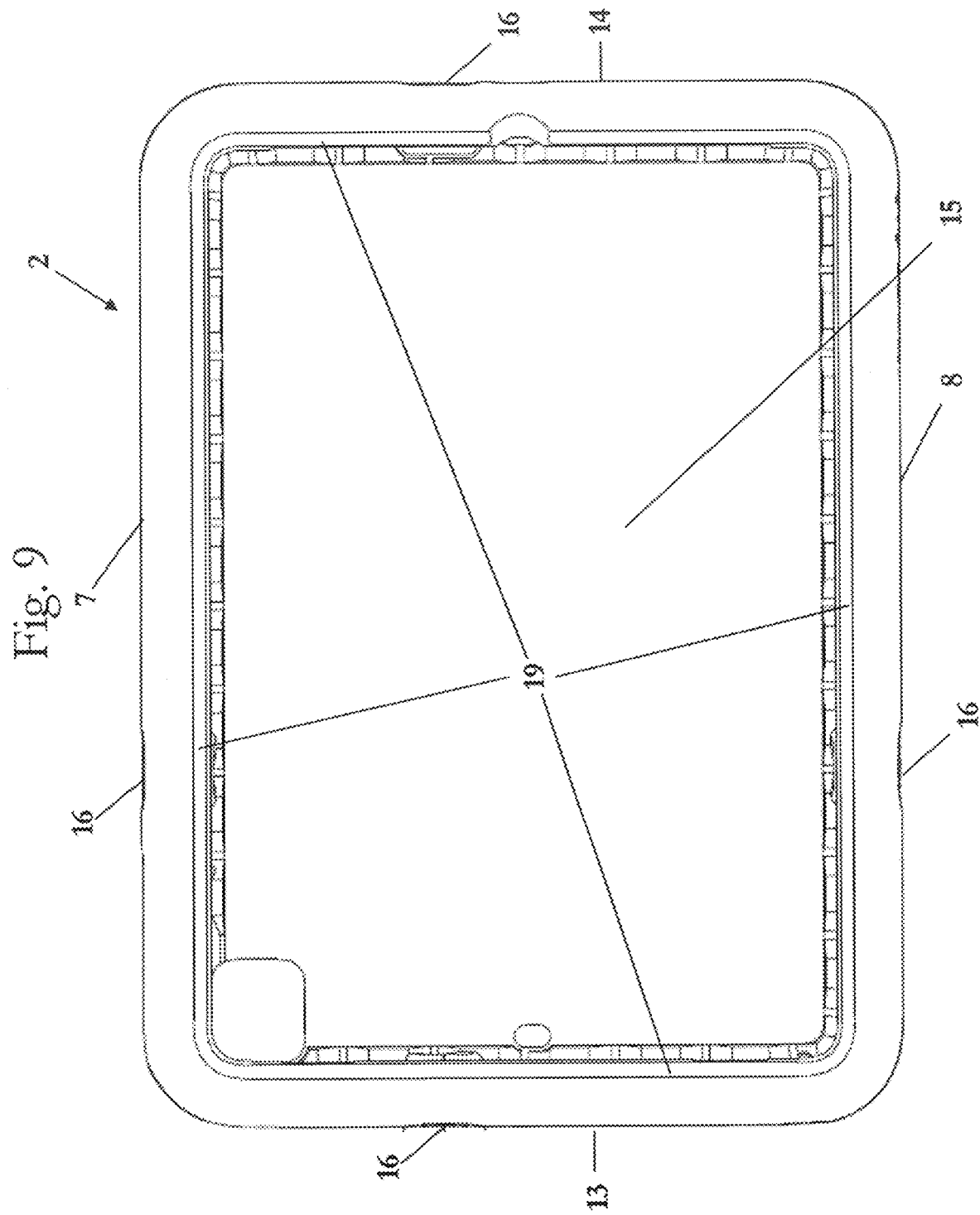

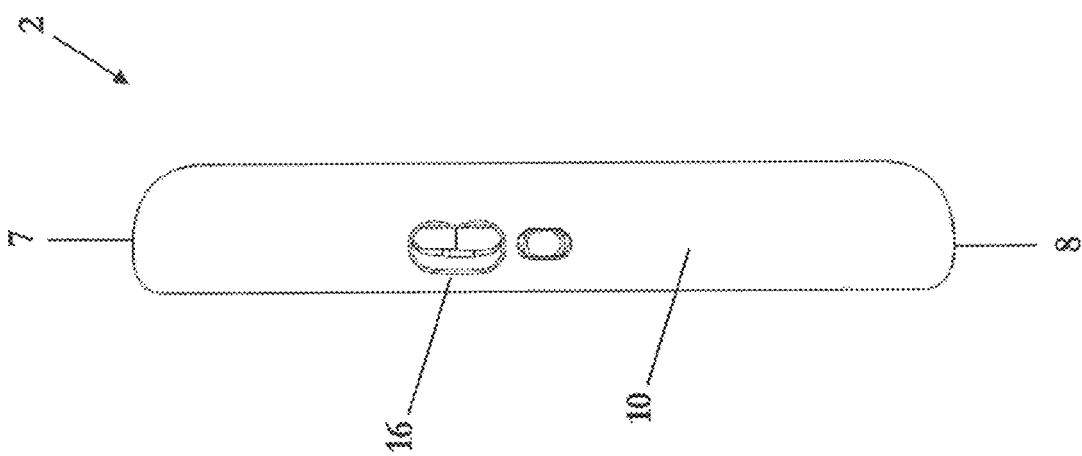
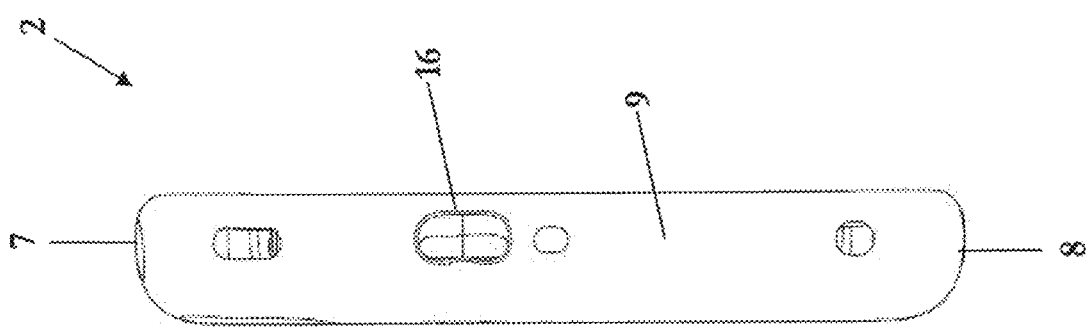

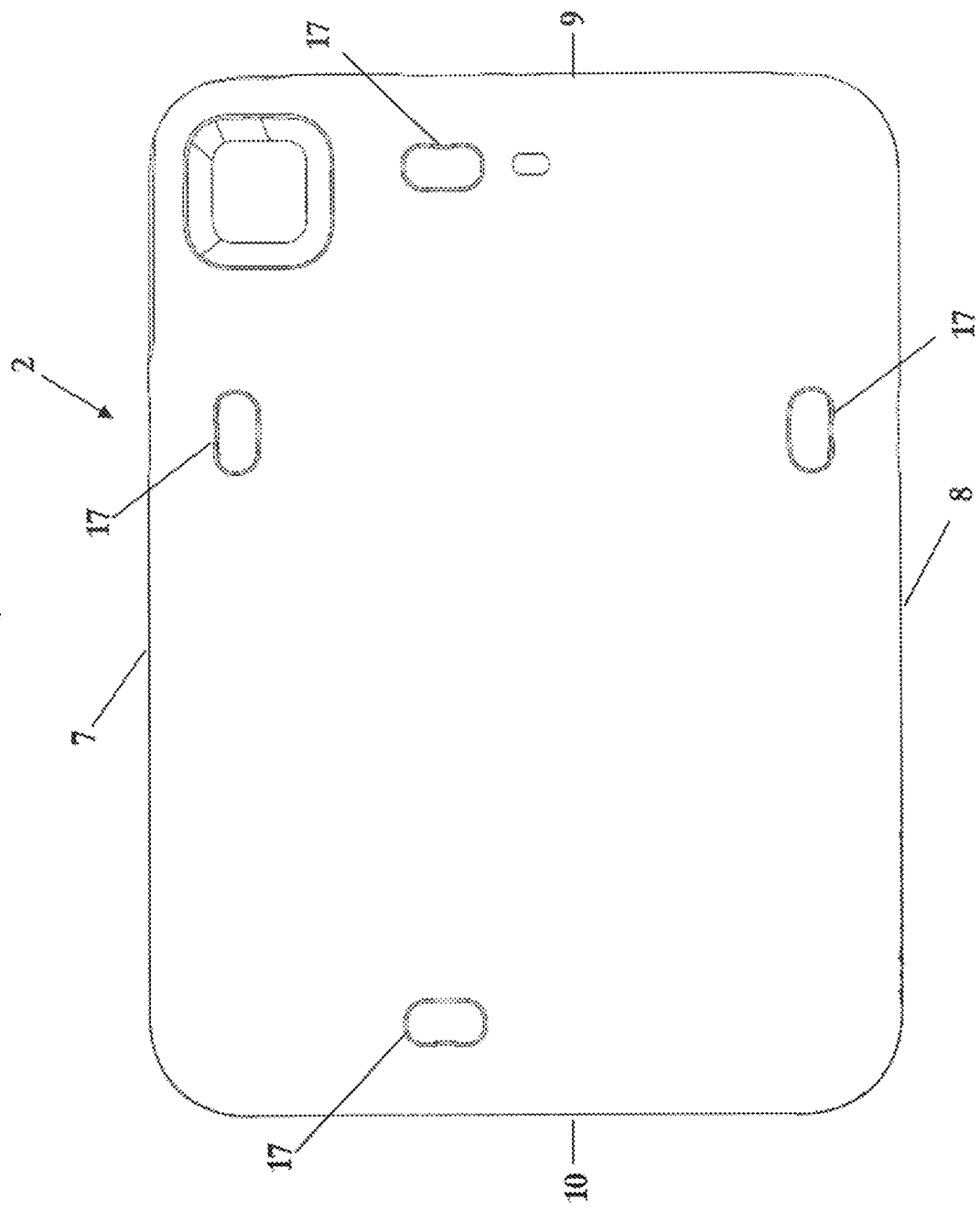

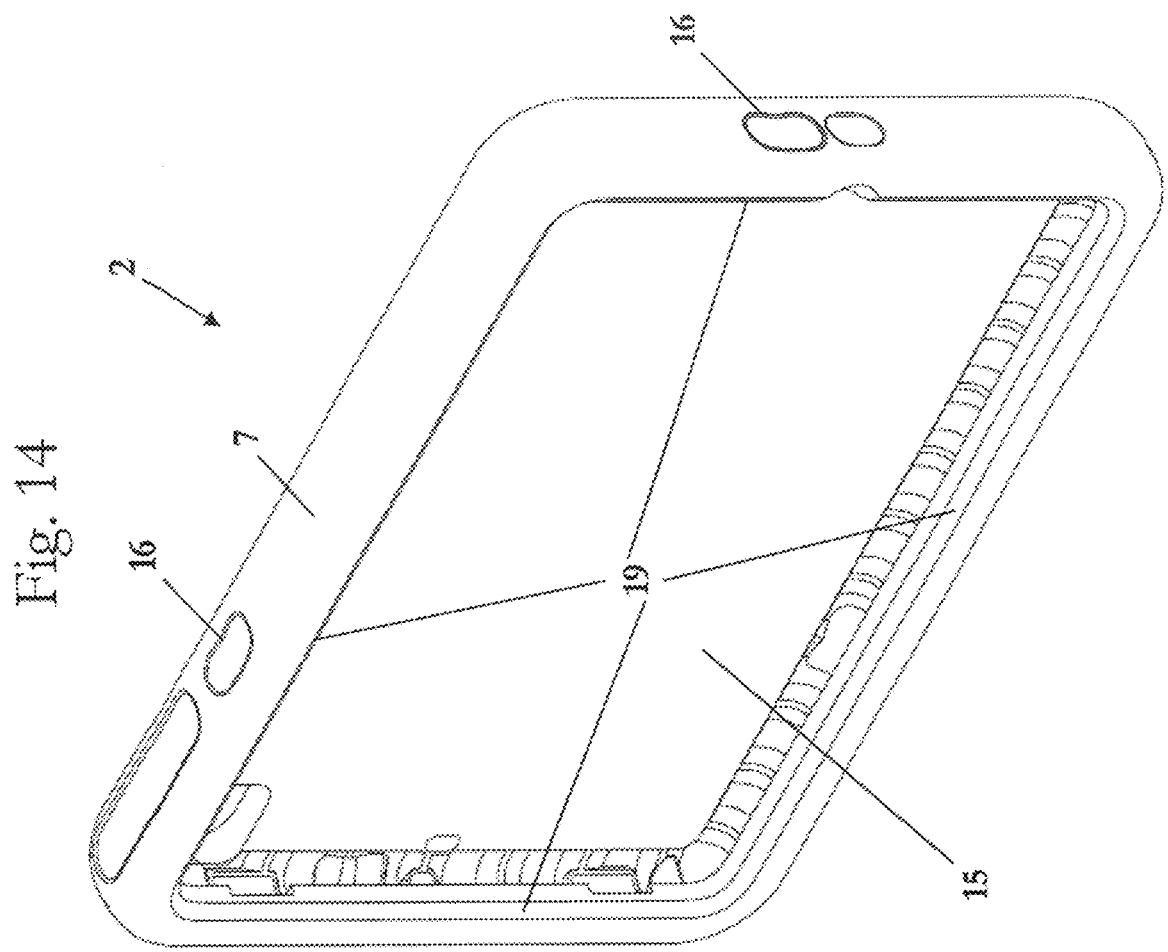

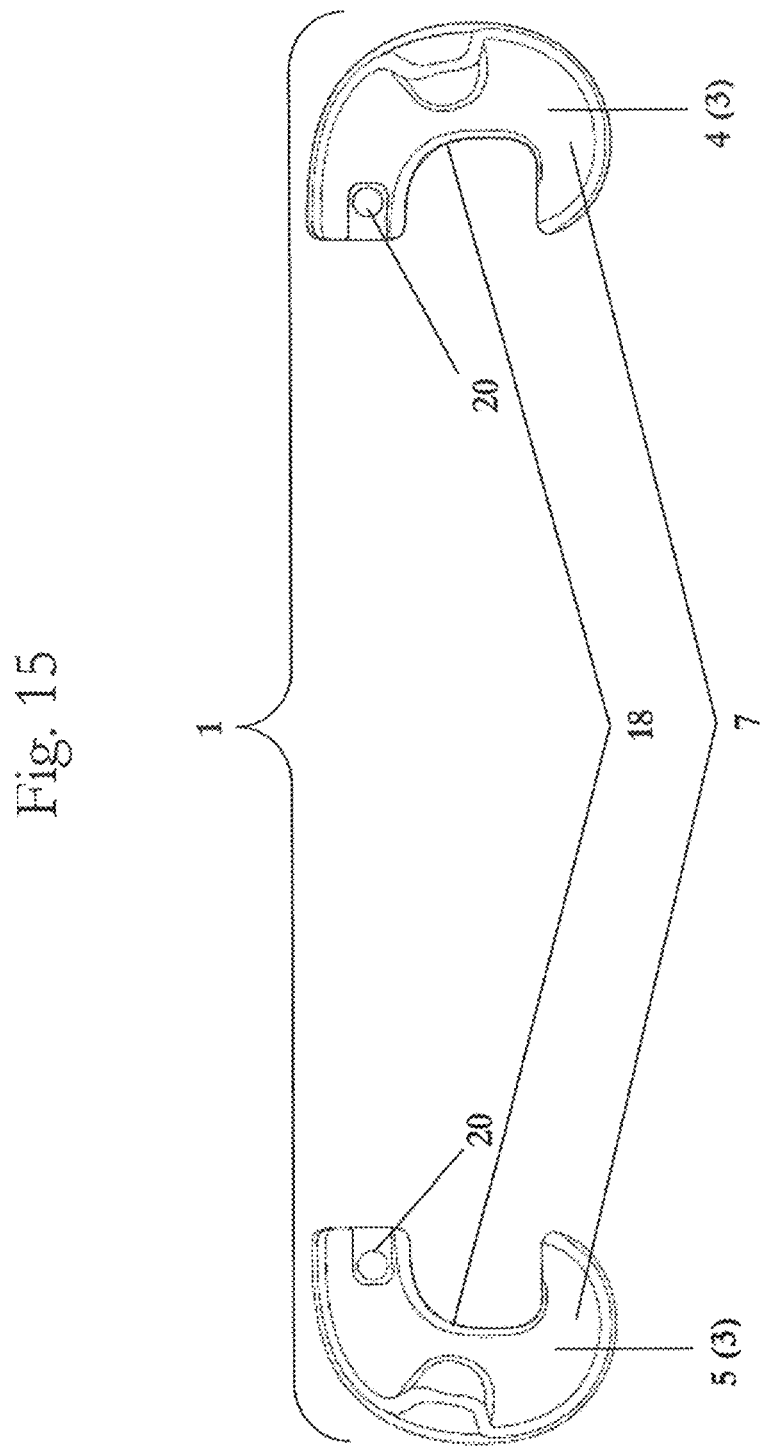

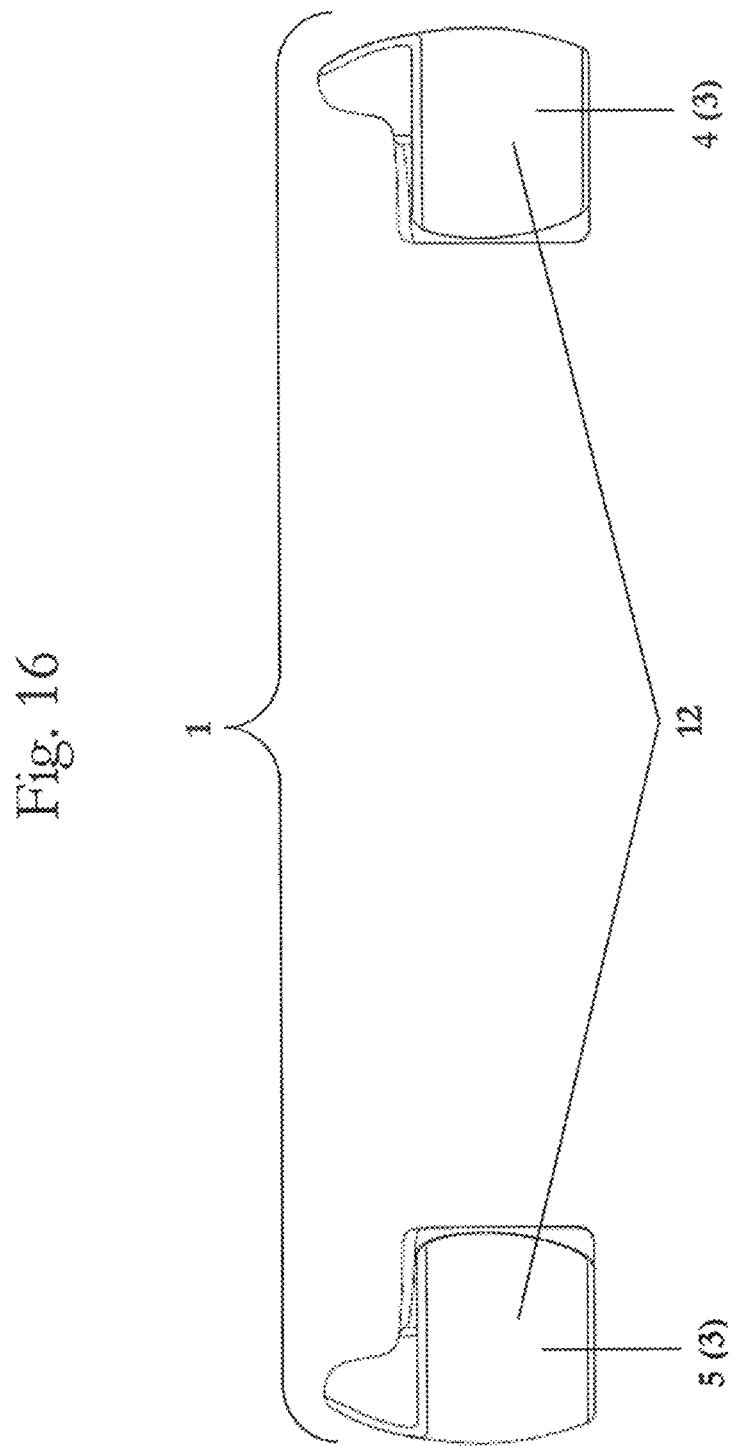

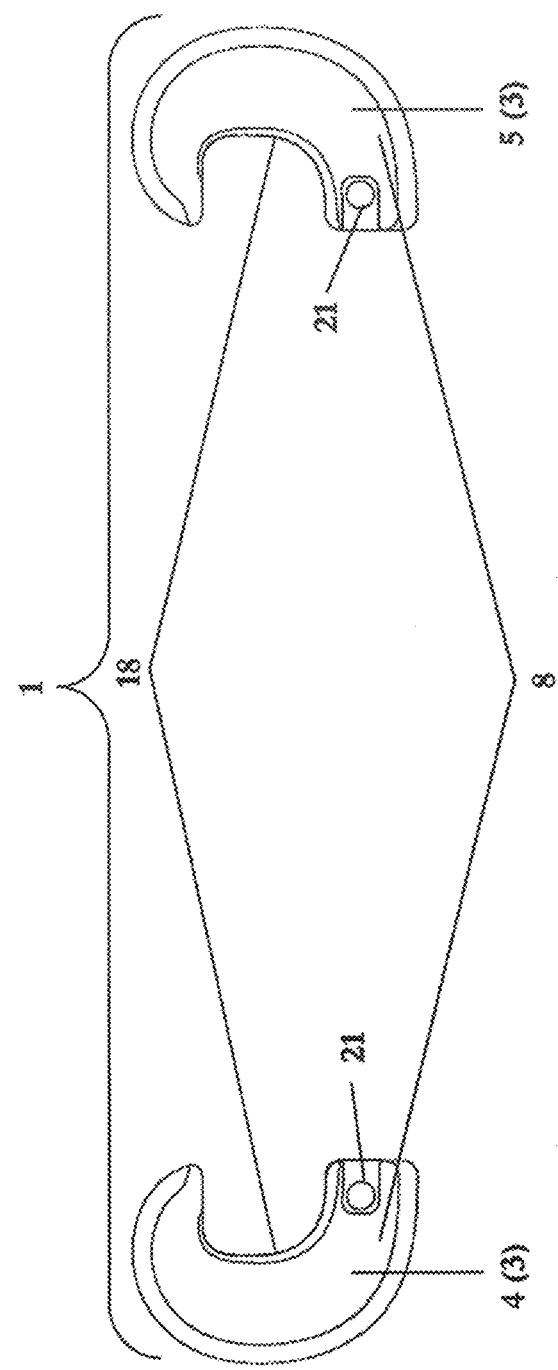

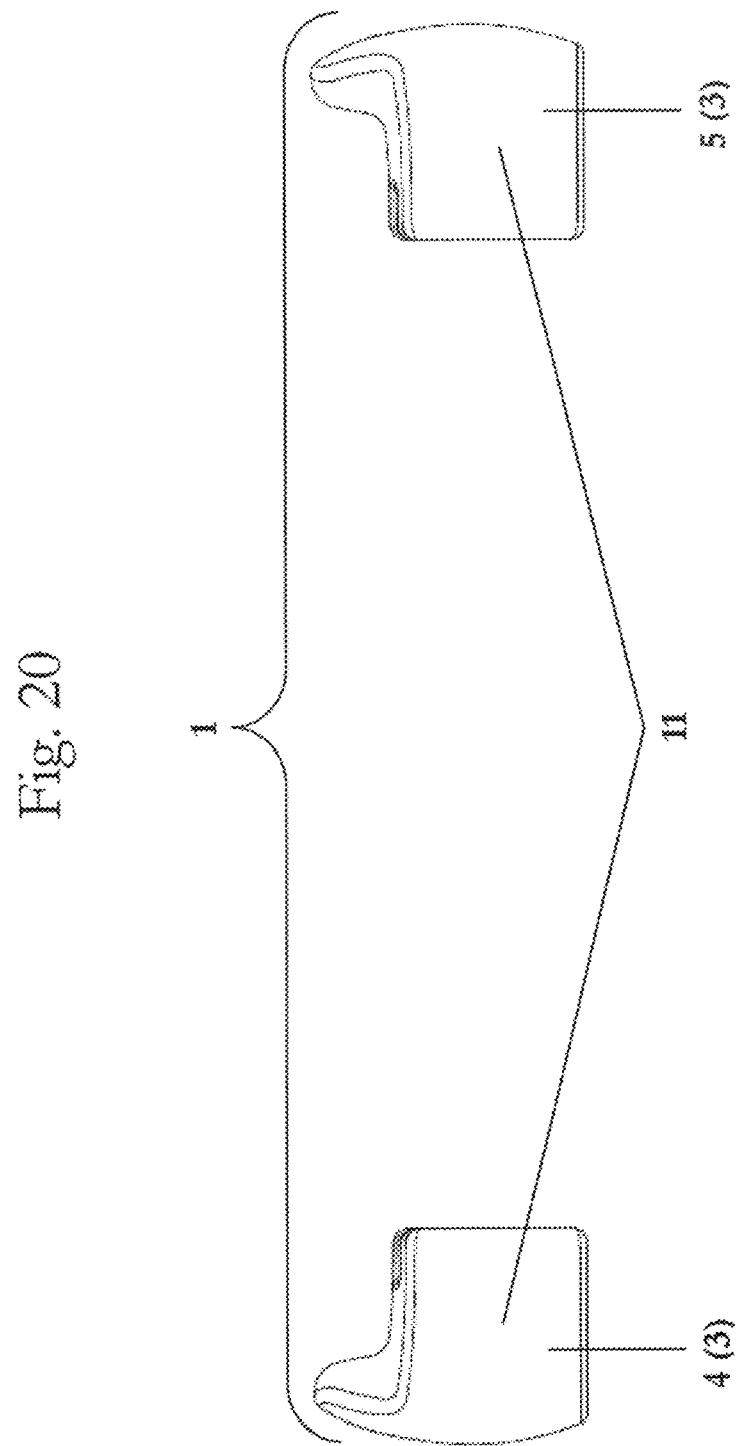

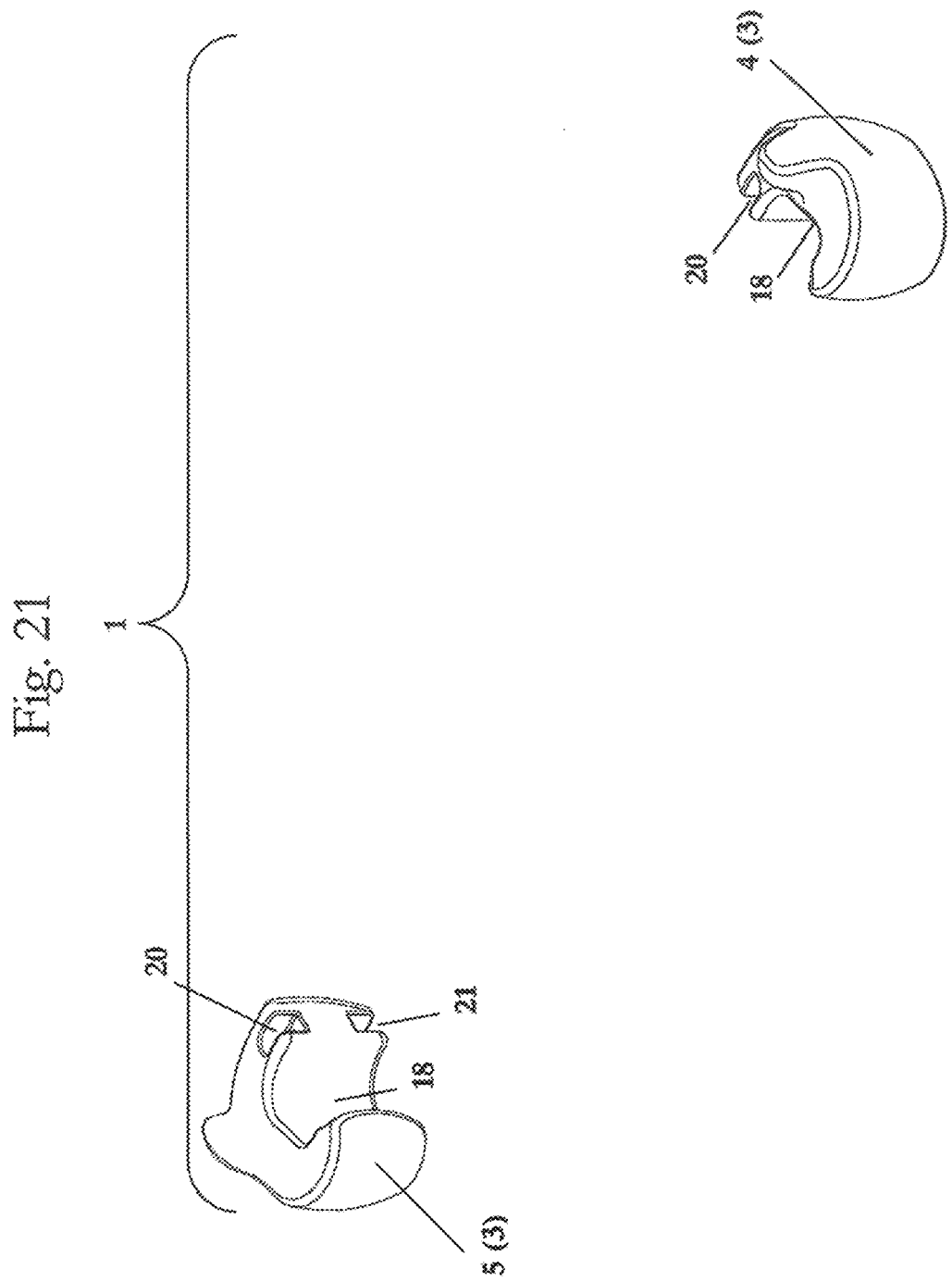

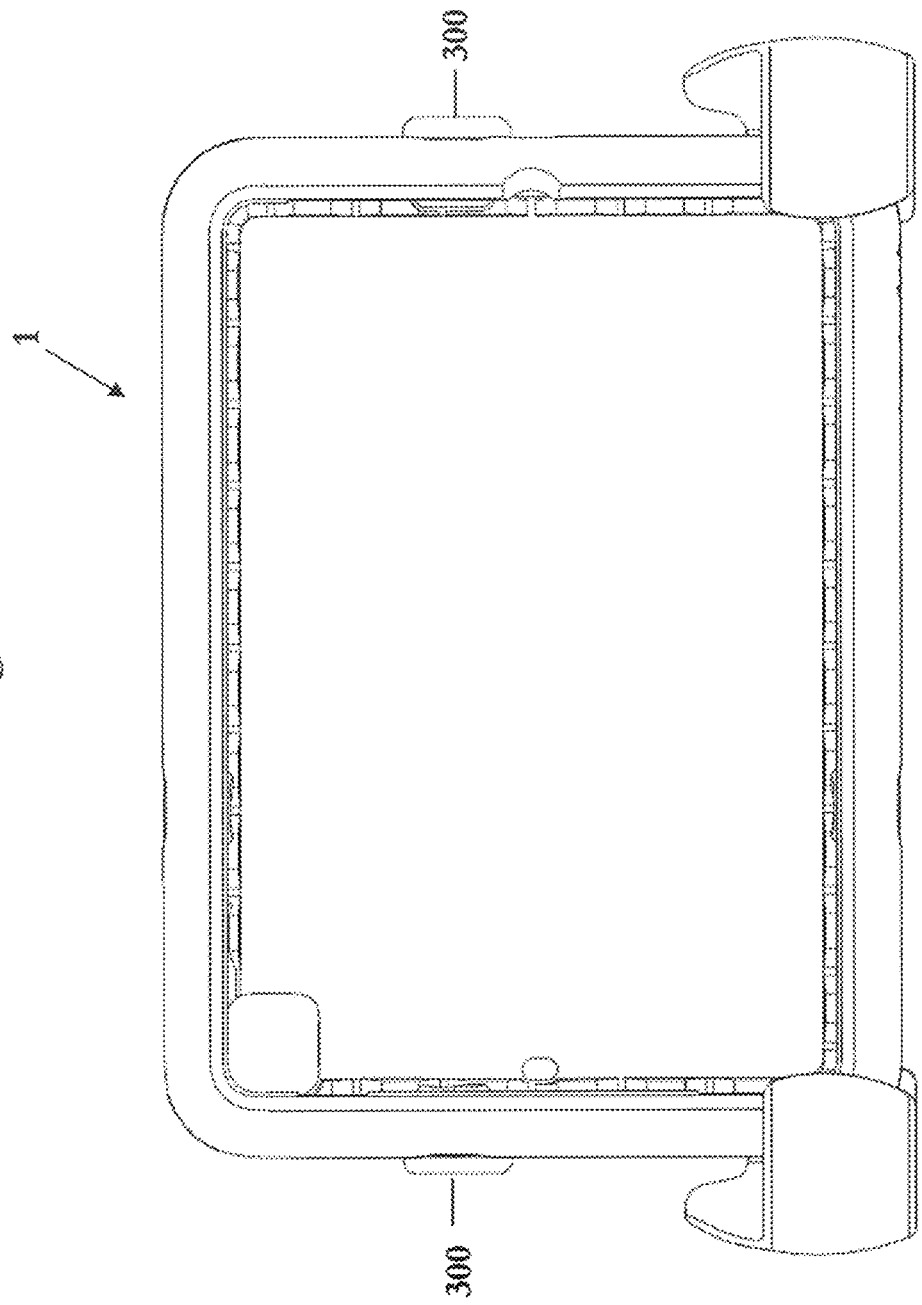

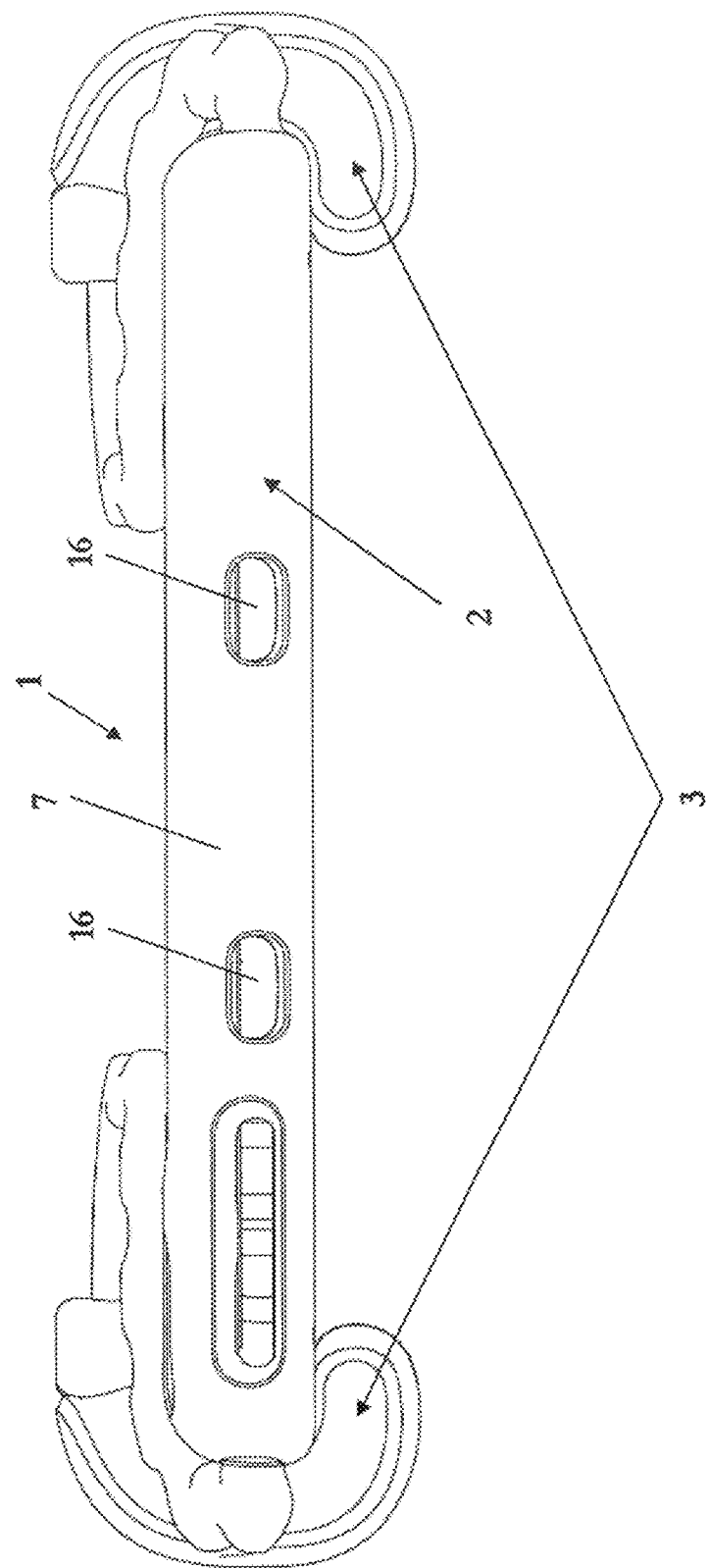

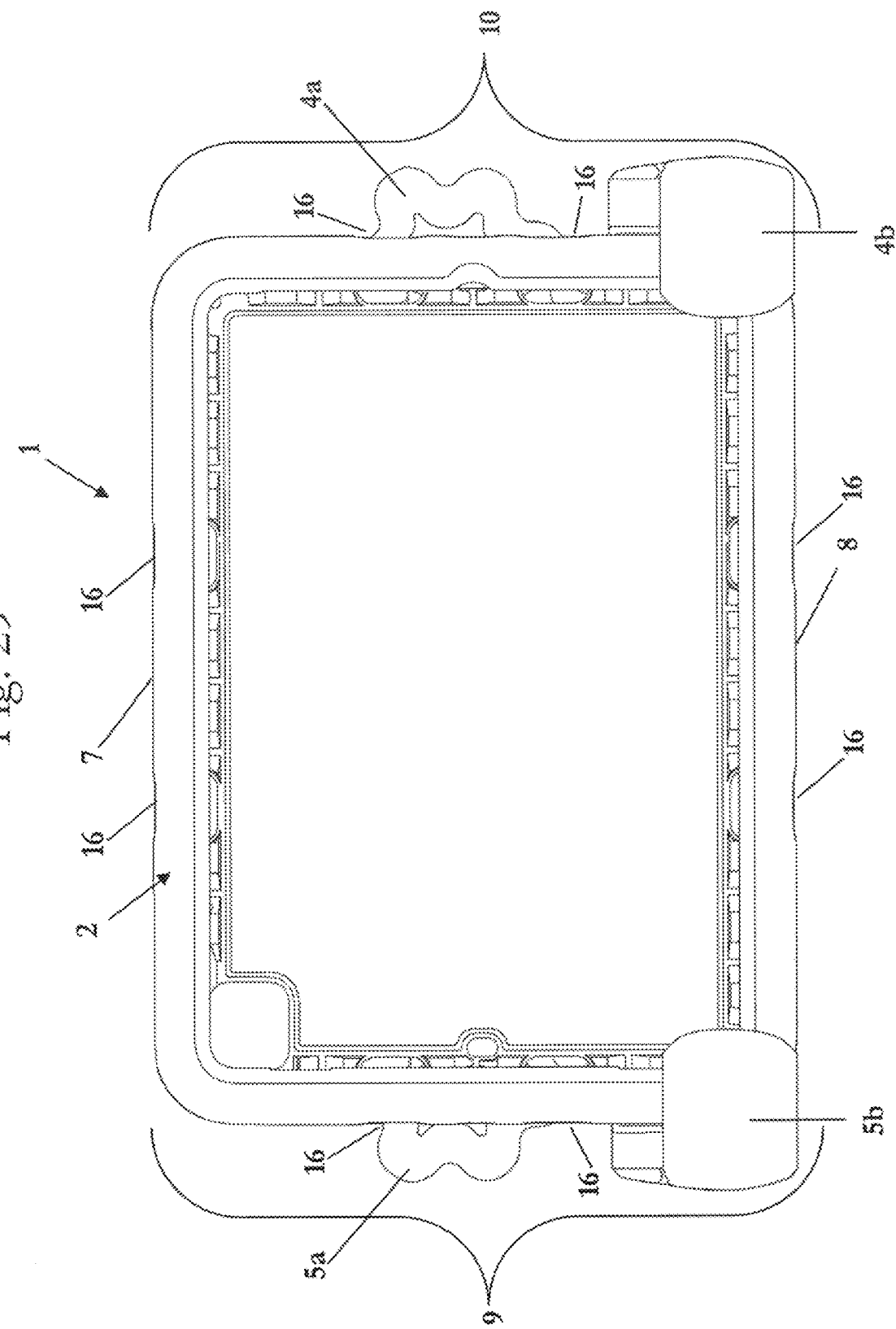

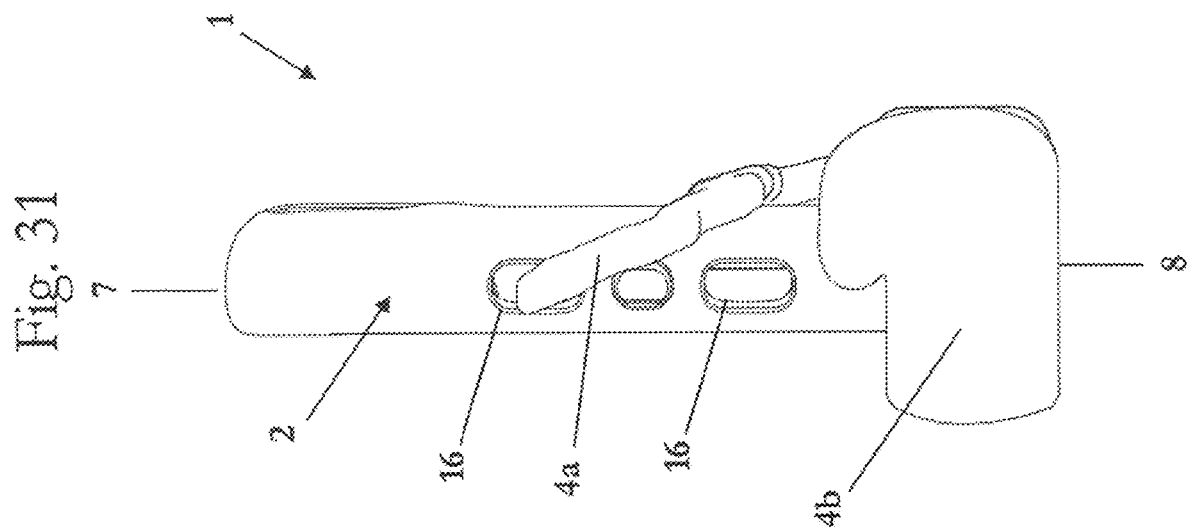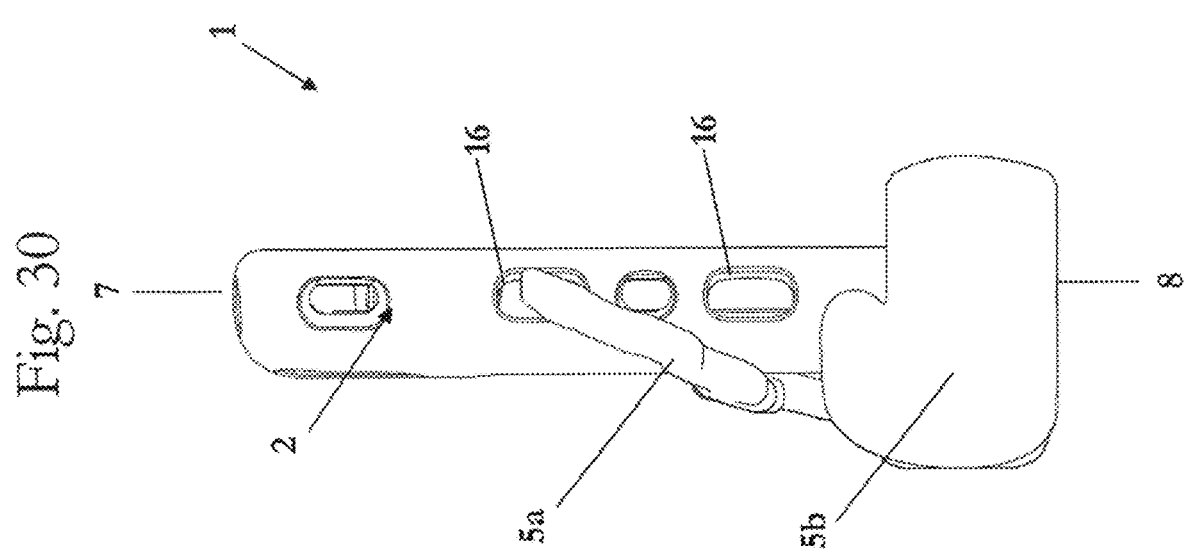

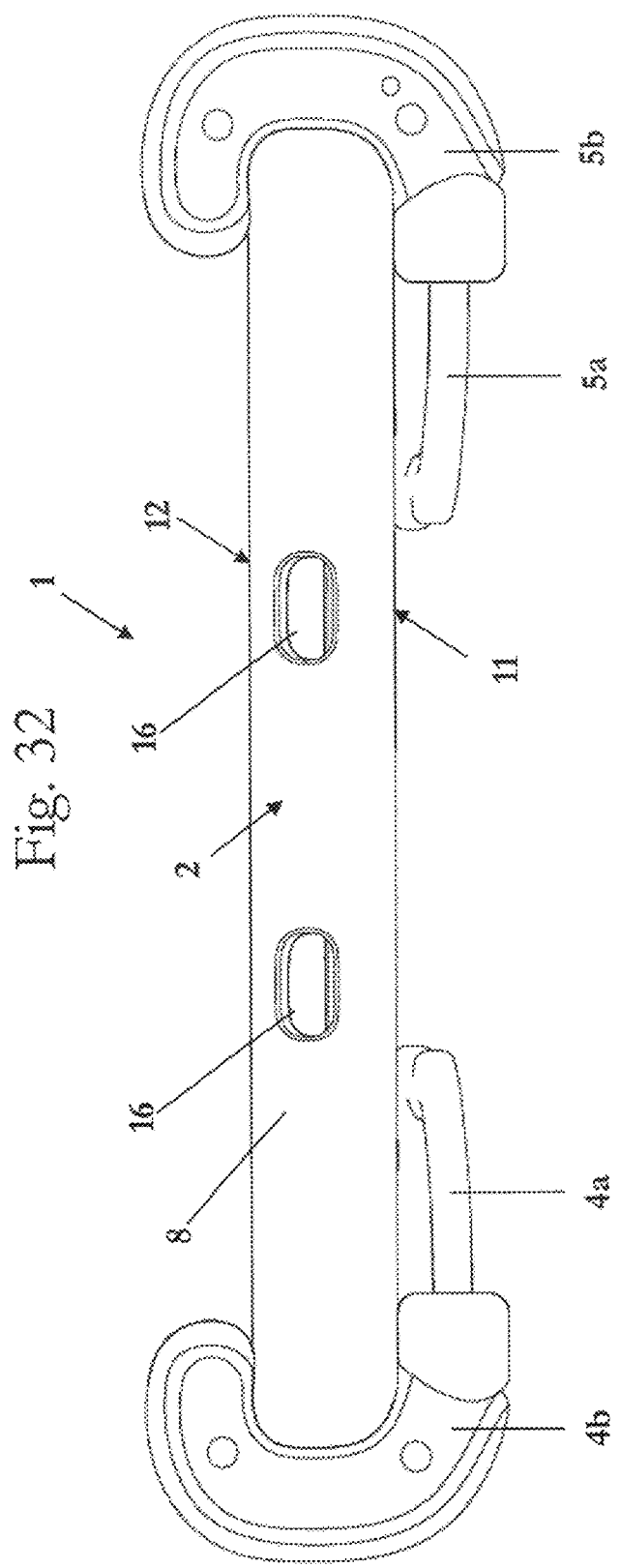

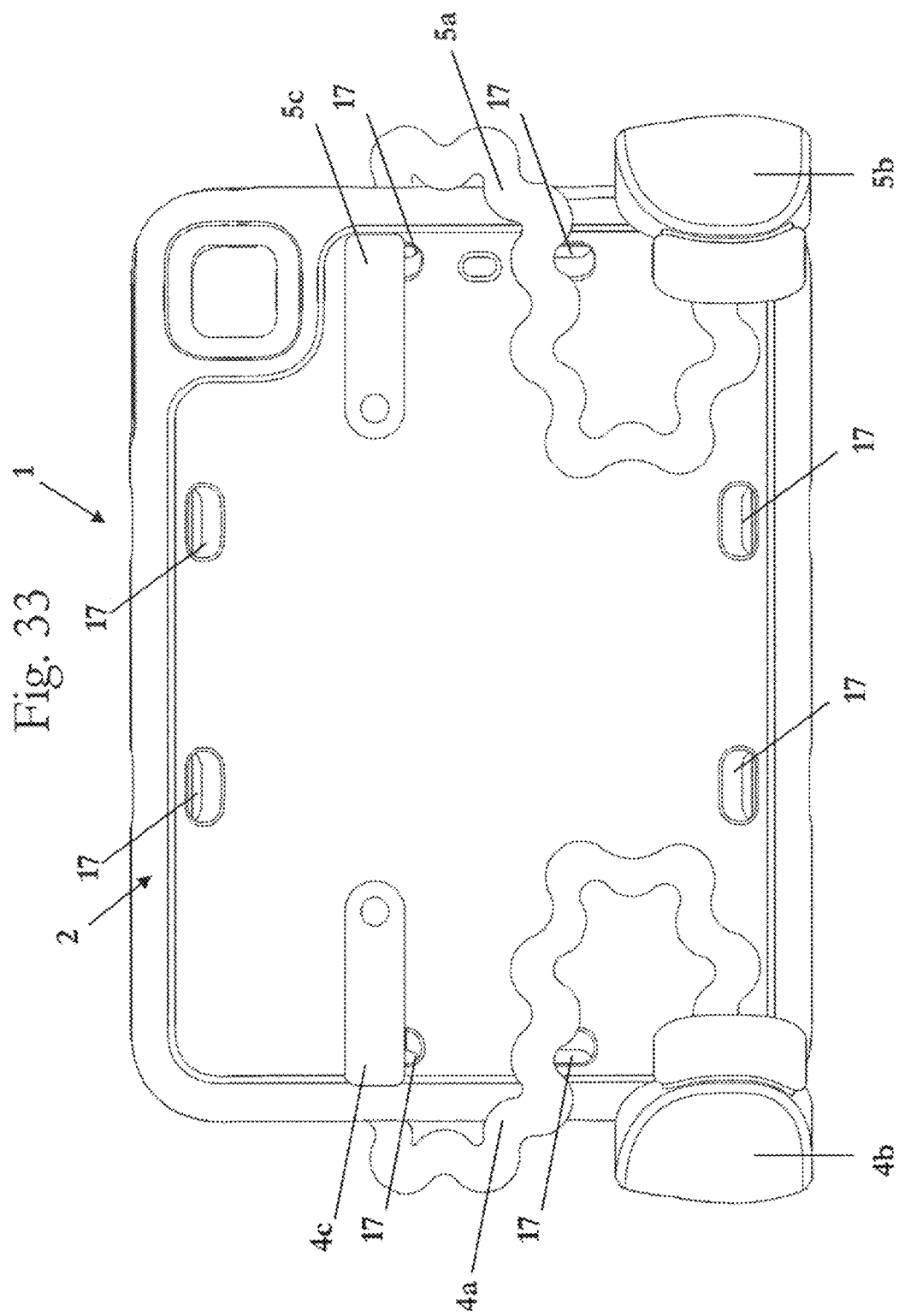

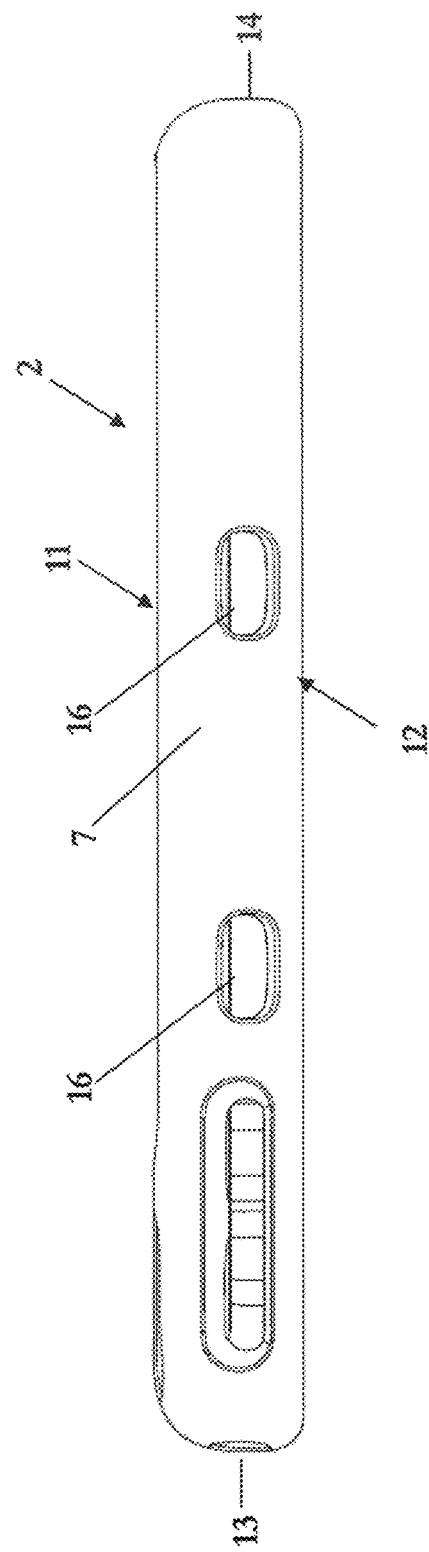

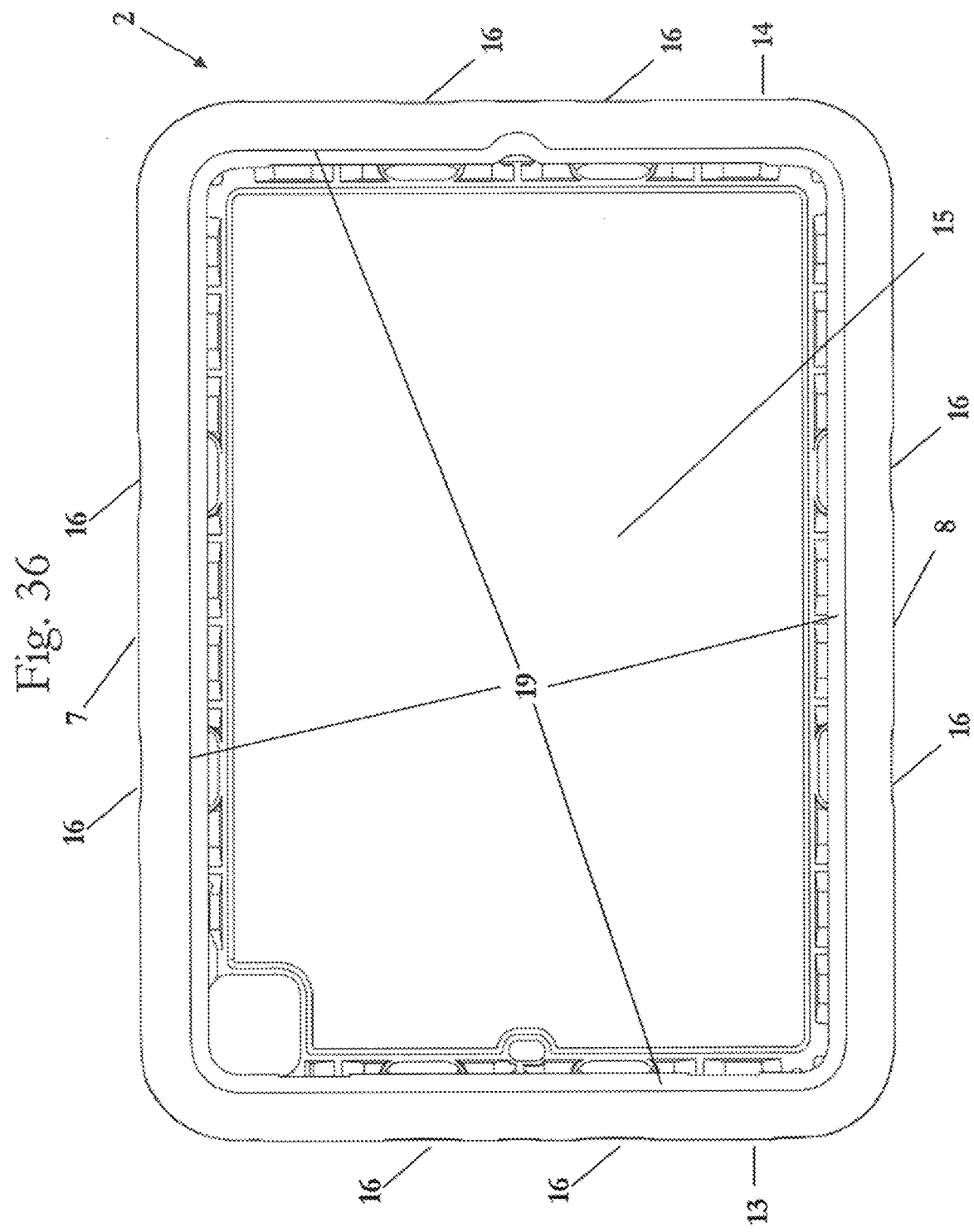

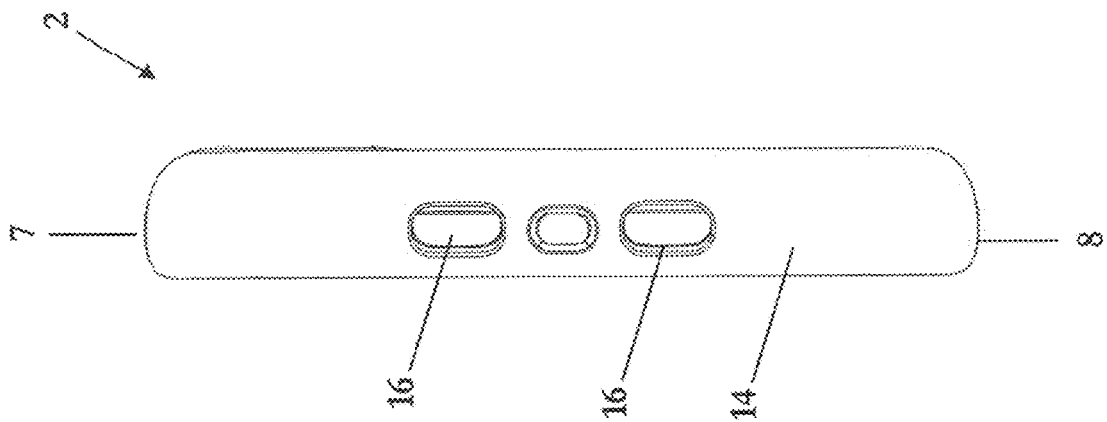
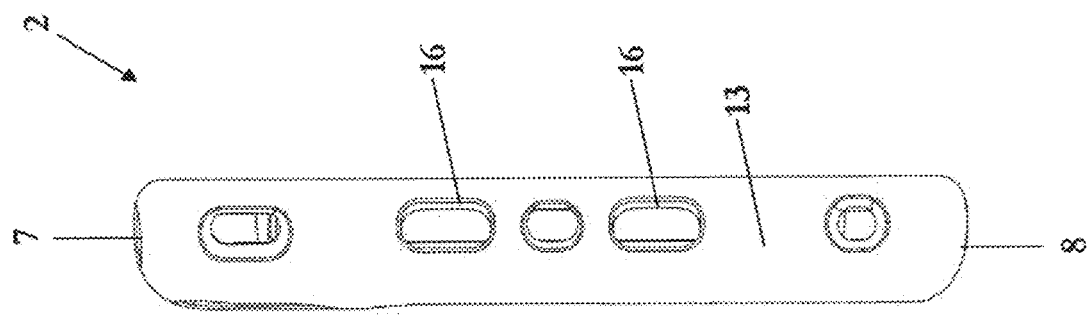

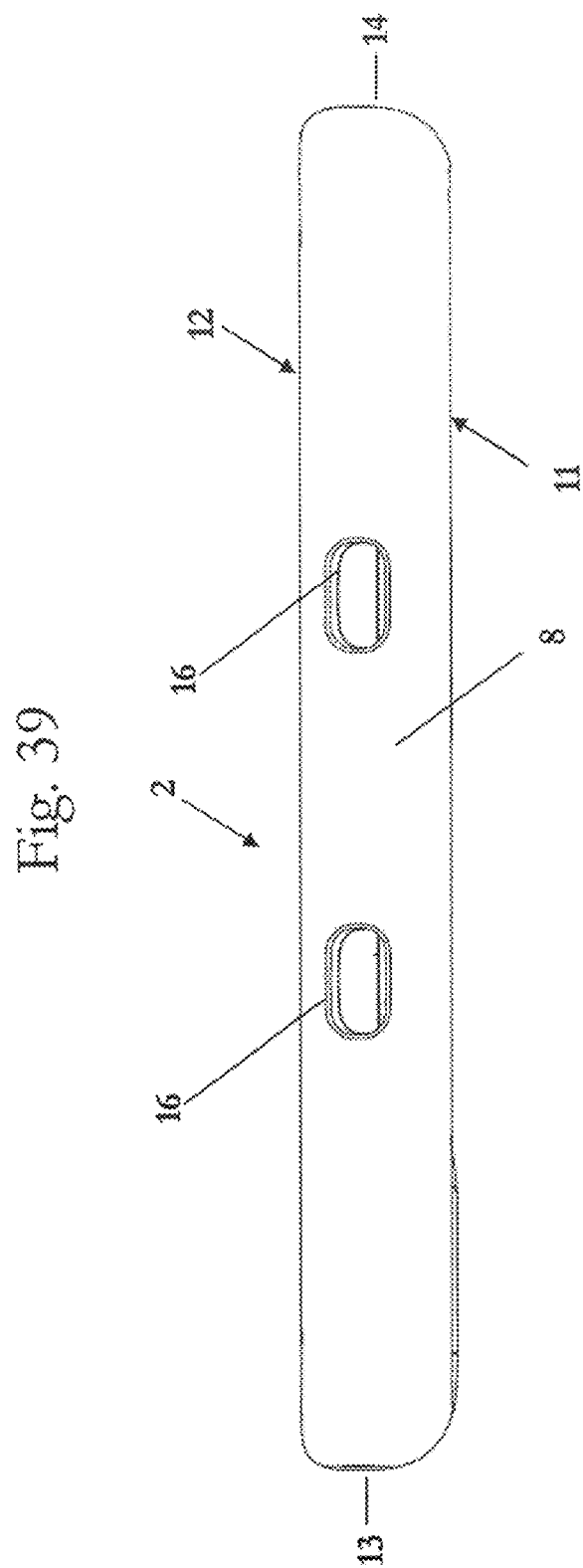

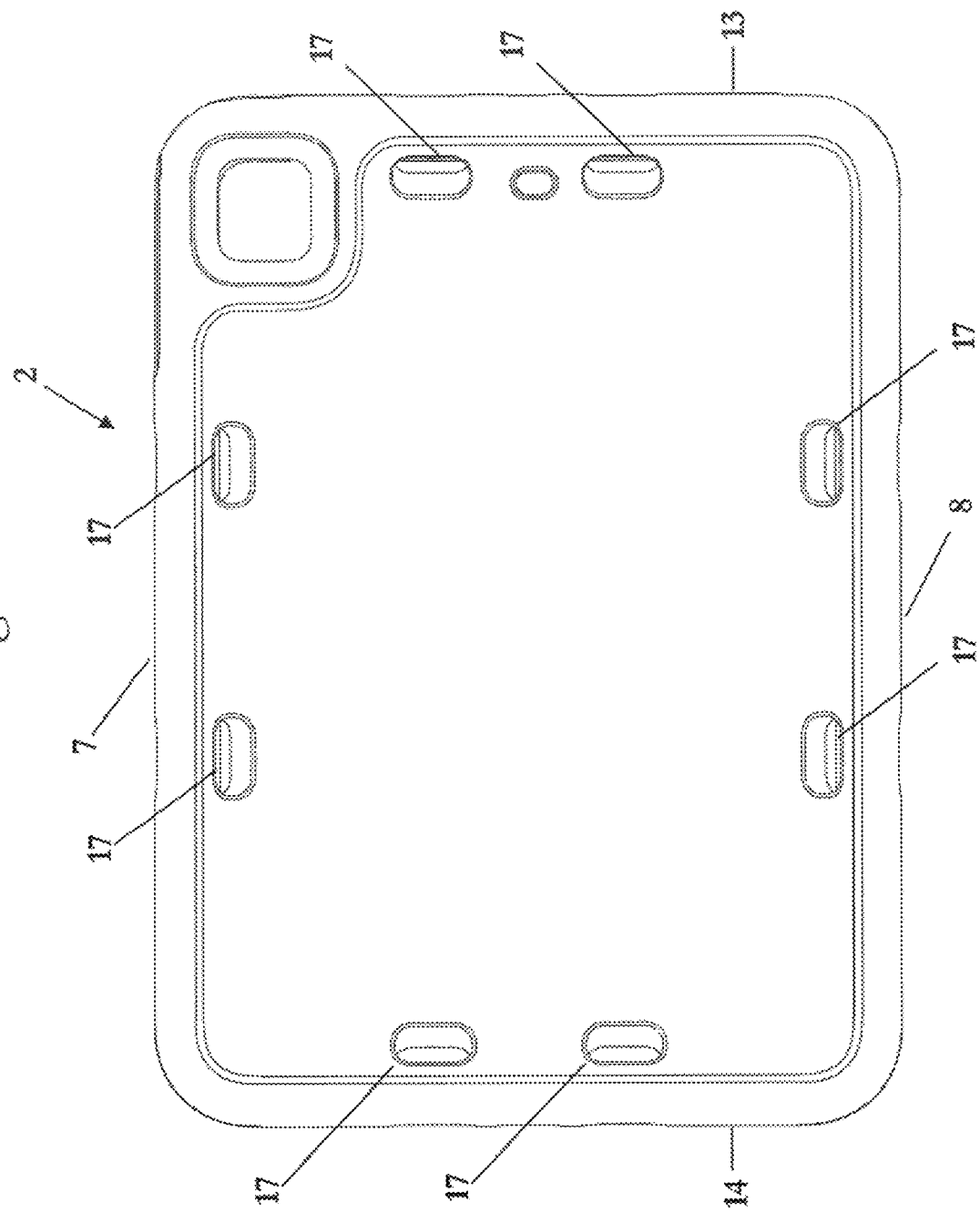

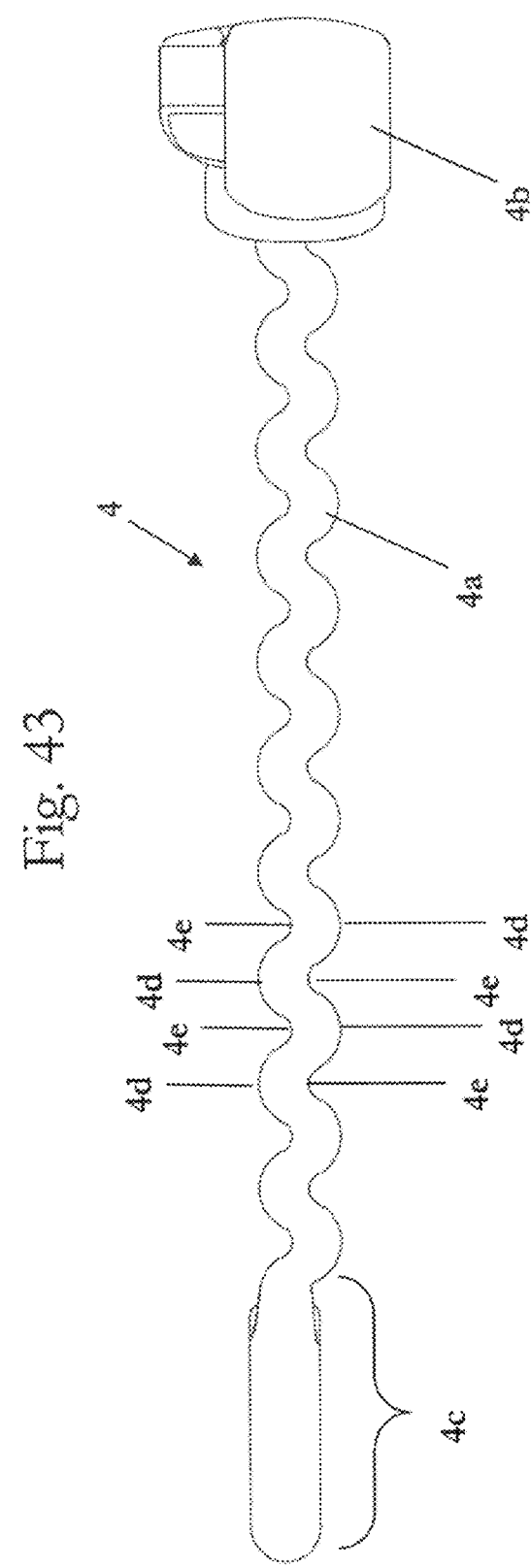

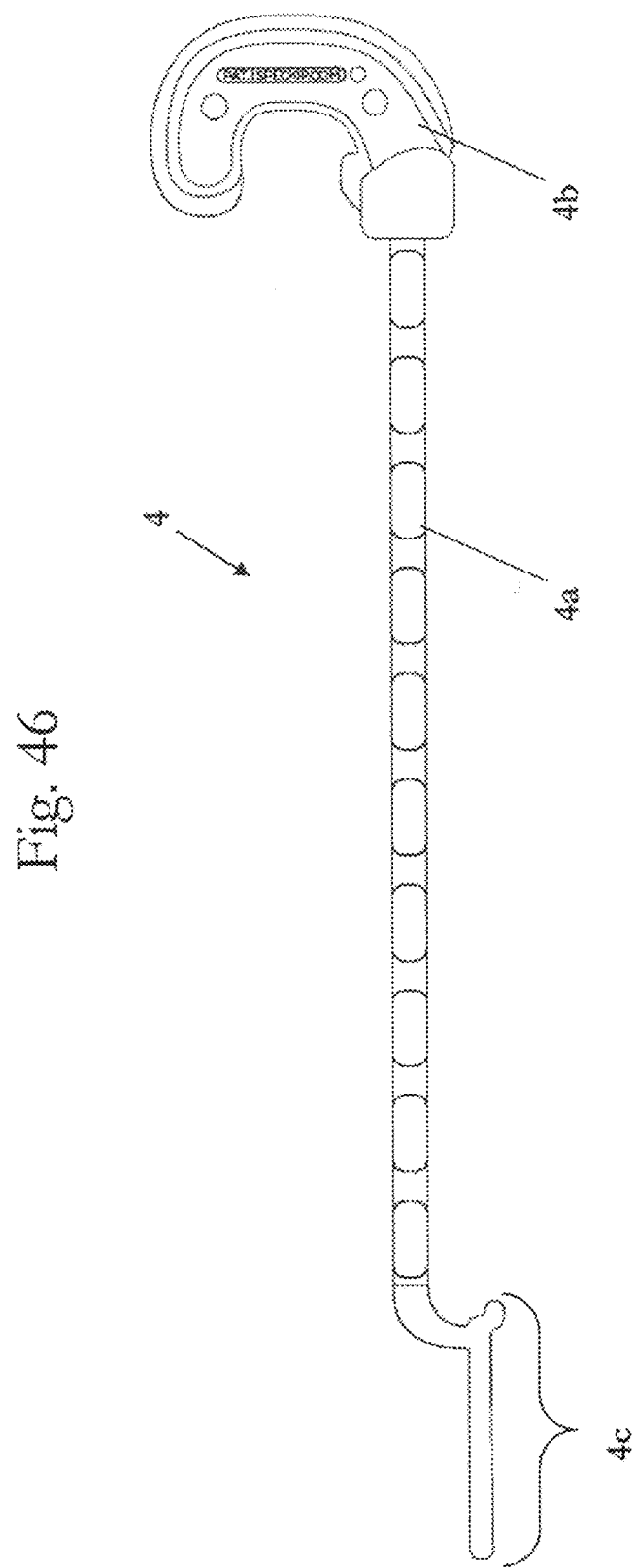

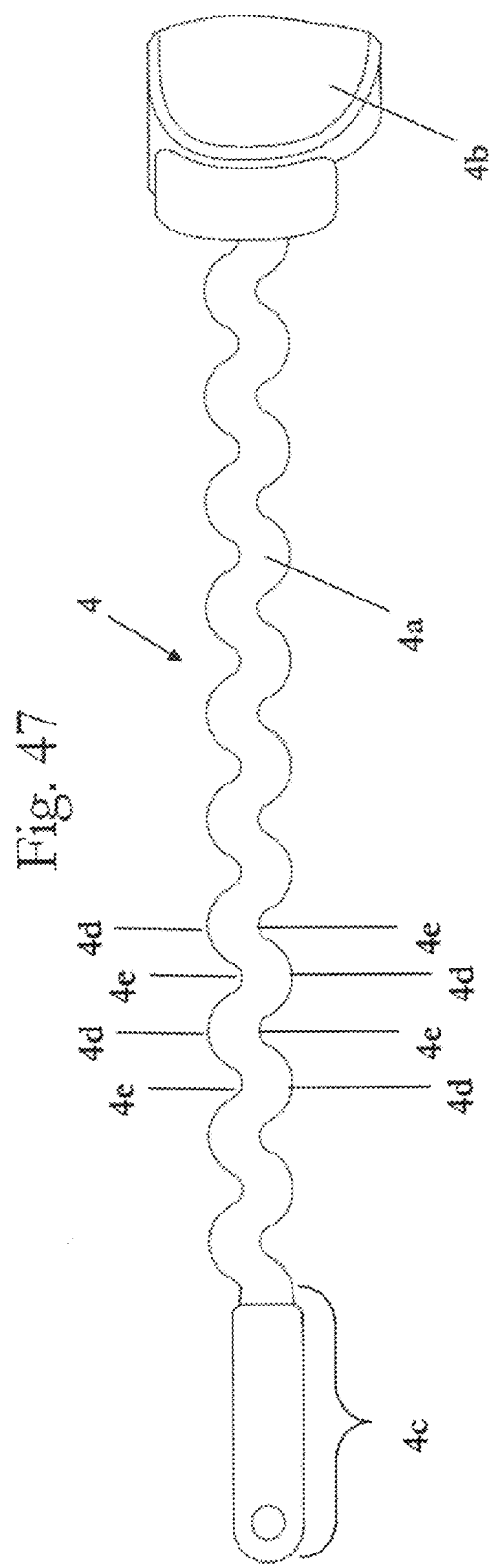

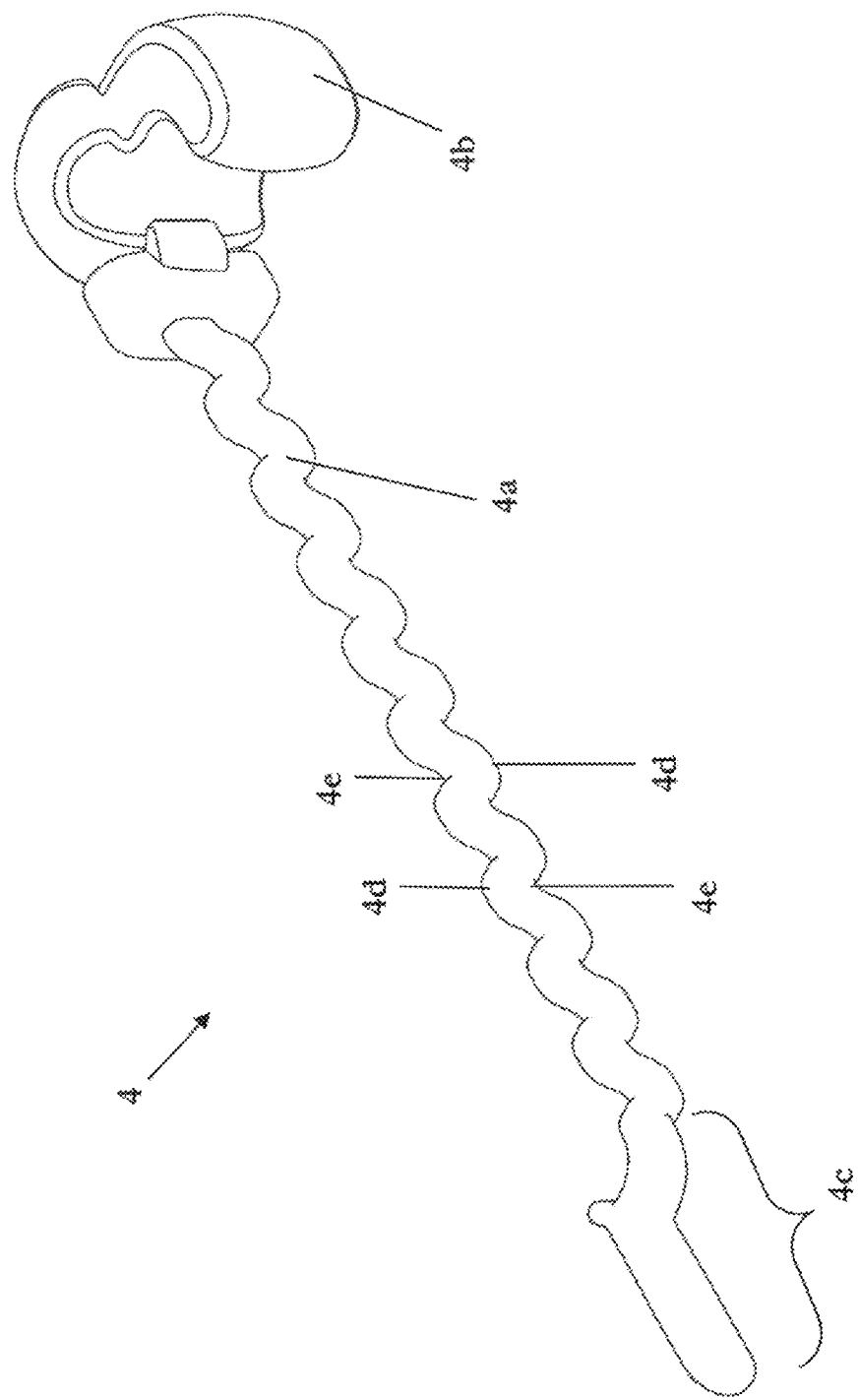

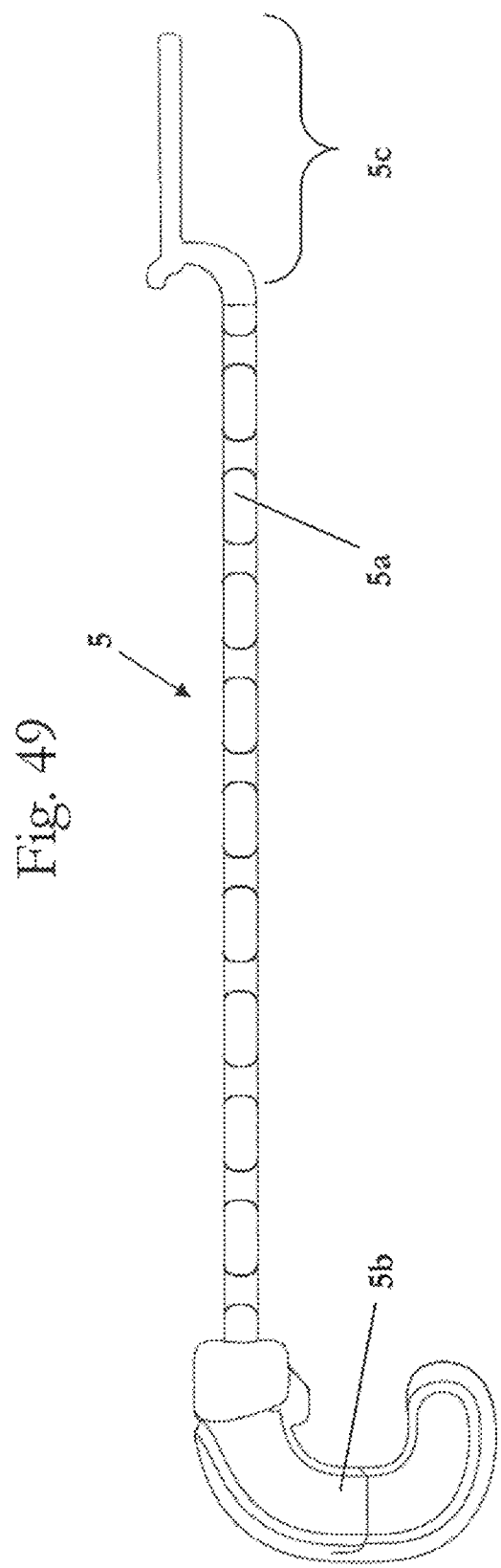

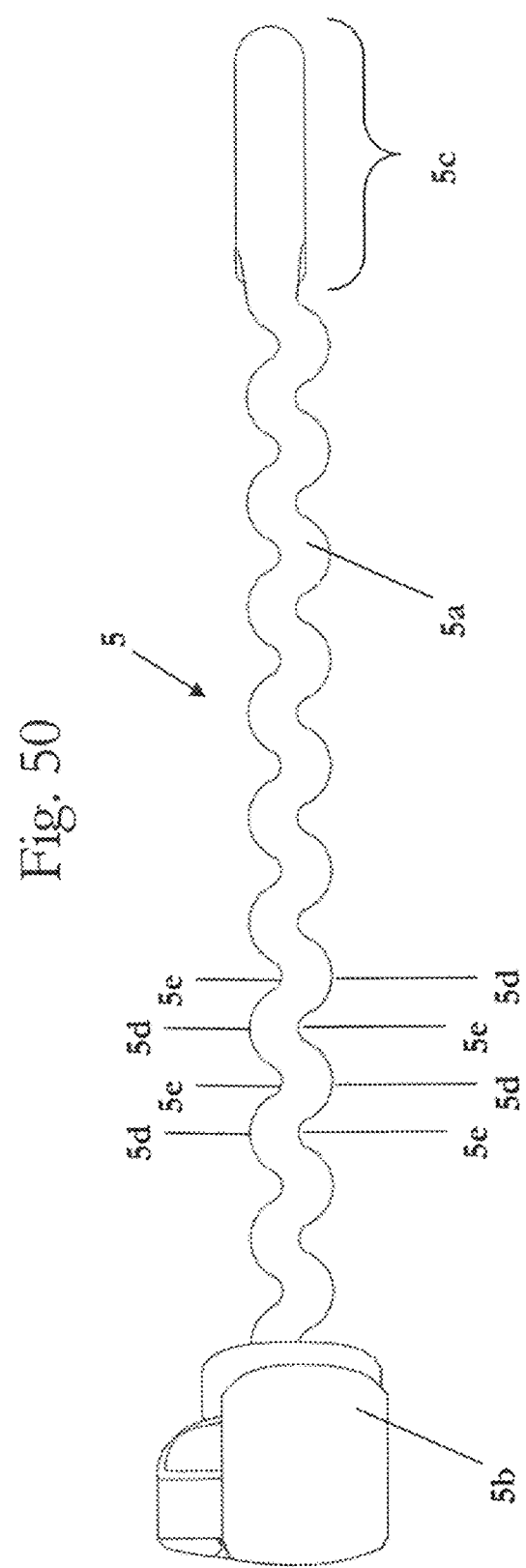

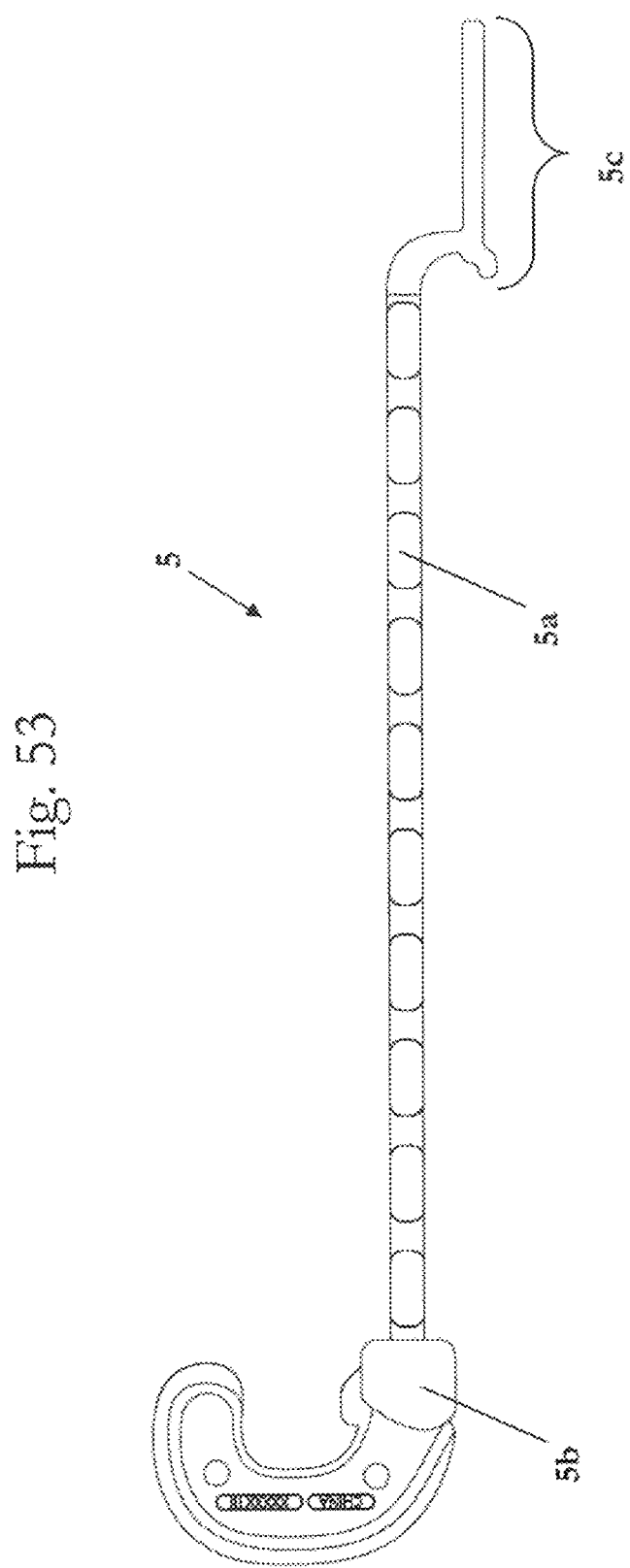

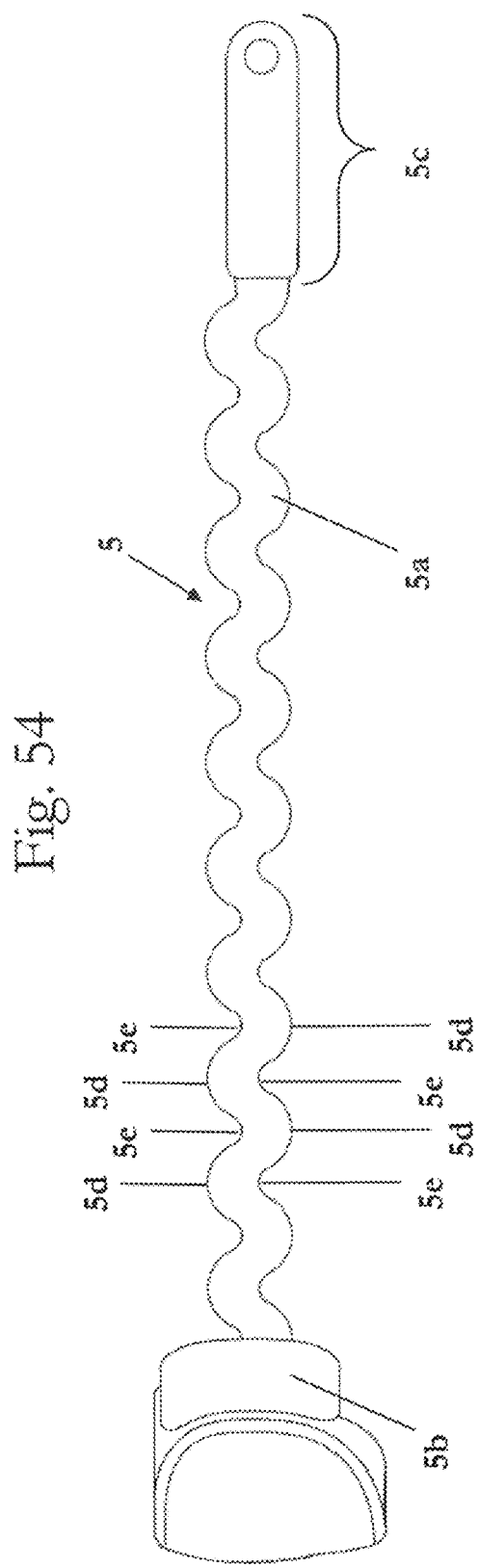

HOLDER FOR MOBILE ELECTRONIC DEVICE

CROSS-REFERENCE TO RELATED APPLICATIONS

The current application is a continuation-in-part of U.S. patent application Ser. No. 16/240,191 filed on Jan. 4, 2019, which is a continuation-in-part of U.S. patent application Ser. No. 16/107,781 filed on Aug. 21, 2018, the disclosures of which are hereby incorporated herein by reference in their entireties.

FIELD OF THE INVENTION

The present invention relates to a holder for a mobile electronic device. The holder is configured to clamp and secure the mobile electronic device to an object that may periodically be in motion, such as a car headrest. The holder can be formed from a single unitary piece, or from multiple distinct pieces. Preferably, the holder encases a perimeter of the mobile electronic device so as to protect the mobile device in an impact event, such as a fall or drop.

BACKGROUND OF THE INVENTION

Holders for mobile devices can take many forms. For instance, easel holders allow a user to place a mobile device in a standing position on a horizontal surface. But such easel holders are unsuitable for horizontal surfaces that may periodically move, as they are prone to falling or collapse when the surface changes speed or changes from a stationary state to a moving state.

There are also holders designed to attach to specific areas of moving objects, such as car cup holders, car dashboards, car vents, and the like. But these portion of these holders that are designed to attached to the moving object are often object-specific and so can only be attached to that specific object. Some holders even will only attach to a specific vehicle, such as a particular make and model of car. Such holders are often also bulky and difficult to travel with, or are designed to permanently attach the desired object.

And in general, these holders provide no scratch or shock protection to the mobile electronic device.

SUMMARY OF THE INVENTION

As such, it is desirable to provide a new holder for a mobile electronic device which is easily portable and can be attached to a wide variety of objects. It is also desirable to provide such a new holder that is designed to protect the mobile device in an impact event, such as a fall or drop.

According to the present invention there is therefore provided a stand for a mobile device as described by way of example below and in the accompanying claims.

In one embodiment of the invention there is provided a holder (1) for a mobile electronic that is configured to hold the mobile electronic device securely to an external object, the holder having two first openings, a first communication path, two second openings, and a second communication path. The two first openings are paired together as a first set of paired openings (16,17). The first communication path connects the first openings (16,17) so that a securing device (300) can be fed into one of the first openings (16,17) and subsequently fed out of the other of the first openings (16,17). The two second openings are paired together as a second set of paired openings (16,17). The second communication path connects the second openings (16,17) so that the securing device (300) can be fed into one of the second openings (16,17) and subsequently fed out of the other of the second openings (16,17). The two first openings are spaced apart from the two second openings so that the securing device (300), which securing device (300) includes one or more separate items, can be secured to the holder (1) at the first set of paired openings (16,17) and at the second set of paired openings (16,17), and additionally wrapped around the external object to secure the holder to the external object.

In another embodiment, the holder (1) includes a case portion (2) that has a pocket, recess, or cavity (15) sized and configured to hold the mobile electronic device, a length dimension in a length direction, a width dimension in a width direction, and a thickness dimension in a thickness direction. Each of the length direction, the width direction, and the thickness direction is orthogonal to the other two of the length direction, the width direction, and the thickness direction. The thickness dimension is smaller than the width dimension, and the width dimension is smaller than the length dimension.

In yet another embodiment, the case portion (2) further has a lip or rim (19) that secures the mobile electronic device in the pocket, recess, or cavity (15).

In a further embodiment, the lip or rim (19) is a deformable lip or rim that deforms to allow the mobile electronic device to be place in the pocket, recess, or cavity (15).

In yet a further embodiment, the case portion (2) is formed from at least one material selected from the group consisting of an elastomeric material, a foam material, a rubber material, silicone, thermoplastic elastomers ("TPEs"), thermoplastic polyurethane ("TPU"), polyolefins, a soft plastic, or any combination thereof.

In another embodiment, the holder (1) further includes a clamp portion (3) that has a first clamp piece (4) and a second clamp piece (5). Each of the first and second clamp pieces (4,5) is configured to engage a respective side (7,8, 13,14) of the case portion (2) so that each of the first and second clamp pieces (4,5) is securely and removably attached to the respective side (7,8,13,14) of the case portion (2).

In yet another embodiment, each of the first and second clamp pieces (4,5) has an indentation or recess (18) configured to accept the respective side (7,8,13,14) of the case portion (2).

In a further embodiment, the indentation or recess (18) of each of the first and second clamp pieces (4,5) accepts the respective side (7,8,13,14) by snapping onto, clicking onto, or clamping onto the respective side (7,8,13,14) to securely attach the clamp portion (3) to the case portion (2).

In yet a further embodiment, the clamp portion (3) is formed from at least one material selected from the group consisting of an elastomeric material, a foam material, a rubber material, silicone, thermoplastic elastomers ("TPEs"), thermoplastic polyurethane ("TPU"), polyolefins, a soft plastic, or any combination thereof.

In another embodiment, the first and second sets of paired openings (16,17) are formed in the case portion (2).

In yet another embodiment, the first set of paired openings (16,17) is formed in the first clamp piece (4) and the second set of paired openings (16,17) is formed in the second clamp piece (5).

In a further embodiment, the first set of paired openings (16,17) is formed in the case portion (2). The second set of paired openings (16,17) is formed in the first clamp piece (4) or the second clamp piece (5).

In yet a further embodiment, the holder (1) further includes two third openings, a third communication path, two fourth openings, and a fourth communication path. The two third openings are paired together as a third set of paired openings (16,17). The third communication path connects the third openings (16,17) so that the securing device (300) can be fed into one of the third openings (16,17) and subsequently fed out of the other of the third openings (16,17). The two fourth openings are paired together as a fourth set of paired openings (16,17). The fourth communication path connects the fourth openings (16,17) so that the securing device (300) can be fed into one of the fourth openings (16,17) and subsequently fed out of the other of the fourth openings (16,17). The two third openings are spaced apart from the two fourth openings so that the securing device (300) can be secured to the holder (1) at the third set of paired openings (16,17) and at the fourth set of paired openings (16,17), and additionally wrapped around the external object to secure the holder to the external object.

In another embodiment, the third and fourth sets of paired openings (16,17) are formed in the case portion (2).

In yet another embodiment, the holder (1) further includes two third openings, a third communication path, two fourth openings, a fourth communication path, two fifth openings, a fifth communication path, two sixth openings, and a sixth communication path. The two third openings are paired together as a third set of paired openings (16,17). The third communication path connects the third openings (16,17) so that the securing device (300) can be fed into one of the third openings (16,17) and subsequently fed out of the other of the third openings (16,17). The two fourth openings that paired together as a fourth set of paired openings (16,17). The fourth communication path connects the fourth openings (16,17) so that the securing device (300) can be fed into one of the fourth openings (16,17) and subsequently fed out of the other of the fourth openings (16,17). The two fifth openings are paired together as a fifth set of paired openings (16,17). The fifth communication path connects the fifth openings (16,17) so that the securing device (300) can be fed into one of the fifth openings (16,17) and subsequently fed out of the other of the fifth openings (16,17). The two sixth openings are paired together as a sixth set of paired openings (16,17). The sixth communication path connects the sixth openings (16,17) so that the securing device (300) can be fed into one of the sixth openings (16,17) and subsequently fed out of the other of the sixth openings (16,17). The two third openings are spaced apart from the two fourth openings so that the securing device (300) can be secured to the holder (1) at the third set of paired openings (16,17) and at the fourth set of paired openings (16,17), and additionally wrapped around the external object to secure the holder to the external object. The two fifth openings are spaced apart from the two sixth openings so that the securing device (300) can be secured to the holder (1) at the fifth set of paired openings (16,17) and at the sixth set of paired openings (16,17), and additionally wrapped around the external object to secure the holder to the external object. The third, fourth, fifth, and sixth sets of paired openings (16,17) are formed in the case portion (2).

In a further embodiment, the holder (1) includes a clamp portion (3) that has a first clamp piece (4) and a second clamp piece (5). Each of the first and second clamp pieces (4,5) is configured to engage a respective side of the mobile electronic device so that each of the first and second clamp pieces (4,5) is securely and removably attached to the respective side of the mobile electronic device. The first set of paired openings (16,17) is formed in the first clamp piece (4) and the second set of paired openings (16,17) is formed in the second clamp piece (5).

In yet a further embodiment, the first set of paired openings (16,17) is formed at a first length end of the case portion (2) in the length direction. The second set of paired openings (16,17) is formed at a second length end of the case portion (2) in the length direction opposite to the first length end.

In another embodiment, the first set of paired openings (16,17) is formed at a first width end of the case portion (2) in the width direction. The second set of paired openings (16,17) is formed at a second width end of the case portion (2) in the length direction opposite to the first width end.

In yet another embodiment, the holder (1) further includes two third openings, a third communication path, two fourth openings, and a fourth communication path. The two third openings are paired together as a third set of paired openings (16,17). The third communication path connects the third openings (16,17) so that the securing device (300) can be fed into one of the third openings (16,17) and subsequently fed out of the other of the third openings (16,17). The two fourth openings are paired together as a fourth set of paired openings (16,17). The fourth communication path connects the fourth openings (16,17) so that the securing device (300) can be fed into one of the fourth openings (16,17) and subsequently fed out of the other of the fourth openings (16,17). The two third openings are spaced apart from the two fourth openings so that the securing device (300) can be secured to the holder (1) at the third set of paired openings (16,17) and at the fourth set of paired openings (16,17), and additionally wrapped around the external object to secure the holder to the external object. The third set of paired openings (16,17) is formed at a first width end of the case portion (2) in the width direction. The fourth set of paired openings (16,17) is formed at a second width end of the case portion (2) in the length direction opposite to the first width end.

In a further embodiment, each opening of each set of paired openings (16,17) is configure to accept at least one item selected from the group consisting of a string, wire, cord, elastic cord, bungee cord, rope, cable, strap as at least part of the securing device (300).

In yet a further embodiment, the holder (1) does not include any metal or magnetic materials.

In another embodiment of the invention, the first and second clamp pieces (4,5) together act as a securing device. Each of the first and second clamp pieces (4,5) includes a clamping portion (4b,5b) configured to engage the respective side (7,8,13,14) of the case portion (2) so that the clamping portion (4b,5b) is securely and removably attached to the respective side (7,8,13,14) of the case portion (2); a flexible extension (4a,5a) that extend from the clamping portion (4b,5b); and a connecting portion (4c,5c) located at an end of the flexible extension (4a,5a) opposite to the clamping portion (4b,5b), the connecting portion (4c,5c) being configured to securely engage with and connect to the case portion (2).

In yet another embodiment of the invention, each connecting portion (4c,5c) securely engages with and connects to the case portion (2) via a corresponding one of the first and sets of paired openings (16,17).

In a further embodiment of the invention, each connecting portion (4c,5c) securely engages with and connects to the case portion (2) via a corresponding one of the first and sets of paired openings (16,17) so that for each connecting portion (4c,5c): a first portion of the flexible extension (4a,5a) or of the connecting portion (4c,5c) is arranged in the corresponding one of the first and sets of paired openings (16,17); a second portion of the flexible extension (4a,5a), connected to the first portion of the flexible extension (4a,5a) or of the connecting portion (4c,5c), is arranged outside the case portion (2) on one side of the corresponding one of the first and sets of paired openings (16,17); and a second portion of the connecting portion (4c,5c), connected to the first portion of the flexible extension (4a,5a) or of the connecting portion (4c,5c), is arranged outside the case portion (2) on another side of the corresponding one of the first and sets of paired openings (16,17) different from the one side. The first portion of the flexible extension (4a,5a) or of the connecting portion (4c,5c) itself is located in between the second portion of the flexible extension (4a,5a) and the second portion of the connecting portion (4c,5c).

In yet a further embodiment of the invention, each flexible extension (4a,5a) is formed in an undulating pattern with alternating peaks (4d,5d) and troughs (4e,5e).

In another embodiment of the invention, the undulating pattern is in the shape of a wave, zig-zag, or sinusoidal pattern.

In yet another embodiment of the invention, for each connecting portion (4c,5c), the peaks (4d,5d) and troughs (4e,5e) alternate in an extension direction from the clamping portion (4b,5b) to the connecting portion (4c,5c).

In a further embodiment of the invention, for each connecting portion (4c,5c), each peak (4d,5d) has a corresponding trough (4e,5e) on an opposite side of the flexible extension (4a,5a) in a direction substantially perpendicular to the extension direction In yet a further embodiment of the invention, for each connecting portion (4c,5c), the flexible extensions (4a,5a), the clamping portion (4b,5b), and the connecting portion (4c,5c) are integral with each other so that the clamp piece (4,5) is formed as an integral singular continuous clamp piece (4,5).

In another embodiment of the invention, each clamp piece 4,5 is formed from a single uniform material.

In another embodiment of the invention there is provided a holder (1) for a mobile electronic that is configured to hold the mobile electronic device securely to an external object. The holder has a clamp portion (3) that includes a first clamp piece (4) and a second clamp piece (5). Each of the first and second clamp pieces (4,5) has: a clamping portion (4b,5b) configured to engage a respective side (7,8,13,14) of the mobile electronic device or of a case portion (2) configured to hold the mobile electronic device so that the clamping portion (4b,5b) is securely and removably attached to the respective side (7,8,13,14) of the case portion (2) or of the mobile electronic device; a flexible extension (4a,5a) that extend from the clamping portion (4b,5b); and a connecting portion (4c,5c) located at an end of the flexible extension (4a,5a) opposite to the clamping portion (4b,5b), the connecting portion (4c,5c) being configured to securely engage with and connect to the case portion (2), the external object, the connection portion (4c,5c) of the other of the first and second clamp pieces (4,5), or a combination thereof.

It is noted that the features of the above-described embodiments are not exclusive to each other, and that any one of the above embodiments/features can be combined with one or more of the other embodiments/features to arrive at further embodiments.

The inventive stand can be designed to fit a variety of mobile devices—such as smartphones and other portable electronic devices—as well as cases therefor.

In accordance with another embodiment of the invention, a holder for a mobile electronic device may include a case portion and a handle assembly. The handle assembly may include connection members that may act as pull tabs and that may be configured for attaching the handle assembly to the case portion. The holder may provide drop protection for a mobile electronic device received in the holder when the holder is dropped with a solid rear portion of the holder facing down towards the ground or when the holder is dropped with the screen of the mobile electronic device facing down towards the ground. The handle assembly may provide additional drop protection when the holder is dropped on sides of the holder on which the handle assembly is attached to the case portion. The holder may act as a stand feature to provide optimized viewing angles including low-angle and high-angle views. A combination of grooves in a handle of the handle assembly and corresponding nodules on the connection members of the handle assembly may provide distinct, indexed viewing angles. The handle assembly may act as a handle on either one or both of lengthwise sides of the holder and widthwise sides of the holder depending on the arrangement. In arrangements in which the handle assembly may act as a handle on both the lengthwise and the widthwise sides of the holder, the handle of the handle assembly may be formed of a first telescoping portion of the handle that slides within and along a second telescoping portion of the handle. The holder may be assembled around a car headrest or around any other object capable of being fitted between the handle of the handle assembly and case portion. In some arrangements, the handle may be in the form of headphones.

In accordance with another embodiment of the invention, a holder for a mobile electronic device may include a case portion, a first connection member, and a handle. The case portion may be configured for holding the mobile electronic device. The handle may be rotatable about the first connection member. The first connection member may include a first flange on a first end of the first connection member and a second flange on a second end of the first connection member opposite the first end of the first connection member. The first flange may be spaced from the second flange such that a first portion of the handle may be held in an axial position relative to the case portion by the combination of and between the first flange and the second flange. The first connection member may be a single body.

In some arrangements, an entirety of the first connection member may be removable from the rest of the holder through the handle.

In some arrangements, the first flange may be integral with the second flange such that the first and the second flange may be inseparable from each other without fracture of one or both of the first flange and the second flange.

In some arrangements, the first flange may be adjacent to the handle and the second flange may be adjacent to the case portion.

In some arrangements, the handle may be held against the case portion.

In some arrangements, the case portion may include a first side, a second side opposite the first side, a third side, a fourth side opposite the third side, and a rear side. The rear side may be attached to each of the first side, the second side, the third side, and the fourth side and may define a rear portion of the case portion. The third side and the fourth side may extend between the first side and the second side. The first connection member may extend at least through one side of a first set that includes the first side, the second side, the third side, and the fourth side and through one side of a second set that includes the first side, the second side, the third side, the fourth side, and the rear side in which the one of the first set is different than the one side of the second set. The one side of the second set preferably may be the rear side.

In some arrangements in which the case portion includes a first side, a second side, a third side, and a fourth side, the case portion may include a cavity, opposing first openings, opposing second openings, opposing third openings, and opposing fourth openings. The cavity may be dimensioned for holding the mobile electronic device. The opposing first openings may be on the first side and the second side. The opposing second openings may be on the first side and the second side in which the second openings may be spaced from the first openings. The opposing third openings may be on the third side and the fourth side. The opposing fourth openings may be on the third side and the fourth side in which the fourth openings may be spaced from the third openings.

In some arrangements, the holder may further include a second connection member. In such arrangements, the second connection member may include a third flange on a first side of the second connection member and a fourth flange on a second side of the second connection member opposite the first side of the second connection member. The third flange may be spaced from the fourth flange such that a second portion of the handle may be held in an axial position relative to the case portion by the combination of and between the third flange and the fourth flange.

In some arrangements, the handle may include first and second attachment members each configured to be clamped respectively by the first and the second connection members to the case portion. In such arrangements, the first attachment member may include the first portion of the handle. The bridge member may be attached to and may extend between the first and the second attachment members.

In some such arrangements, the handle may form a loop extending from opposing sides of the case portion in which the handle may be attached to the opposing sides of the case portion. In some arrangements, the first and the second attachment members may be integral with the bridge member such that the first and the second attachment members may be inseparable from the bridge member without fracture of any one or any combination of the first attachment member, the second attachment member, and the bridge member.

In some arrangements, the handle may be rotatable about the case portion and about an axis passing through each of the first and the second attachment members.

In some arrangements, each of the first and the second attachment members may define respective first and second holes and may include first and second pluralities of protrusions extending towards respective centers of the first and the second holes to define respective first and second pluralities of grooves. Each of the first and the second connection members may include at least one nodule configured to be received in corresponding ones of the first and the second pluralities of grooves of the first and the second attachment members to thereby align the handle and the case portion in discrete rotational positions relative to each other.

In some arrangements, the first and the second attachment members may be made of a rigid plastic material while the first and the second connection members may be made of a flexible plastic material. In some other arrangements, the first and the second attachment members may be made of a flexible plastic material while the first and the second connection members, au be made of a rigid plastic material.

In some arrangements, the case portion may have a length dimension in a length direction, a width dimension in a width direction, and a thickness dimension in a thickness direction. Each of the length direction, the width direction, and the thickness direction may be orthogonal to the other two of the length direction, the width direction, and the thickness direction, The thickness dimension may be smaller than the width dimension, and the width dimension may be smaller than the length dimension. The bridge member may include a first bridge portion and a second bridge portion that may telescope within the first bridge portion such that the first and the second attachment members may be configured to provide a clamping force to the case portion in the length direction in a first position of the second bridge portion relative to the first bridge portion and configured to provide a clamping force to the case portion in a width direction in a second position of the second bridge portion relative to the first portion.

In some arrangements, each of the first and the second connection members may be passed through the case portion and the handle.

In some arrangements, the first connection member is made of a plastic material. In some arrangements, the handle and the case portion may be made of plastic materials. In some such arrangements, the handle and the case portion may be made of the same plastic materials while in other such arrangements, the handle and the case portion may be of different plastic materials.

In some arrangements, the first connection member may be directly attached to the case portion and to the handle without being directly attached to any other component.

In some arrangements, the first connection member may be separable from the handle by pulling a first end of the first connection member through the case portion and the handle without being separable from the handle by pulling a second end of the first connection member through the case portion and the handle.

In accordance with another embodiment of the invention, a holder for a mobile electronic device may be configured to hold the mobile electronic device securely to an external object. The holder may include a case portion, a first clamp piece, and a second clamp piece. The case portion may be configured to hold the mobile electronic device. The second clamp piece may be spaced apart from the first clamp piece. Each of the first and the second clamp pieces may include a clamping portion, at least a portion of a flexible extension, and a connecting portion. The clamping portion may be configured to engage a respective side of the mobile electronic device or of the case portion so that the clamping portion is securely and removably attached to the respective side of the case portion or of the mobile electronic device. The flexible extension may extend from the clamping portion. The flexible extension may be configured to be wrapped around the external object. The connecting portion may be located at an end of the flexible extension opposite to the clamping portion. The connecting portion may be configured to securely engage with and connect to the case portion, the external object, the connection portion of the other of the first and second clamp pieces, or any combination the case portion, the external object, and the connection portion of the other of the first and the second clamp pieces.

In some arrangements, portions of each of the first and the second clamp pieces may extend through the case portion.

In some arrangements, each of the first and the second clamp pieces may separately snap onto the respective sides of the case portion.

BRIEF DESCRIPTION OF THE DRAWINGS

FIG. 1 is a upper side view of the holder for a mobile electronic device in accordance with an embodiment of the invention.

FIG. 2 is a front view of the holder for a mobile electronic device in accordance with an embodiment of the invention.

FIG. 3 is a left side view of the holder for a mobile electronic device in accordance with an embodiment of the invention.

FIG. 4 is a right side view of the holder for a mobile electronic device in accordance with an embodiment of the invention.

FIG. 5 is a lower side view of the holder for a mobile electronic device in accordance with an embodiment of the invention.

FIG. 6 is a rear view of the holder for a mobile electronic device in accordance with an embodiment of the invention.

FIG. 7 is an exploded front upper-side perspective view of the holder for a mobile electronic device in accordance with an embodiment of the invention.

FIG. 8 is a upper side view of the holder for a mobile electronic device in accordance with an embodiment of the invention.

FIG. 9 is a front view of the holder for a mobile electronic device in accordance with an embodiment of the invention.

FIG. 10 is a left side view of the holder for a mobile electronic device in accordance with an embodiment of the invention.

FIG. 11 is a right side view of the holder for a mobile electronic device in accordance with an embodiment of the invention.

FIG. 13 is a rear view of the holder for a mobile electronic device in accordance with an embodiment of the invention.

FIG. 14 is a front upper-side perspective view of the holder for a mobile electronic device in accordance with an embodiment of the invention.

FIG. 15 is a upper side view of the holder for a mobile electronic device in accordance with an embodiment of the invention.

FIG. 16 is a front view of the holder for a mobile electronic device in accordance with an embodiment of the invention.

FIG. 19 is a lower side view of the holder for a mobile electronic device in accordance with an embodiment of the invention.

FIG. 20 is a rear view of the holder for a mobile electronic device in accordance with an embodiment of the invention.

FIG. 21 is an exploded front upper-side perspective view of the holder for a mobile electronic device in accordance with an embodiment of the invention.

FIG. 22 is a front view of the holder for a mobile electronic device in accordance with an embodiment of the invention with the holder being in a landscape orientation, position, or state.

FIG. 28 is a upper side view of the holder for a mobile electronic device in accordance with an embodiment of the invention.

FIG. 29 is a front view of the holder for a mobile electronic device in accordance with an embodiment of the invention.

FIG. 30 is a left side view of the holder for a mobile electronic device in accordance with an embodiment of the invention.

FIG. 31 is a right side view of the holder for a mobile electronic device in accordance with an embodiment of the invention.

FIG. 32 is a lower side view of the holder for a mobile electronic device in accordance with an embodiment of the invention.

FIG. 33 is a rear view of the holder for a mobile electronic device in accordance with an embodiment of the invention.

FIG. 35 is a upper side view of the holder for a mobile electronic device in accordance with an embodiment of the invention.

FIG. 36 is a front view of the holder for a mobile electronic device in accordance with an embodiment of the invention.

FIG. 37 is a left side view of the holder for a mobile electronic device in accordance with an embodiment of the invention.

FIG. 38 is a right side view of the holder for a mobile electronic device in accordance with an embodiment of the invention.

FIG. 39 is a lower side view of the holder for a mobile electronic device in accordance with an embodiment of the invention.

FIG. 40 is a rear view of the holder for a mobile electronic device in accordance with an embodiment of the invention.

FIG. 43 is a front view of the right clamp piece for a mobile electronic device in accordance with an embodiment of the invention.

FIG. 46 is a lower side view of the right clamp piece for a mobile electronic device in accordance with an embodiment of the invention.

FIG. 47 is a rear view of the right clamp piece for a mobile electronic device in accordance with an embodiment of the invention.

FIG. 48 is a front upper-side perspective view of the right clamp piece for a mobile electronic device in accordance with an embodiment of the invention.

FIG. 49 is a upper side view of the left clamp piece for a mobile electronic device in accordance with an embodiment of the invention.

FIG. 50 is a front view of the left clamp piece for a mobile electronic device in accordance with an embodiment of the invention.

FIG. 53 is a lower side view of the left clamp piece for a mobile electronic device in accordance with an embodiment of the invention.

FIG. 54 is a rear view of the left clamp piece for a mobile electronic device in accordance with an embodiment of the invention.

DETAILED DESCRIPTION

Figure 12:
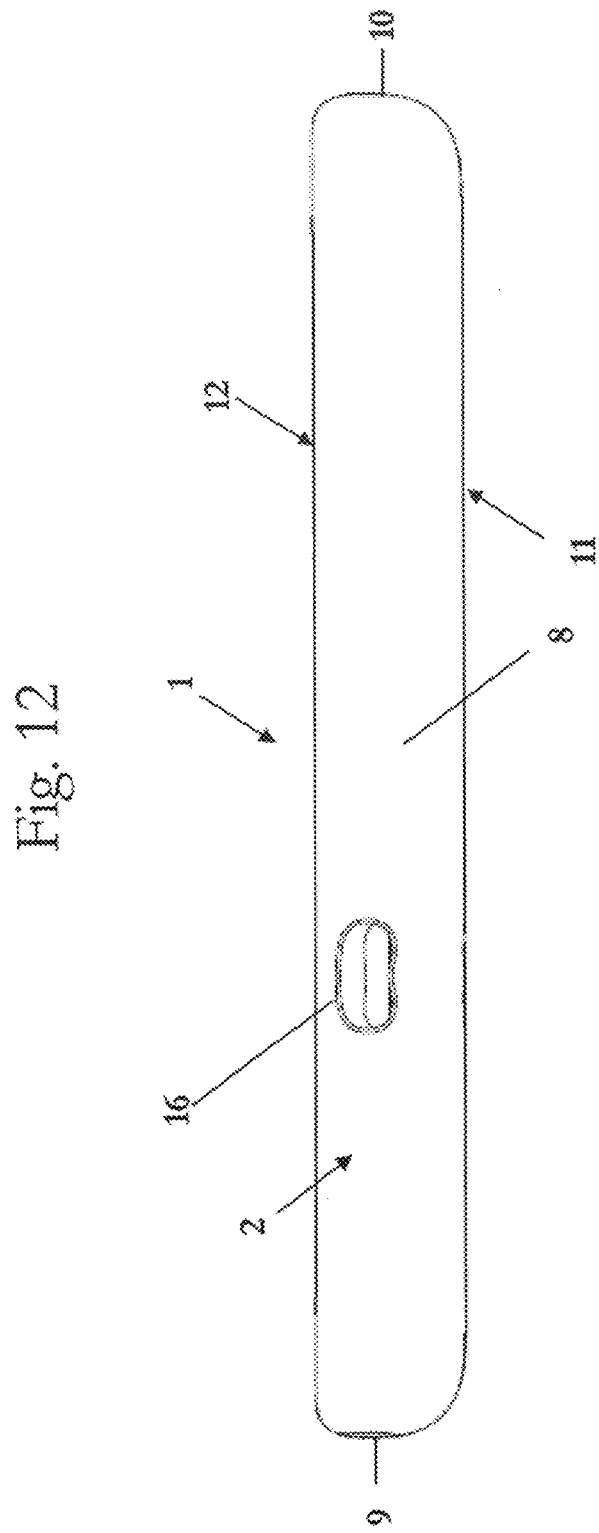
FIG. 12 is a lower side view of the holder for a mobile electronic device in accordance with an embodiment of the invention.
Figure 18:
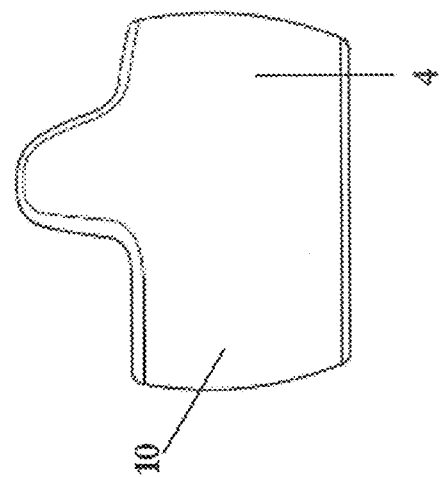
FIG. 18 is a right side view of the holder for a mobile electronic device in accordance with an embodiment of the invention.
Figure 17:
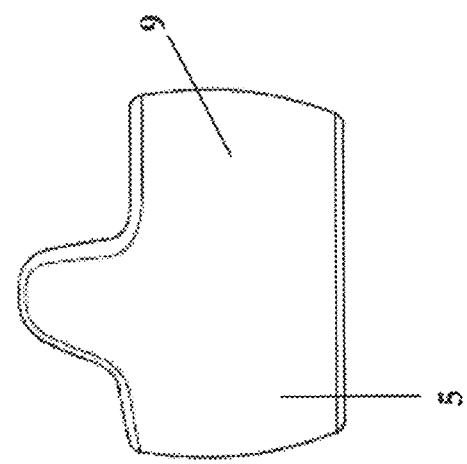
FIG. 17 is a left side view of the holder for a mobile electronic device in accordance with an embodiment of the invention.

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments. It is noted that any numerical ranges disclosed herein are included to individually disclose every sub-range and number, both whole integer and partial fraction, within the disclosed range. For example, a disclosed range of 1-100 is intended to individually disclose 20-90, 40-80, 30.5-50.2, 20, 67.3, 84.512924, and every other range and number that falls within the recited range.

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

FIGS. 1-7 show the holder 1 in accordance with an embodiment of the invention. The holder 1 has an upper side 7, a lower side 8, a left side 9, and a right side 10. A rear side 11 of the holder 1 is configured to cover at least part of a rear side of a mobile device when attached to the holder 1, and a front side 12 is configured to expose at least part of a front side of a mobile device when attached to the holder 1.

In one embodiment, the holder 1 includes a case portion 2 and a clamp portion 3. The case portion 2 includes a pocket, recess, or cavity 15 sized and configured to hold a mobile electronic device. The case portion 2 also includes a lip or rim 19 that secures the mobile electronic device in the pocket, recess, or cavity 15. Preferably the lip or rim 19 is a deformable lip or rim that deforms to allow the mobile electronic device to be place in the pocket, recess, or cavity 15.

The clamp portion 3 includes a right clamp piece 4 and a left clamp piece 5. The right clamp piece 4 is configured to clamp onto, snap onto, click onto, or otherwise engage a right side 14 of the case portion 2 or a right side of a mobile device so that the right clamp piece 4 is secured to the right side 14 of the case portion 2 or the right side of a mobile device. This can be accomplished, for example, by an indentation, recess, or the like 18 formed in or by the right clamp piece 4, into which the right side 14 of the case portion 2 or the right side of a mobile device fits, snaps, clicks, or otherwise is secured.

Similarly, the left clamp piece 5 is configured to clamp onto, snap onto, click onto, or otherwise engage a left side 13 of the case portion 2 or a left side of a mobile device so that the left clamp piece 5 is secured to the left side 13 of the case portion 2 or the right side of a mobile device. This can be accomplished, for example, by an indentation, recess, or the like 18 formed in or by the left clamp piece 5, into which the left side 13 of the case portion 2 or the left side of a mobile device fits, snaps, clicks, or otherwise is secured.

The case portion 2, clamp portion 3, or both include at least one set of paired openings 16,17. Each opening 16 communicates with a corresponding opening 17 so that a securing device 300—such as a string, wire, cord, elastic cord, bungee cord, rope, cable, strap, or the like—can be fed into one of the openings 16 and subsequently fed out of the corresponding opening 17, or can be fed into one of the openings 17 and subsequently fed out of the corresponding opening 16—for example, as shown in FIGS. 22-27. This allows the securing device 300 to be fed through and secured by one set of paired openings 16,17, wrapped around an object—such as a car headrest 200—and fed through and secured by another set of paired openings 16,17, thereby securing the holder 1 to the object (e.g., headrest 200).

While FIGS. 1-7 and 22-27 show the holder 1 including three separate and distinct pieces 2,4,5, this need not be the case. For example, the holder 1 could be formed by just one piece—such as the case portion 2. The securing device 300 could then be wrapped around the object (e.g., headrest 200) and fed through and secured by two sets of paired openings 20,21 to secure the case portion 2 to the object. If needed, a second securing device 300 could also be wrapped around the object and fed through and secured by another two sets of paired openings 20,21 to further secure the case portion 2 to the object.

As another example, the holder 1 could be formed by two pieces, such as the right and left clamp pieces 4,5 of the clamp portion 3. The securing device 300 could then be wrapped around the object (e.g., headrest 200) and fed through and secured by the set of paired openings 16,17 of the right clamp piece 4 and the set of paired openings 16,17 of the left claim piece 5 to secure the case portion 2 to the object.

The sets of paired openings 16,17 of the case portion 2 are preferably formed so that a first two sets of paired openings 16,17 are opposite each other in a first direction, and a second two sets of paired openings 16,17 are opposite each other in a second direction orthogonal to the first direction. This allows the holder 1, either as the case portion 2 alone or as the combined case portion 2 and clamp portion 3, to be secured to and object (i.e., headrest 200) in multiple directions or orientations.

For example, a first set of paired openings 16,17 can be arranged on an upper portion of the case portion 2 (e.g., upper side 7 and rear side 11) and a second set of paired openings can be arranged on an lower portion of the case portion 2 (e.g., lower side 8 and rear side 11). This allows the holder 1 to be arranged in a landscape direction/orientation as shown in FIGS. 22, 23, 26, and 27.

As another example, a third set of paired openings 16,17 can be arranged on an left portion of the case portion 2 (e.g., left side 13 and rear side 11) and a fourth set of paired openings can be arranged on a right portion of the case portion 2 (e.g., right side 14 and rear side 11). This allows the holder 1 to be arranged in a portrait direction/orientation as shown in FIGS. 24 and 25.

Using two separate and distinct clamp pieces 4,5 for the clamp portion 3 also allows the holder 1, either as the clamp portion 3 alone or as the combined case portion 2 and clamp portion 3, to be secured to and object (i.e., headrest 200) in multiple directions or orientations. In particular, since the clamp portion 3 is formed by two separate and distinct clamp pieces 4,5, it can be configured to fit a range of different widths or lengths of case portions 2 or mobile electronic devices. This allows the clamp portion 3 to engage with and secure the case portion 2 or mobile electronic device in either a landscape direction/orientation as shown in FIGS. 22, 23, 26, and 27, or a portrait direction/orientation as shown in FIGS. 24 and 25.

Figure 23:
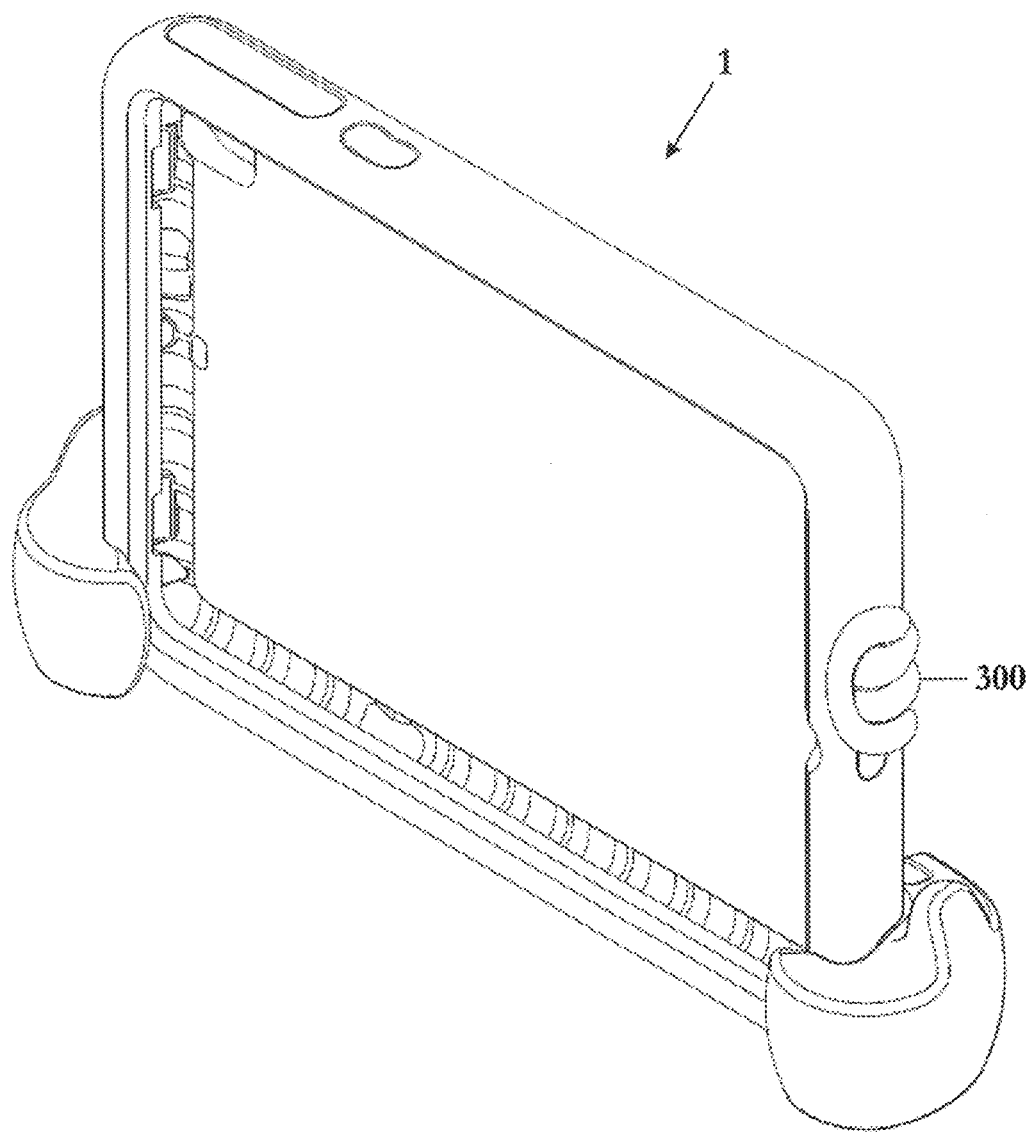
FIG. 23 is a front upper-right-side perspective view of the holder for a mobile electronic device in accordance with an embodiment of the invention with the holder being in the landscape orientation, position, or state.
Figure 24:
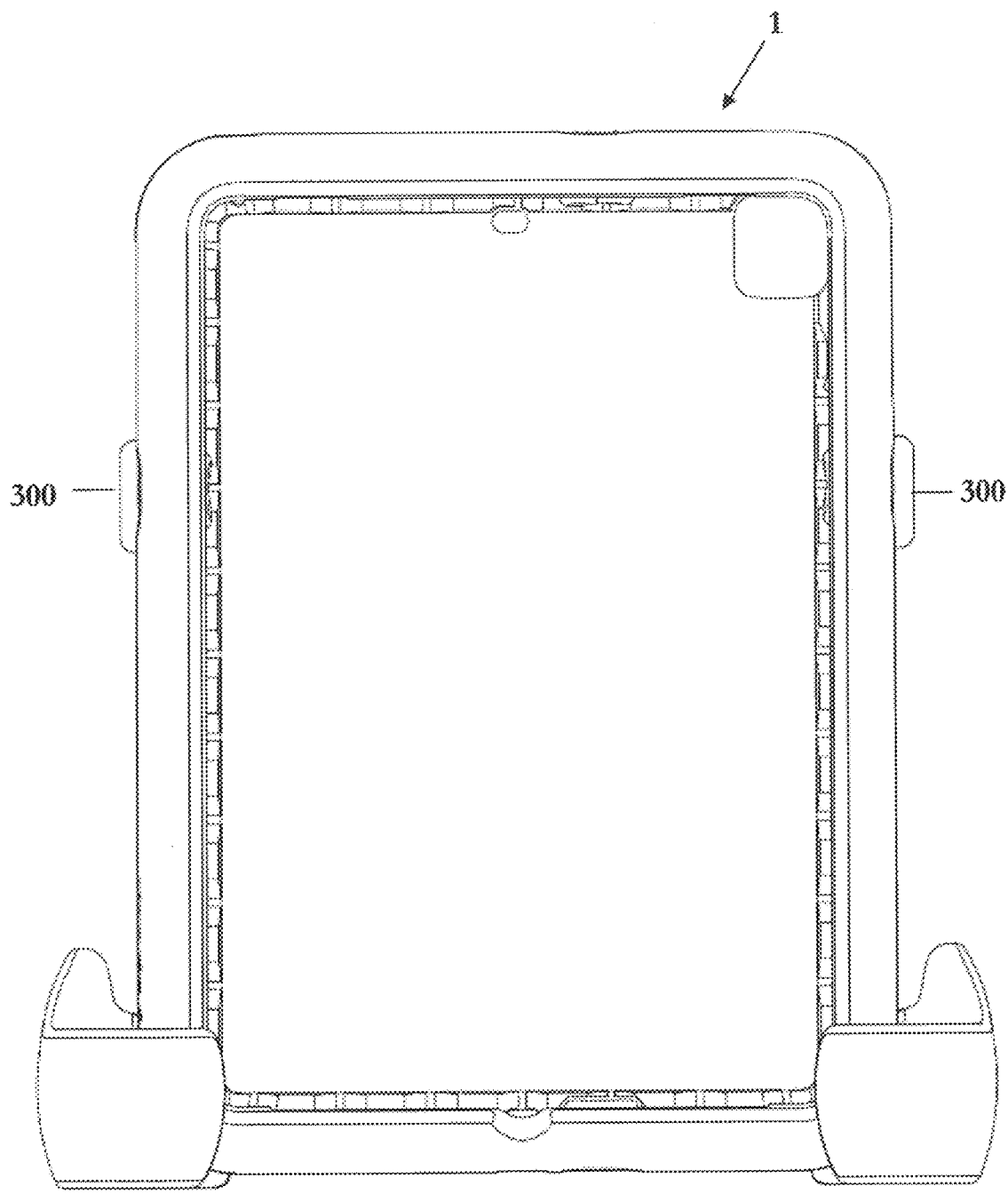
FIG. 24 is a front view of the holder for a mobile electronic device in accordance with an embodiment of the invention with the holder being in a portrait orientation, position, or state.
Figure 25:
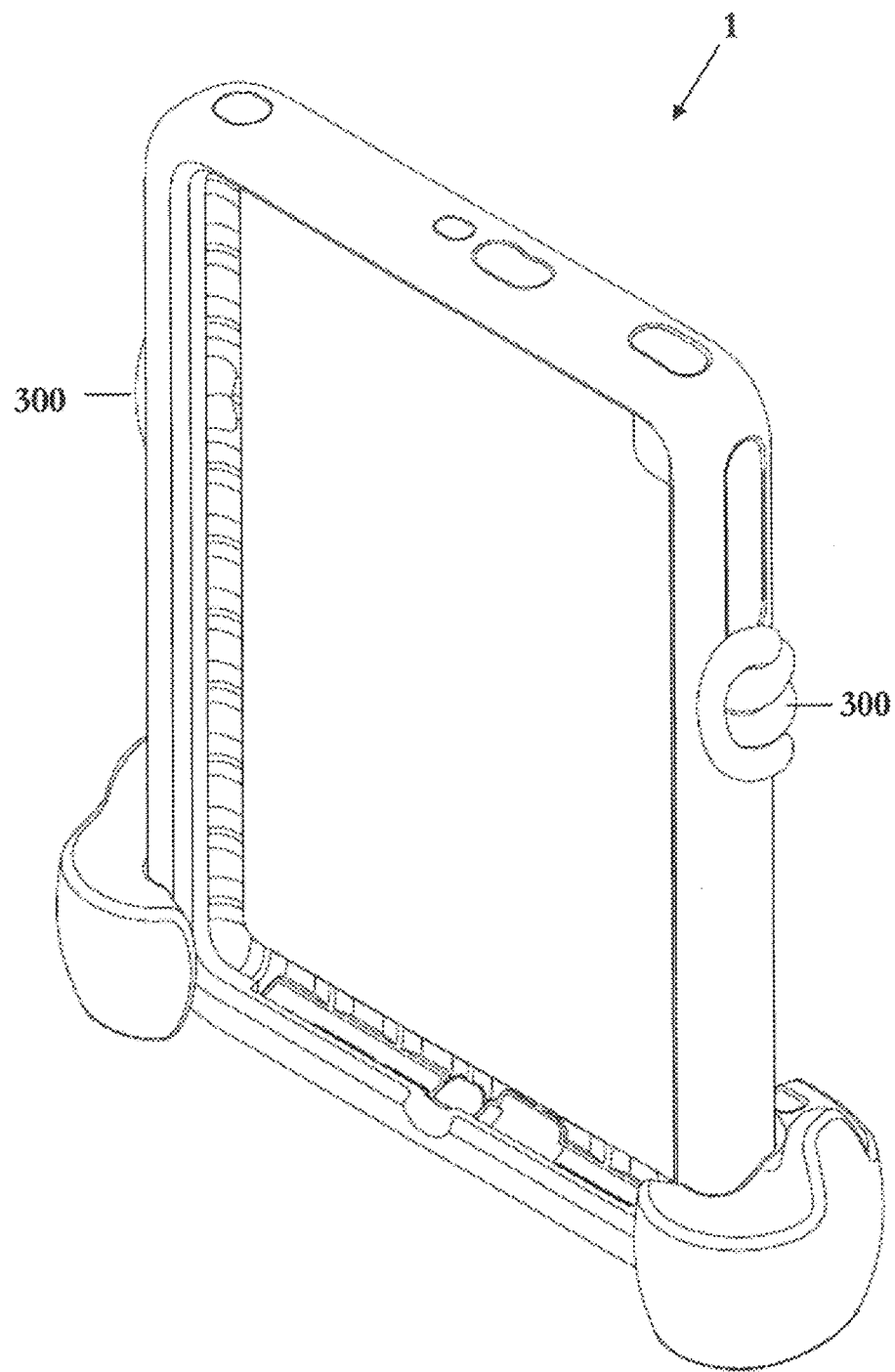
FIG. 25 is a front upper-left-side perspective view of the holder for a mobile electronic device in accordance with an embodiment of the invention with the holder being in the portrait orientation, position, or state.
Figure 26:
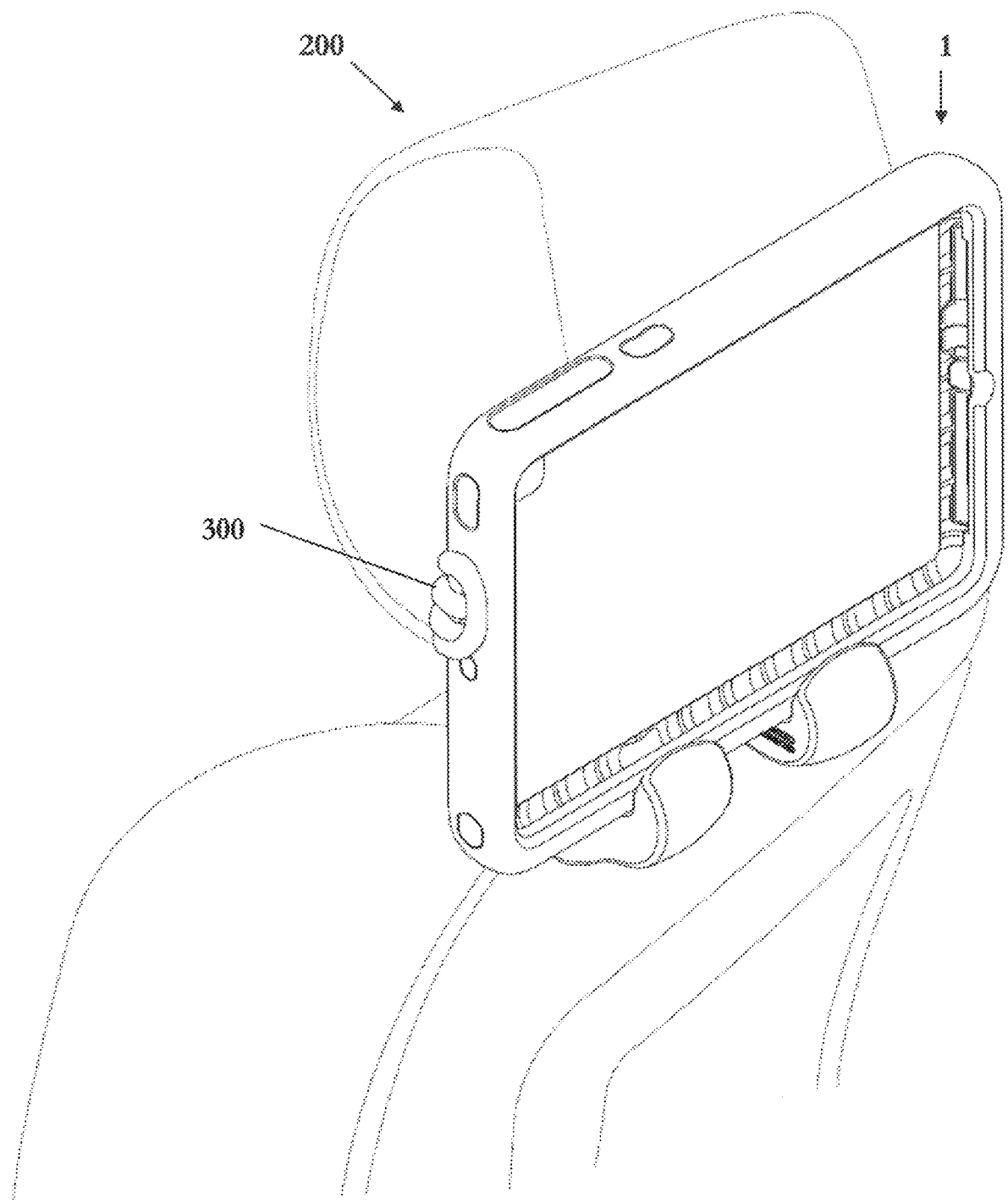
FIGS. 26 and 27 are views of the holder for a mobile electronic device in accordance with an embodiment of the invention with the holder being attached or connected to a headrest of a car.

In addition, positioning the clamp pieces 4,5 at the bottom of the case portion 2 or mobile electronic device when in a landscape direction/orientation as shown in FIGS. 22 and 23, or when in a portrait direction/orientation as shown in FIGS. 24 and 25, enables the clamp pieces 4,5 to function as a stand for the case portion 2 or mobile electronic device to maintain the case portion 2 or mobile electronic device in an upright standing position on a horizontal surface like a desk, table, counter, or the like.

The holder 1, and also holder 101 described further herein, also preferably does not include any metal or magnetic materials. This means that an attached device will have stronger and more reliable wireless signals/connectivity—both wireless data signals (e.g., Bluetooth, WiFi, cellular, 2G, 3G, 4G LTE, etc.) and wireless charging signals (e.g., inductive charging, non-radiative charging, radiative electromagnetic resonant charging, etc.)—than holders with metal components.

Each of the case portion 2, the right clamp piece 4, and the left clamp piece 5 may be injection molded or die-cut, and may be formed from one or more pieces of a soft flexible material, such as an elastomeric material, foams, ethylene-vinyl acetate ("EVA") foam, rubber, silicone, thermoplastic elastomers ("TPEs"), thermoplastic polyurethane ("TPU"), polyolefins, a similar soft plastic or rubber material, or any combination thereof.

Figure 27:
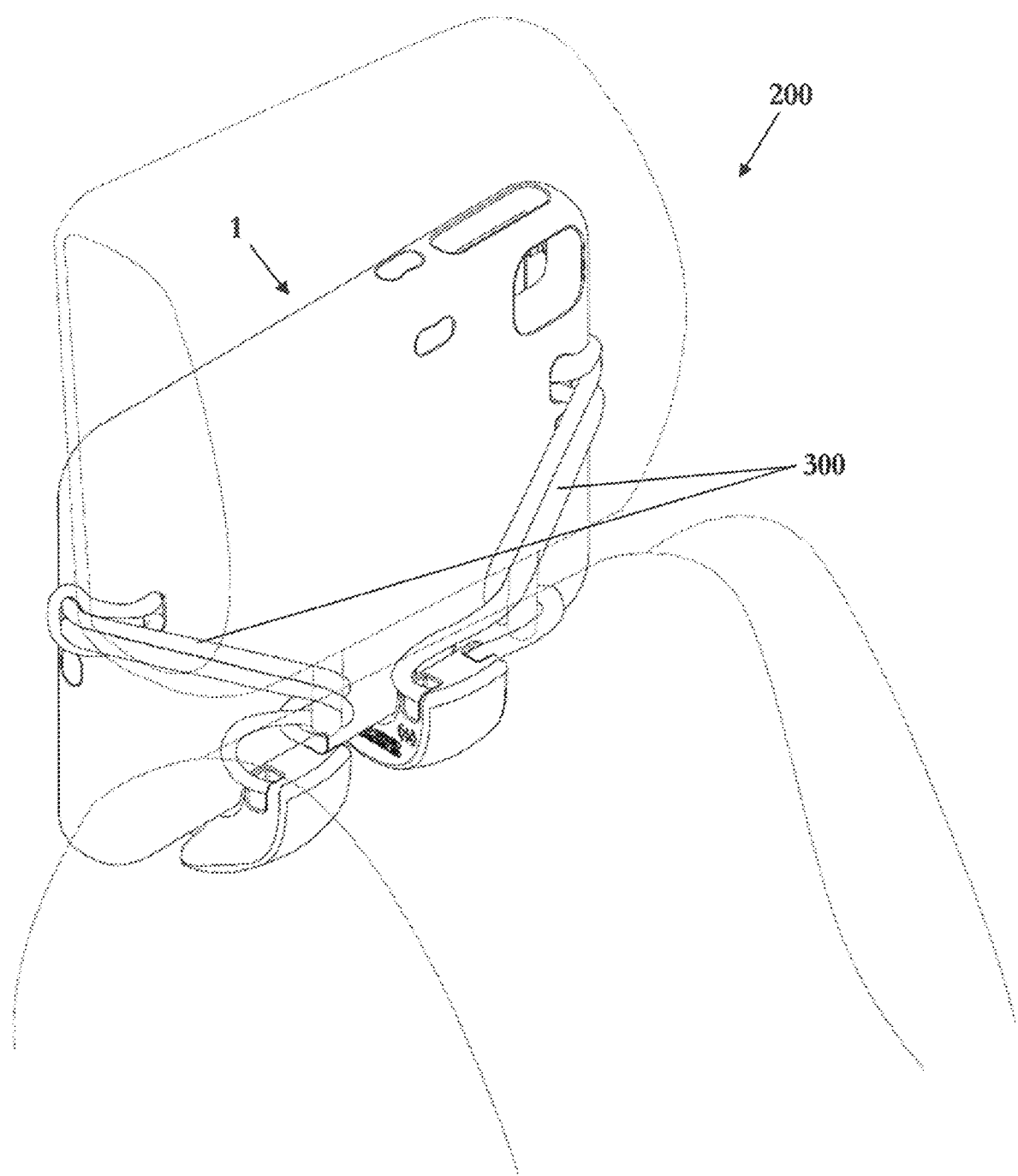
Figure 34:
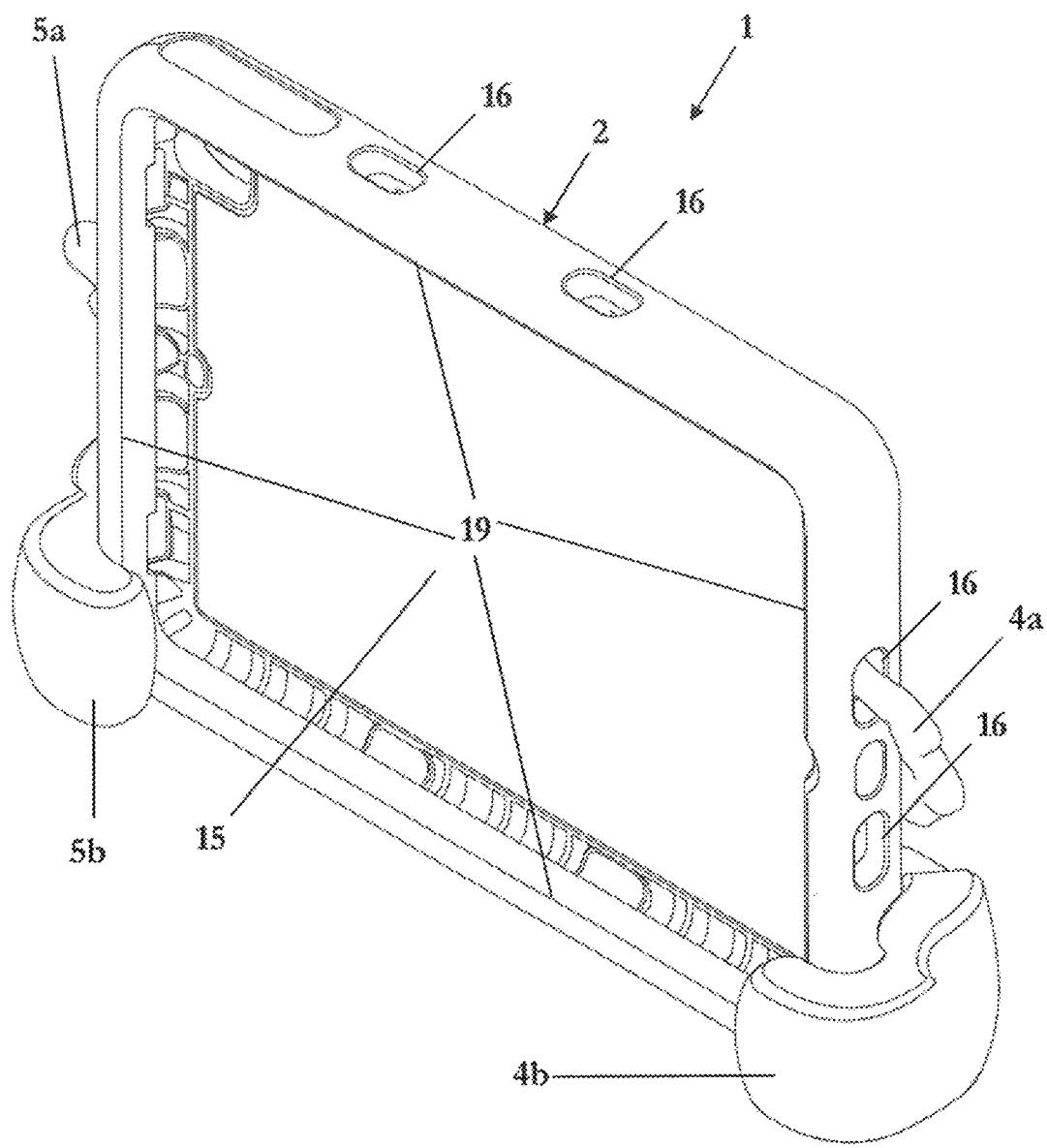
FIG. 34 is a front upper-side perspective view of the holder for a mobile electronic device in accordance with an embodiment of the invention.
Figure 41:
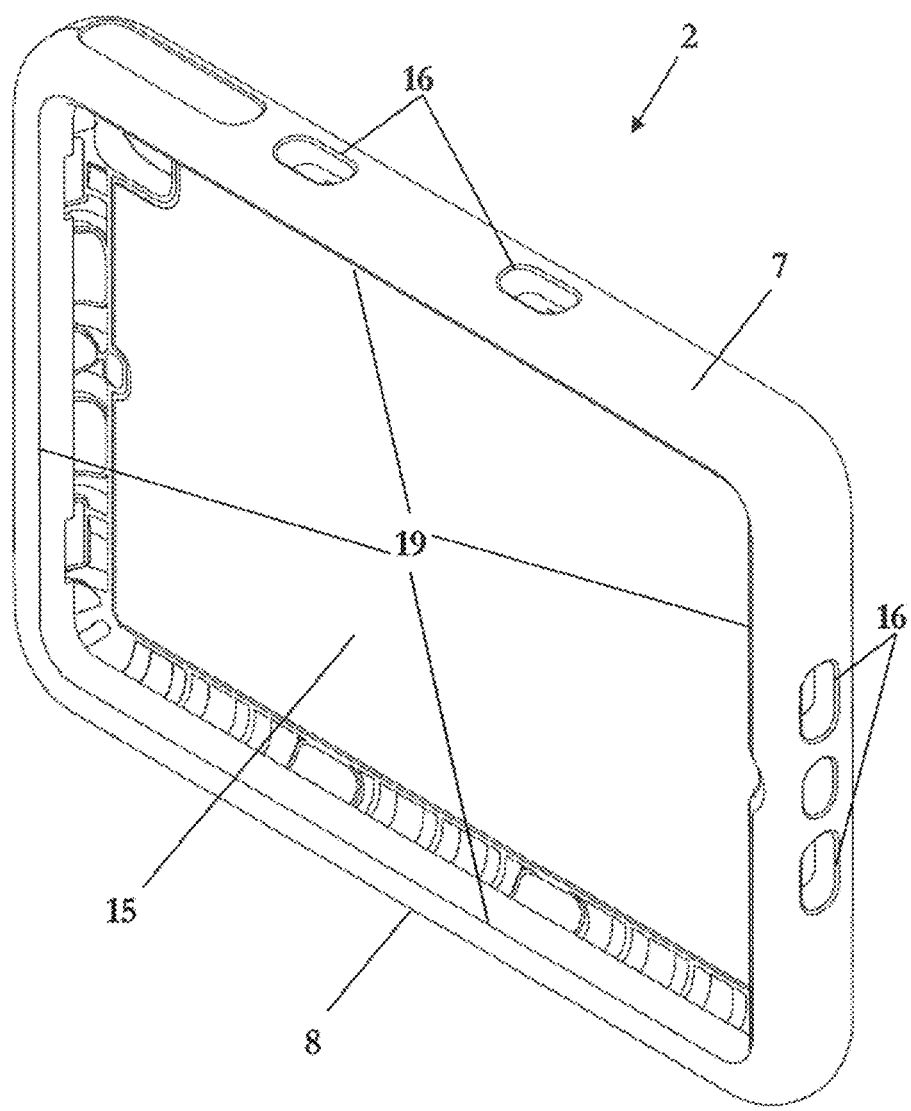
FIG. 41 is a front upper-side perspective view of the holder for a mobile electronic device in accordance with an embodiment of the invention.
Figure 42:
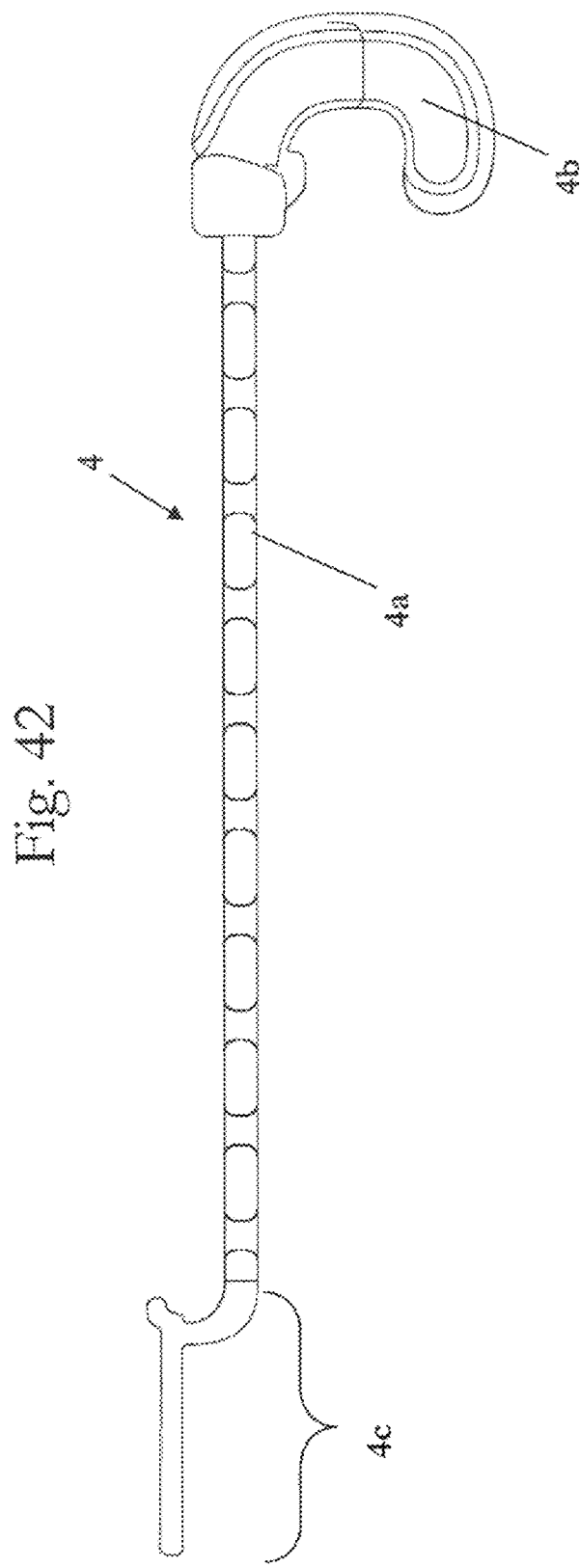
FIG. 42 is a upper side view of the right clamp piece for a mobile electronic device in accordance with an embodiment of the invention.
Figure 45:
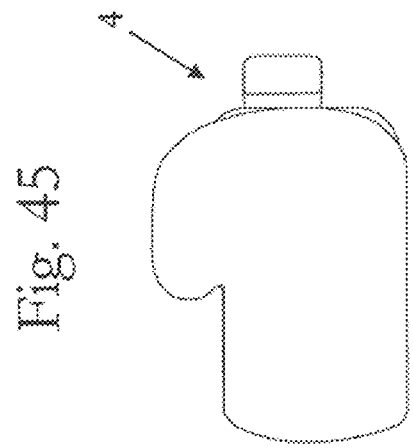
FIG. 45 is a right side view of the right clamp piece for a mobile electronic device in accordance with an embodiment of the invention.
Figure 44:
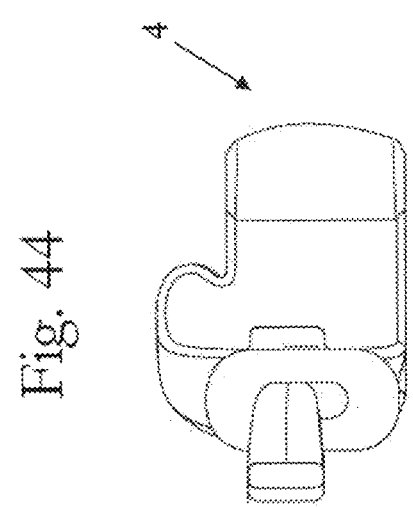
FIG. 44 is a left side view of the right clamp piece for a mobile electronic device in accordance with an embodiment of the invention.
Figure 52:
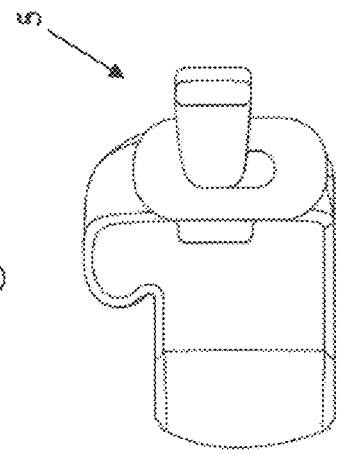
FIG. 52 is a right side view of the left clamp piece for a mobile electronic device in accordance with an embodiment of the invention.
Figure 51:
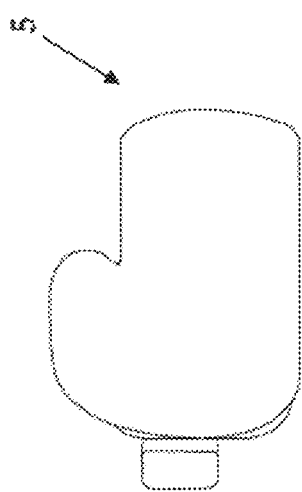
FIG. 51 is a left side view of the left clamp piece for a mobile electronic device in accordance with an embodiment of the invention.
Figure 55:
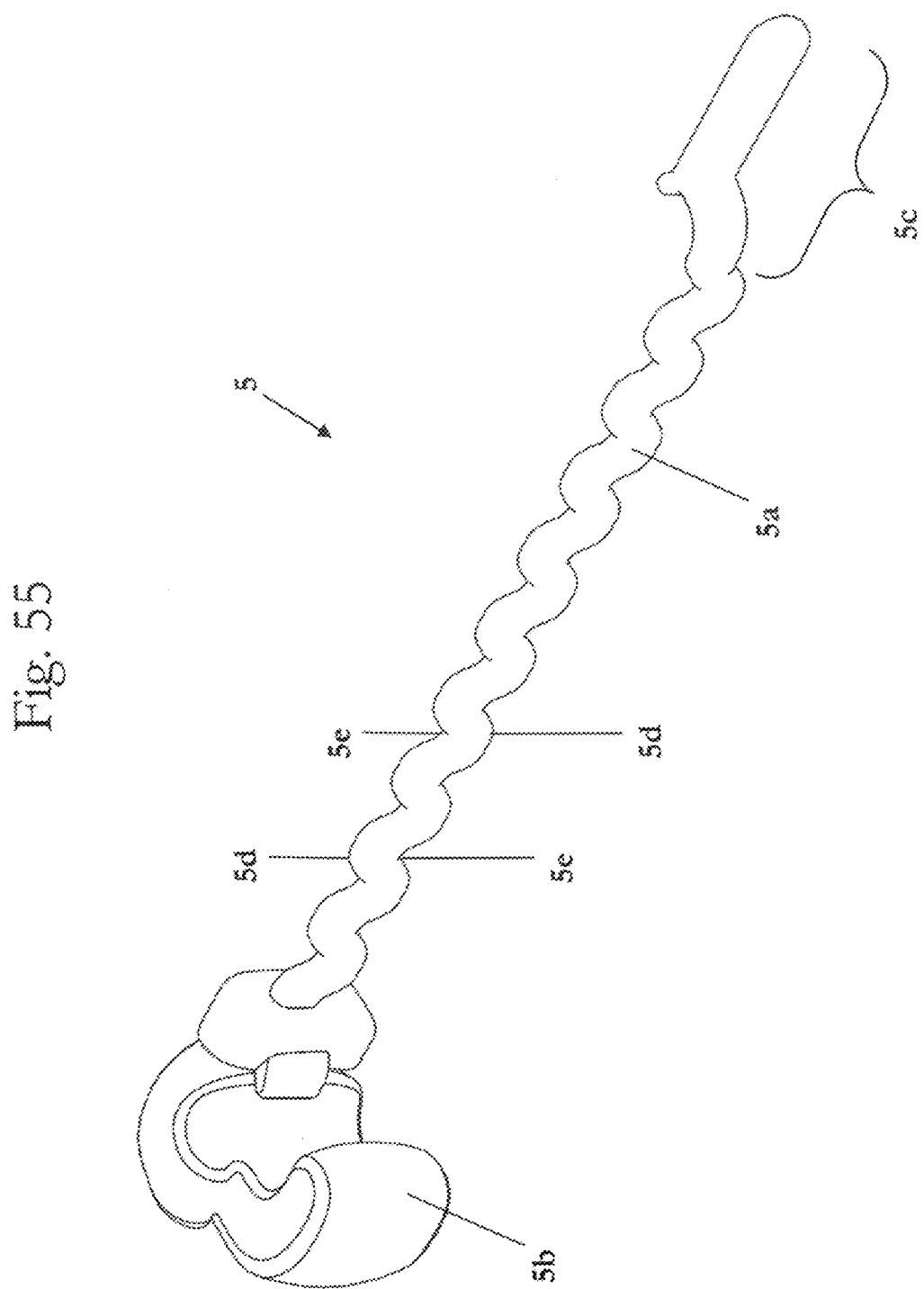
FIG. 55 is a front upper-side perspective view of the left clamp piece for a mobile electronic device in accordance with an embodiment of the invention.
Figure 56:
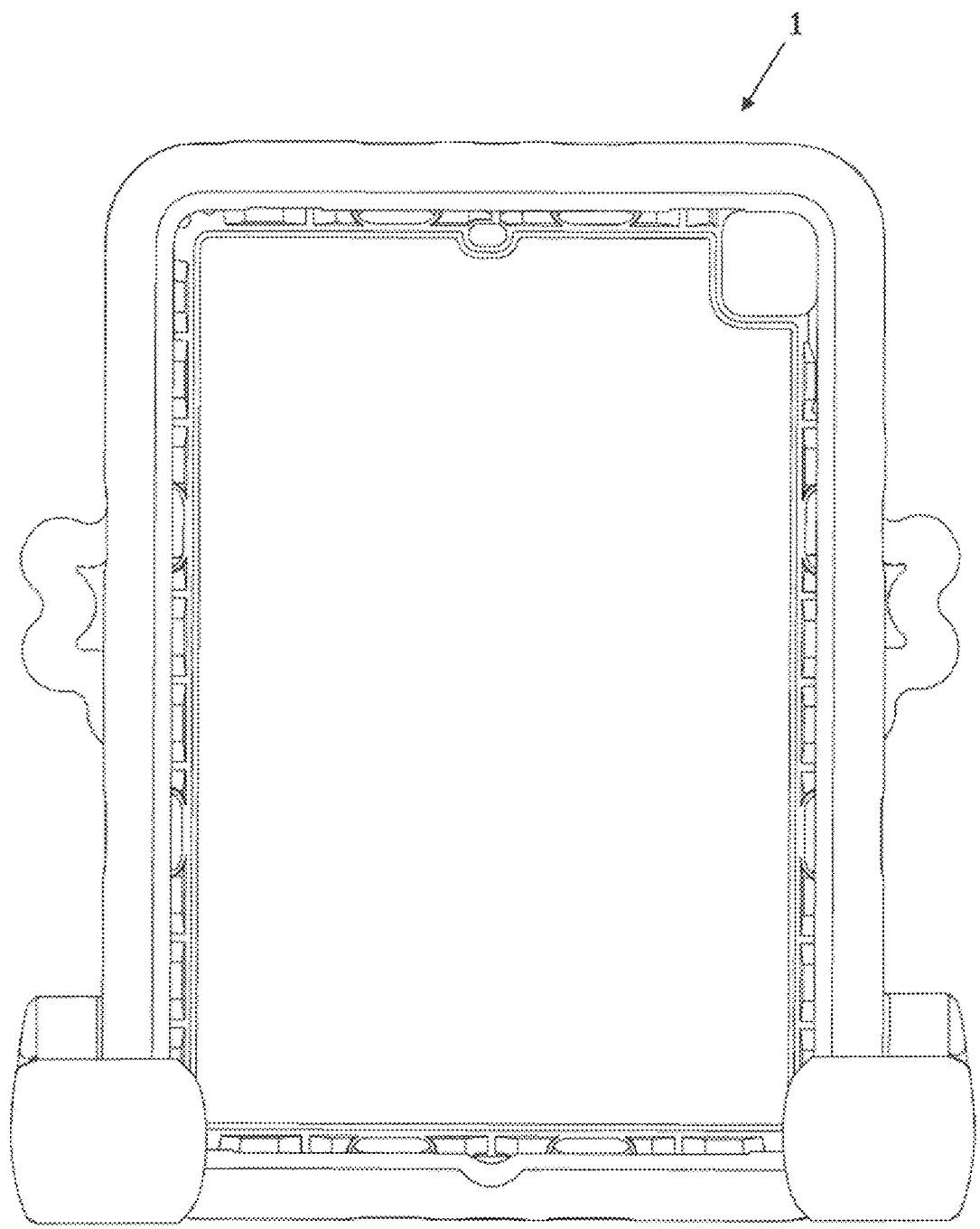
FIG. 56 is a front view of the holder for a mobile electronic device in accordance with an embodiment of the invention with the holder being in a portrait orientation, position, or state.
Figure 57:
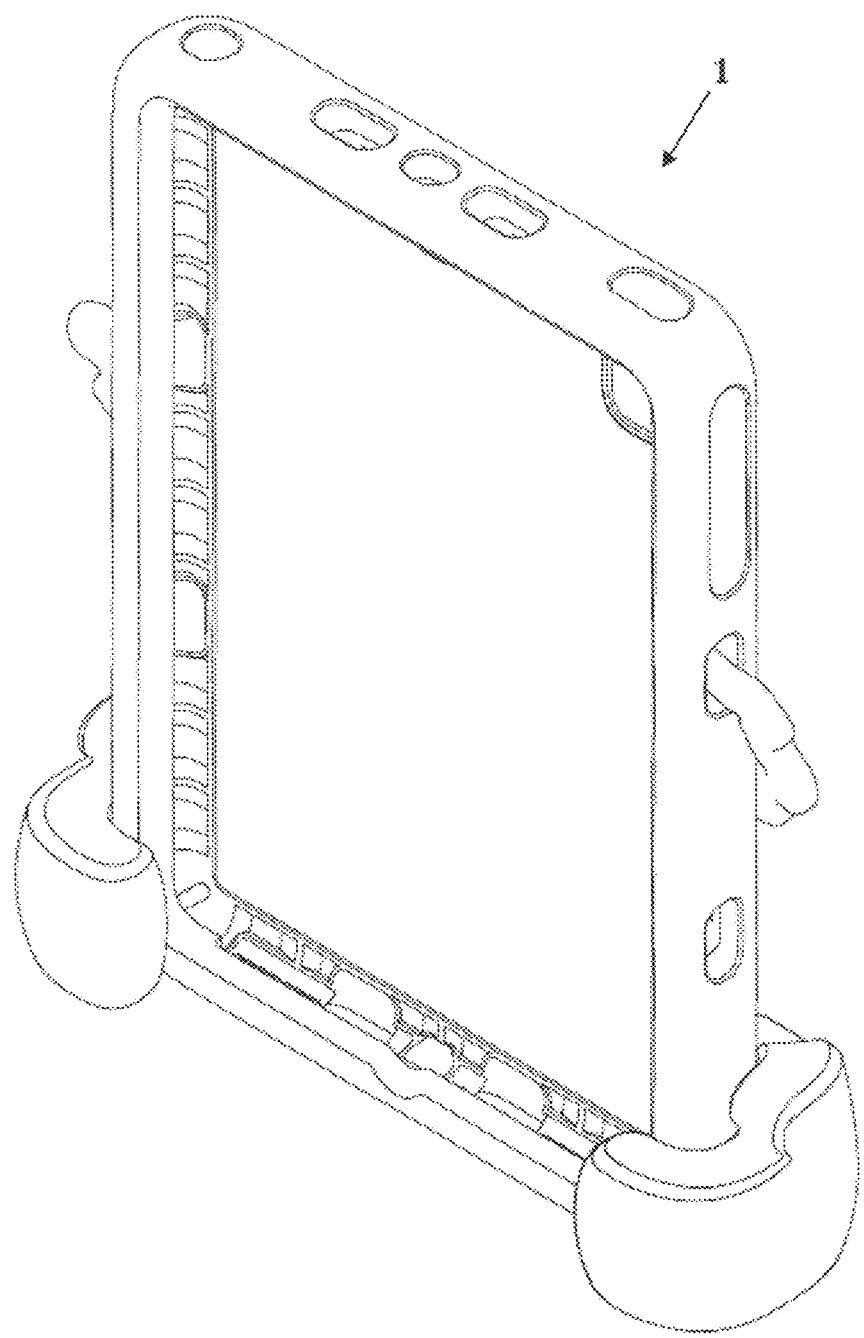
FIG. 57 is a front upper-left-side perspective view of the holder for a mobile electronic device in accordance with an embodiment of the invention with the holder being in the portrait orientation, position, or state.

While FIG. 27 shows the securing device 300 as including two separate items—namely two separate cords—the securing device 300 may also be formed from a single string, wire, cord, elastic cord, bungee cord, rope, cable, strap, or the like. Similarly, the securing device 300 may also be formed by more than two separate items selected from string, wire, cord, elastic cord, bungee cord, rope, cable, strap, or the like.

FIGS. 28-59 show additional embodiments of the holder 1. While this embodiment is substantially similar to the embodiment described above, there are a few differences.

For example, each of the upper side 7, the lower side 8, the left side 13, and the right side 14 of the case portion 2 in FIG. 28 has two sets of paired openings 16,17 compared to the one set on each of these sides in FIG. 1. Otherwise, the case portion 2 in FIGS. 28-41 has the same features as the case portion 2 in FIGS. 1-14.

As another example, the right clamp piece 4 and the left clamp piece 5 each include a flexible extension 4a,5a that extend from the clamping portion 4b,5b. Each clamp portion 4b,5b is configured to clamp onto, snap onto, click onto, or otherwise engage a side of the case portion 2 or a side of a mobile device so that the clamp piece 4,5 is secured to the side of the case portion 2 or the side of a mobile device.

Each clamp piece 4,5 also has a connecting portion 4c,5c located at an end of the flexible extension 4a,5a opposite to the clamping portions 4b,5b. Each connecting portion 4c,5c is configured to securely engage with and connect to the case portion 2 via a set of paired openings 16,17 so as to lock the connecting portion 4c,5c to the case portion 2, as shown in FIG. 33.

Figure 58:
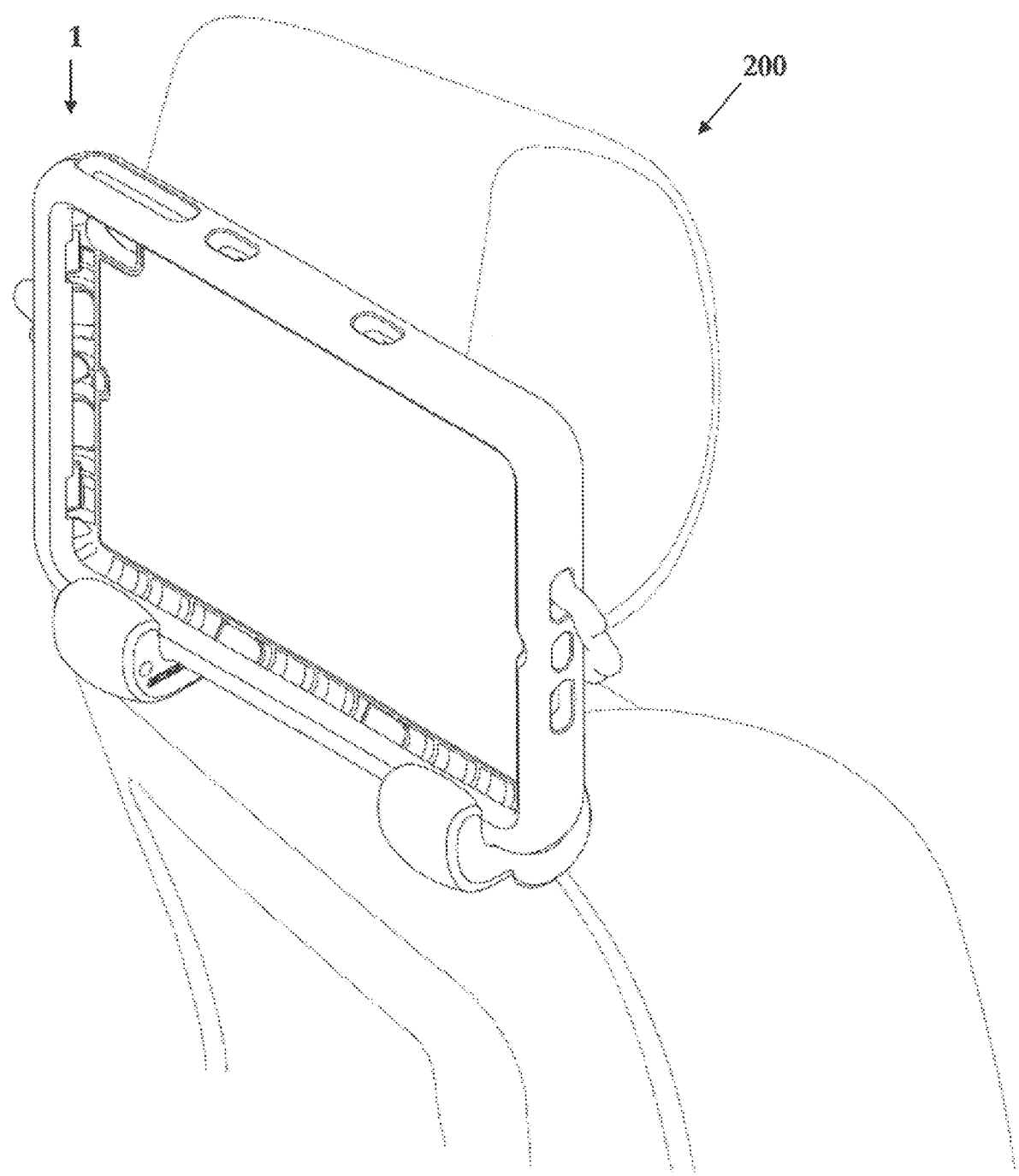
FIGS. 58 and 59 are views of the holder for a mobile electronic device in accordance with an embodiment of the invention with the holder being attached or connected to a headrest of a car.
Figure 59:
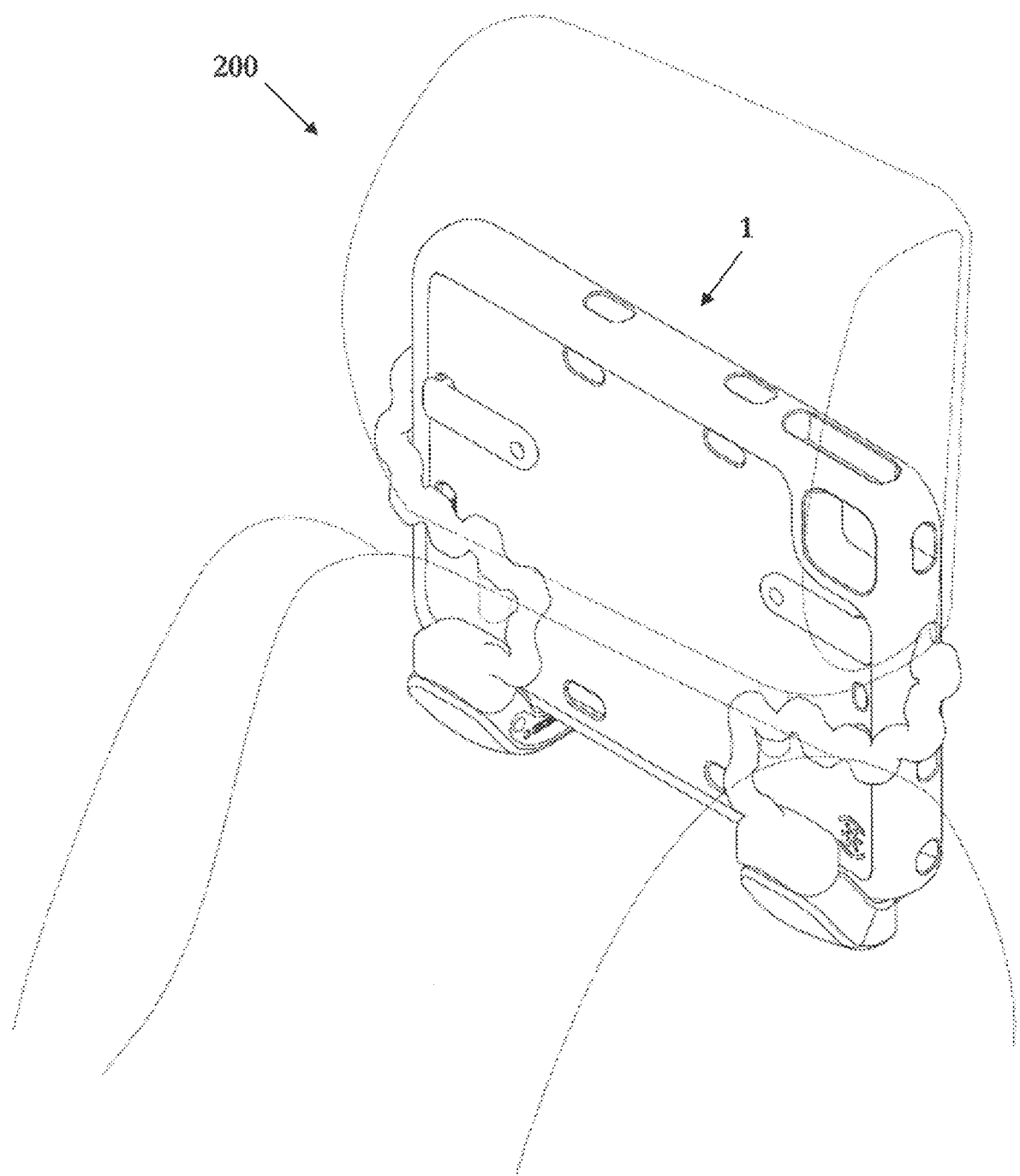
Figure 60:
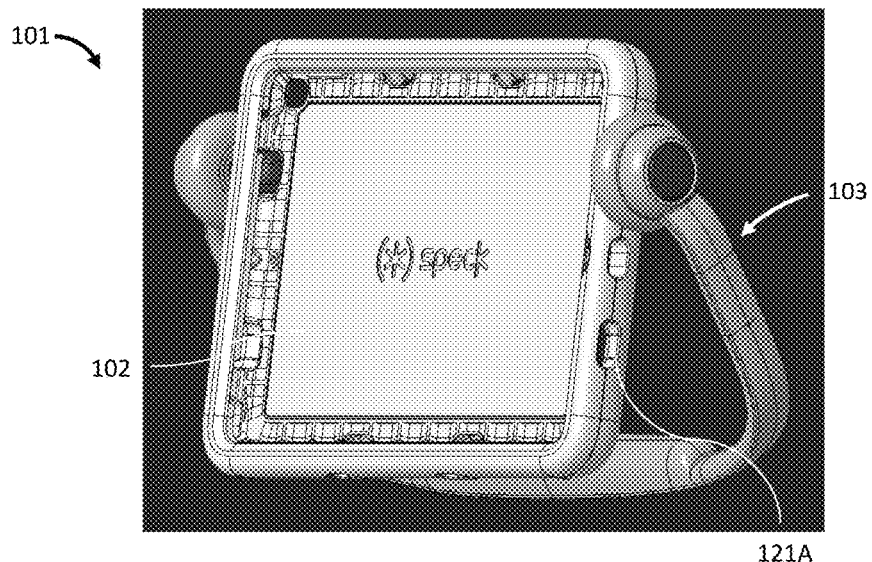
FIG. 60 is a perspective view of a holder for a mobile electronic device in accordance with an embodiment of the invention.
Figure 61:
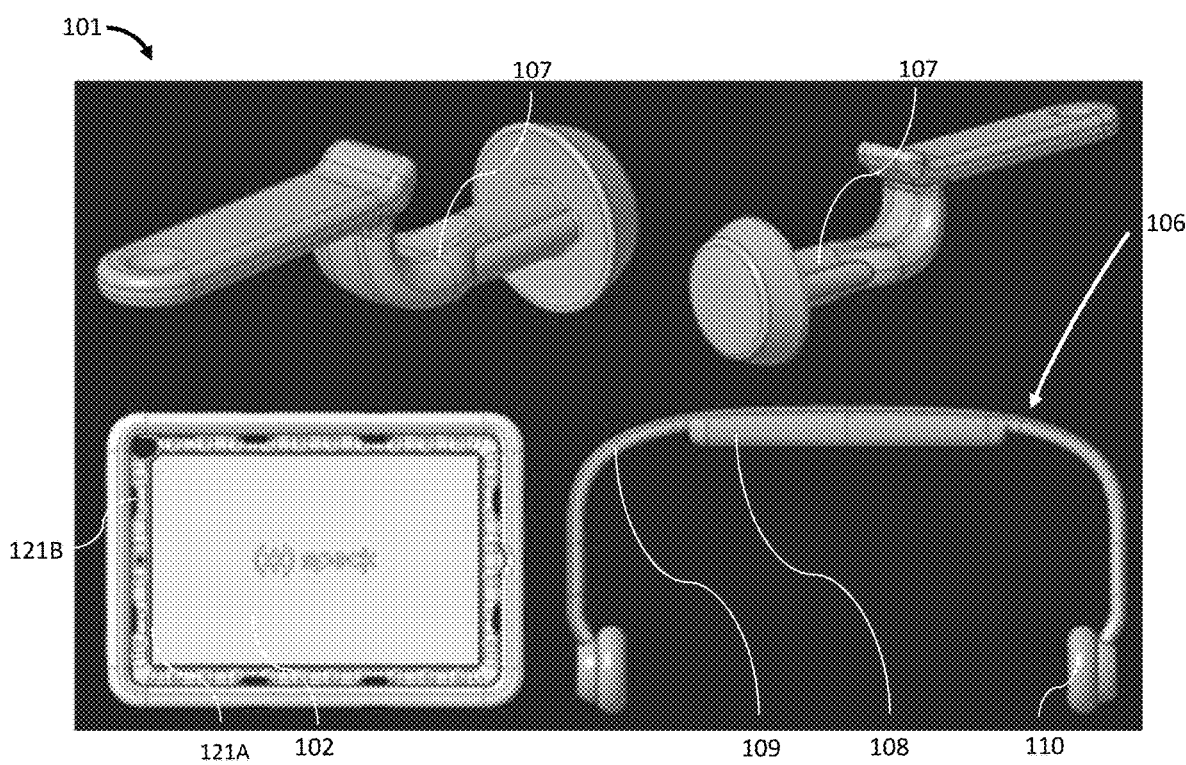
FIG. 61 is an disassembly view of the holder of FIG. 60.

Preferably, each flexible extension 4a,5a is formed in an undulating pattern-like a wave, zig-zag, and the like—with alternating peaks 4d,5d and troughs 4e,5e. The peaks 4d,5d and troughs 4e,5e alternate in an extension direction from the clamping portion 4b,5b to the connecting portion 4c,5c. In the embodiment shown in FIGS. 43, 47, 50, and 54, each peaks 4d,5d also has a corresponding troughs 4e,5e on an opposite side of the flexible extension 4a,5a in a direction substantially perpendicular to the extension direction. The undulating pattern of peaks and troughs gives the flexible extensions 4a,5a added flexibility and elasticity to assist in securing the case portion 2 or mobile device to an object, such as a car headrest as shown in FIGS. 58 and 59. As seen in FIGS. 58 and 59, the flexible extensions 4a,5a and the connecting portion 4c,5c function and act in the same manner as the securing device 300 discussed above.

Preferably, each flexible extensions 4a,5a, clamping portion 4b,5b, and connecting portion 4c,5c are integral with each other to form a respective integral singular continuous clamp piece 4,5. More preferably, each clamp piece 4,5 is formed from a single uniform material.

Referring now to FIGS. 60-66, holder 101 includes case portion 102 and handle assembly 103. As shown, case portion 102 is in substantially the same form as case portion 2 of holder 1.

Handle assembly 103 includes handle 106 and an opposing pair of connector assemblies 107 configured for attaching opposing ends of handle 106 to case portion 102. Each of the case portion 102, handle 106, and connector assemblies 107 may be injection molded or die-cut, and may be formed from one or more pieces of a soft flexible material, such as an elastomeric material, foams, EVA, foam, rubber, silicone, TPEs, TPU, polyolefins, a similar soft plastic or rubber material, or any combination thereof.

As shown, symmetrical handle 106 includes thick bar portion 108, thin bar portions 109 extending from opposing ends of the thick bar portion, and a pair of opposing attachment members 110 on the other ends of thin bar portions 109 in which the attachment members define the ends of the handle. As in the example shown, attachment members 110 may have a circular outer surface such that handle assembly 103 may take the form of headphones. Attachment members 110 further may be in the form of annuli defining holes 111 for receipt and engagement with connector assemblies 107.

Figure 62:
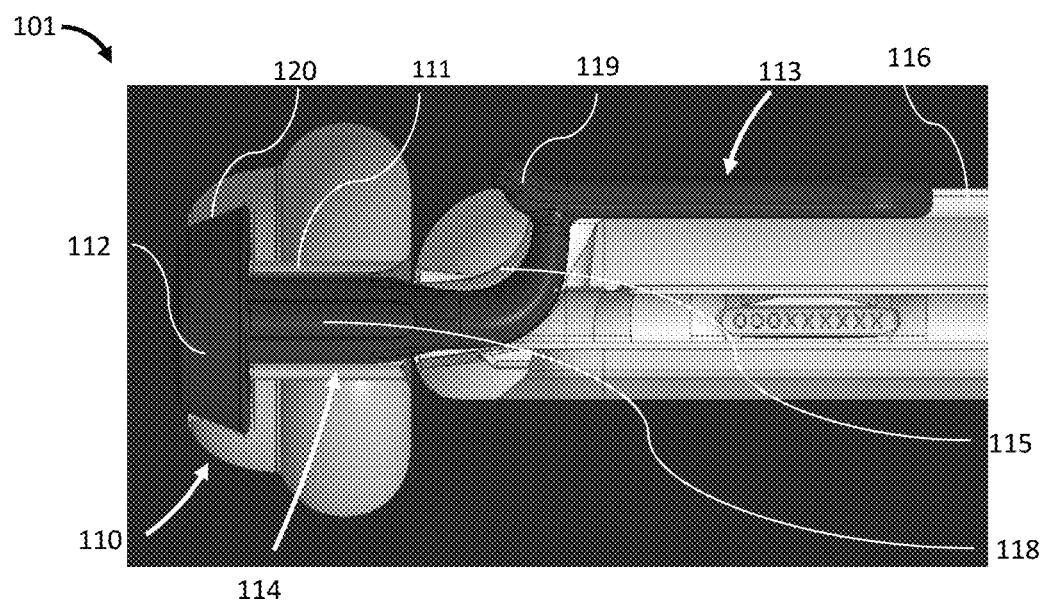
FIG. 62 is a cross-sectional view of the holder of FIG. 60.
Figure 63:
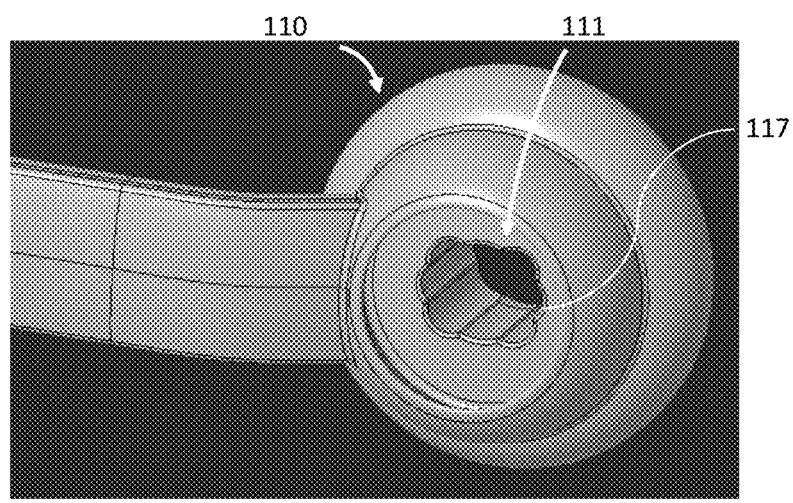
FIG. 63 is a perspective view of a portion of a handle of the holder of FIG. 60 in accordance with an embodiment of the invention.
Figure 64:
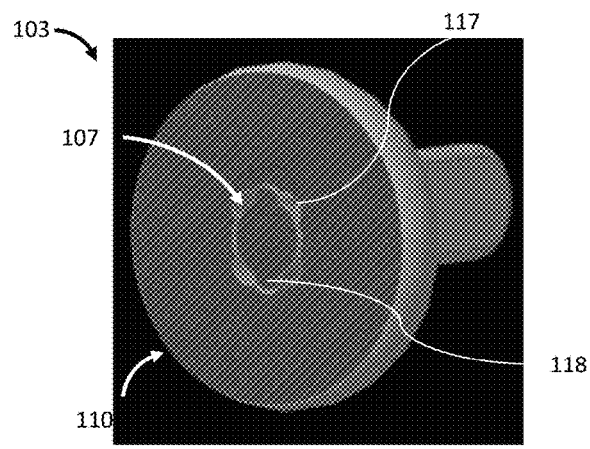
FIG. 64 is a cross-sectional perspective view of a handle assembly of the holder of FIG. 60 in accordance with an embodiment of the invention.

Each of connector assemblies 107 may include outer flange 112, attachment flange 113, and intermediate portion 114 extending between and attaching the outer flange to the attachment flange. As shown in FIG. 62, intermediate portions 114 are thicker along one portion for receipt into holes 111 and tapers from that thicker portion to a thinner portion configured for receipt through curved pathways 115 extending from each of the four sides of case portion 102 to the rear portion 116 of the case portion. Each of connector assemblies 107 is shaped and dimensioned such that when connector assemblies 107 are fully inserted into case portion 102 and inserted through respective holes 111 of attachment members 110, outer flange 112 is located outside of but in abutment with its adjacent attachment member 110 and attachment flange 113 is located on rear portion 116 of case portion 102 exterior to and in abutment with the rear portion of the case portion. In this manner, attachment members 110 of handle 106 are held against the case portion with little or no slack in an axial direction along an axis defined by and extending through the pair of outer flanges 112.

As shown, holes 111 of attachment members 110 are scalloped such that the holes include a set of protrusions defining grooves 117 within the holes. Intermediate portion 114 of each of connector assemblies 107 include opposing nodules 118 corresponding to grooves 117 of attachment members 110 such that when the connector assemblies are received through attachment members 110, the opposing nodules are seated within respective opposing grooves of the attachment members. In the example shown, holes 111 include three sets of such opposing grooves 117 such that connector assemblies 107 may be positioned relative to their respective attachment members 110 in six different orientations. As connector assemblies 107 do not rotate relative to case portion 102, attachment members 110 may be indexed to six different rotational angles relative to the case portion. Moreover, connector assemblies 107 and handle 106 may be made of different plastic materials having different moduli of elasticity such that either nodules 118 of connector assemblies 107 or the protrusions defining grooves 117 are more compressible than the other of the nodules and the protrusions. In this manner, nodules 118 are able to overcome the protrusions defining grooves 117 during rotation of connector assemblies 107 within attachment members 110 of handle 106.

Figure 65A:
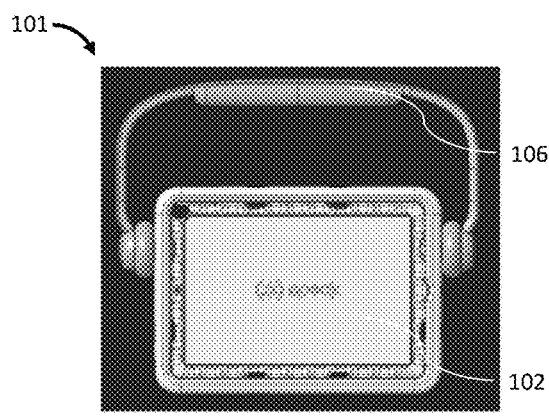
FIGS. 65A-65D are various views showing a handle assembly and a case portion of the holder of FIG. 60 in different rotational positions relative to each other.
Figure 65B:
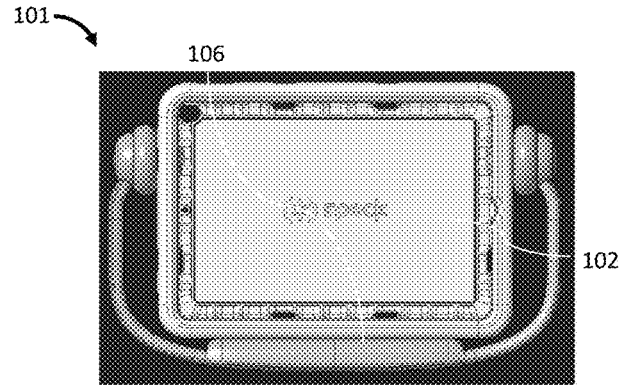
Figure 65C:
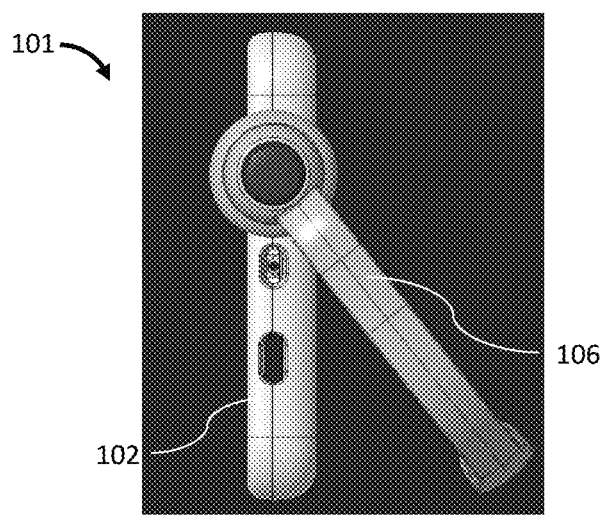
Figure 65D:
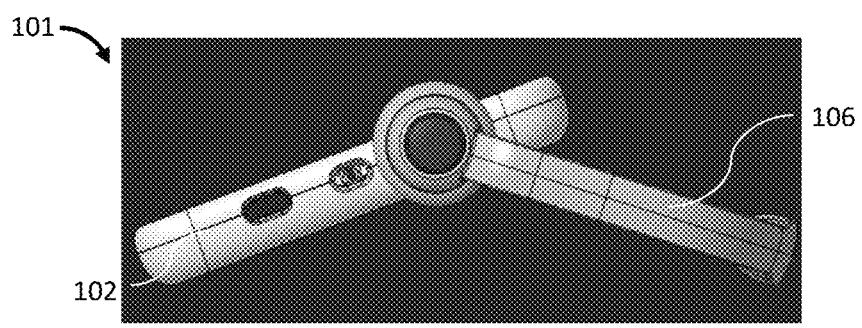
Figure 66:
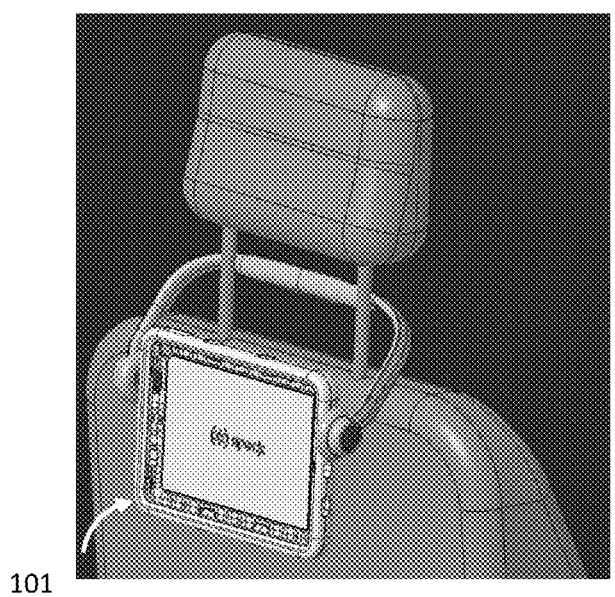
FIG. 66 is a perspective view of a holder for a mobile electronic device in accordance with an embodiment of the invention with the holder being attached or connected to a headrest of a car.

As shown in FIGS. 65A and 65B, handle 106 may be rotated to be above or below sides of case portion 102 such that the handle and the case portion are generally co-planar. As shown in FIG. 65C, handle 106 may be rotated to define a relatively low angle with case portion 102 such that the case portion rests more vertically relative to a substrate on which the case portion may be placed, and as shown in FIG. 65D, handle 106 may be rotated to define a relatively high angle with case portion 102 such that the case portion may rest in a more parallel relationship upon a substrate on which the case portion may be placed. In the example embodiment, handle 106 may also be indexed 180 degrees to the relative angular positions of the handle and case portion 102 shown in each of FIGS. 65C and 65D in which such positions could be useful for protecting the screen of a mobile device placed into holder 101.

With particular reference to FIG. 62, each of connector assemblies 107 may be removed and separated from case portion 102 and respective ones of attachment members 110 of handle 106 by bending attachment flange 113 such that tab 119 of the attachment flange normally preventing pullout of the attachment flange fits through pathway 115 of case portion 102 and then through hole 110 of the respective attachment member. In removing each of connector assemblies 107, due to taper 120 within respective recesses of attachment members 110 into which outer flanges 112 of each of the connector assemblies are retained when handle assembly 103 is assembled, sufficient force also must be applied to push or pull the outer flanges out of the recesses of the attachment members. In this manner, such tapered recesses of attachment members 110 further aid in maintaining handle 106 against case portion 102 and in maintaining an assembly of case portion 102 and handle assembly 103.

With respect to the example shown, it is to be understood that handle assembly 103 may be assembled to case portion 102 at either of opposing openings 121A, 121B and operate to be rotated in the manner shown in FIGS. 65A-65D. Additionally, in some alternative arrangements, handle 106 may be telescoping such that attachment members 110 of the handle may be assembled to openings on both the opposing length sides of case portion 102 and to the opposing width sides of the case portion with corresponding connector assemblies 107.

It is noted that the terminology used above is for the purpose of reference only, and is not intended to be limiting. For example, terms such as "upper", "lower", "above", "below", "rightward", "leftward", "clockwise", and "counterclockwise" refer to directions in the drawings to which reference is made. As another example, terms such as "inward" and "outward" may refer to directions toward and away from, respectively, the geometric center of the component described. As a further example, terms such as "front", "rear", "side", "left side", "right side", "top", "bottom", "horizontal", and "vertical" describe the orientation of portions of the component within a consistent but arbitrary frame of reference which is made clear by reference to the text and the associated drawings describing the component under discussion. Such terminology will include the words specifically mentioned above, derivatives thereof, and words of similar import.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

In addition, it is noted that citation or identification of any document in this application is not an admission that such document is available as prior art to the present invention.

The invention claimed is:

1. A holder for a mobile electronic device, the holder comprising:
   a case portion configured for holding the mobile electronic device;
   a first connection member;
   a handle rotatable about the first connection member,
   wherein the first connection member includes a first flange on a first end of the first connection member and a second flange on a second end of the first connection member opposite the first end of the first connection member,
   wherein the first flange is spaced from the second flange such that a first portion of the handle is held in an axial position relative to the case portion by a combination of and between the first flange and the second flange, and
   wherein an entirety of the first connection member is removable from the rest of the holder by passing a portion of the first connection member through the handle.

2. The holder according to claim 1, wherein the entirety of the first connection member is removable from the rest of the holder by passing the first flange of the first connection member through the handle.

3. The holder according to claim 1, wherein at least a portion of the case portion is held between the first flange and the second flange.

4. The holder according to claim 1, wherein the handle is separable from the first connection member.

5. A holder for a mobile electronic device, the holder comprising:
   a case portion configured for holding the mobile electronic device;
   a first connection member;
   a handle rotatable about the first connection member,
   wherein the first connection member includes a first flange on a first end of the first connection member and a second flange on a second end of the first connection member opposite the first end of the first connection member,
   wherein the first flange is spaced from the second flange such that a first portion of the handle is held in an axial position relative to the case portion by a combination of and between the first flange and the second flange, and
   wherein the first connection member is a single body.

6. The holder according to claim 5, wherein the first flange is adjacent to the handle and the second flange is adjacent to the case portion.

7. The holder according to claim 5, wherein the handle is held against the case portion.

8. The holder according to claim 5, wherein the handle is separable from the first connection member.

9. The holder according to claim 5, wherein the case portion comprises:
   a cavity dimensioned for holding the mobile electronic device;
   opposing first openings on the first side and the second side;
   opposing second openings on the first side and the second side, the second openings being spaced from the first openings;
   opposing third openings on the third side and the fourth side;
   opposing fourth openings on the third side and the fourth side, the fourth openings being spaced from the third openings.

10. The holder according to claim 8, the holder further comprising a second connection member, wherein the second connection member includes a third flange on a first side of the second connection member and a fourth flange on a second side of the second connection member opposite the first side of the second connection member, the third flange being spaced from the fourth flange such that a second portion of the handle is held in an axial position relative to the case portion by the combination of and between the third flange and the fourth flange.

11. The holder according to claim 10, wherein the handle comprises:
   first and second attachment members each configured to be clamped respectively by the first and the second connection members to the case portion, the first attachment member including the first portion of the handle; and
   a bridge member attached to and extending between the first and the second attachment members.

12. The holder according to claim 11, wherein the handle is rotatable about the case portion and about an axis passing through each of the first and the second attachment members.

13. The holder according to claim 11, wherein each of the first and the second attachment members define respective first and second holes and include first and second pluralities of protrusions extending towards respective centers of the first and the second holes to define first and second pluralities of grooves, and
   wherein each of the first and the second connection members include at least one nodule configured to be received in corresponding ones of the first and the second pluralities of grooves of the first and the second attachment members to thereby align the handle and the case portion in discrete rotational positions relative to each other.

14. The holder according to claim 11, wherein the first and the second attachment members are made of a rigid plastic material and the first and the second connection members are made of a flexible plastic material, or wherein the first and the second attachment members are made of a flexible plastic material and the first and the second connection members are made of a rigid plastic material.

15. The holder according to claim 10, wherein each of the first and the second connection members passes through the case portion and the handle.

16. The holder according to claim 8, wherein the case portion has a length dimension in a length direction, a width dimension in a width direction, and a thickness dimension in a thickness direction, wherein each of the length direction, the width direction, and the thickness direction is orthogonal to the other two of the length direction, the width direction, and the thickness direction,
   wherein the thickness dimension is smaller than the width dimension and the width dimension is smaller than the length dimension, and wherein the bridge member includes a first bridge portion and a second bridge portion that telescopes within the first bridge portion such that the first and the second attachment members are configured to provide a clamping force to the case portion in the length direction in a first position of the second bridge portion relative to the first bridge portion and are configured to provide a clamping force to the case portion in a width direction in a second position of the second bridge portion relative to the first portion.

17. The holder according to claim 5, wherein the first connection member is made of a plastic material.

18. The holder according to claim 5, wherein the handle and the case portion are made of plastic materials.

19. The holder according to claim 5, wherein the first connection member is directly attached to the case portion and to the handle without being directly attached to any other component.

20. The holder according to claim 5, wherein the first connection member is separable from the handle by pulling the first flange of the first connection member through the case portion and the handle without being separable from the handle by pulling the second end of the first connection member through the case portion and the handle.

21. The holder according to claim 5, wherein at least a portion of the case portion is held between the first flange and the second flange.

22. The holder according to claim 8, wherein the case portion includes a first side, a second side opposite the first side, a third side, a fourth side opposite the third side, and a rear side attached to each of the first side, the second side, the third side, and the fourth side, the rear side defining a rear portion of the case portion and the third side and the fourth side extending between the first side and the second side, and wherein the first connection member extends at least through one side from the group consisting of the first side, the second side, the third side, and the fourth side and through one other side from the group consisting of the first side, the second side, the third side, the fourth side, and the rear side, the one other side being different from the one side.

* * * * *